(12) United States Patent
Karaki

(10) Patent No.: US 8,995,500 B2
(45) Date of Patent: Mar. 31, 2015

(54) ASYNCHRONOUS CORRELATION CIRCUIT, ASYNCHRONOUS FULL ADDER CIRCUIT, CALCULATION DEVICE, CORRELATION DEVICE, ASYNCHRONOUS MAXIMUM VALUE N DETECTION CIRCUIT, AND SATELLITE SIGNAL ACQUISITION DEVICE

(71) Applicant: Seiko Epson Corporation, Tokyo (JP)

(72) Inventor: Nobuo Karaki, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/944,346

(22) Filed: Jul. 17, 2013

(65) Prior Publication Data

US 2014/0023122 A1    Jan. 23, 2014

(30) Foreign Application Priority Data

Jul. 19, 2012  (JP) .................................. 2012-160507
Jul. 19, 2012  (JP) .................................. 2012-160508
Jul. 19, 2012  (JP) .................................. 2012-160509

(51) Int. Cl.
*H04B 1/00*        (2006.01)
*G01S 19/30*       (2010.01)

(52) U.S. Cl.
CPC ...................................... *G01S 19/30* (2013.01)
USPC .......................................................... 375/150

(58) Field of Classification Search
USPC ................. 375/150, 149; 716/104, 3
See application file for complete search history.

(56) References Cited

U.S. PATENT DOCUMENTS

| | | | |
|---|---|---|---|
| 6,732,336 B2 * | 5/2004 | Nystrom et al. | 716/104 |
| 7,395,307 B2 | 7/2008 | Ikeno | |
| 8,174,440 B2 | 5/2012 | Terashima et al. | |
| 2006/0190851 A1 * | 8/2006 | Karaki et al. | 716/3 |

FOREIGN PATENT DOCUMENTS

| | | |
|---|---|---|
| JP | 11-143684 | 5/1999 |
| JP | 2001-092810 A | 4/2001 |
| JP | 2004-073735 A | 3/2004 |
| JP | 2004-265204 A | 9/2004 |
| JP | 2009-168699 A | 7/2009 |
| JP | 2011-015159 A | 1/2011 |

\* cited by examiner

*Primary Examiner* — Daniel Washburn
*Assistant Examiner* — Fitwi Hailegiorgis
(74) *Attorney, Agent, or Firm* — Harness, Dickey & Pierce, P.L.C.

(57) ABSTRACT

An asynchronous correlation circuit includes a first data supply unit that dual-rail-encodes first sequence data and supplies first data to be provided for next calculation at each time when calculation is completed, a second data supply unit that dual-rail-encodes second sequence data and supplies second data to be provided for next calculation at each time when calculation is completed, an addition result storage unit, a third dual-rail encoding unit that dual-rail-encodes a storage value of the addition result storage unit, an asynchronous full addition unit that adds an output value from the first data supply unit to an output value of the third dual-rail encoding unit with a sign in response to an output value from the second data supply unit, and outputs the value, and a dual-rail decoding unit that decodes and outputs an output value of the asynchronous full addition unit to the addition result storage unit.

8 Claims, 30 Drawing Sheets

FIG. 7(1)  INITIAL STATE
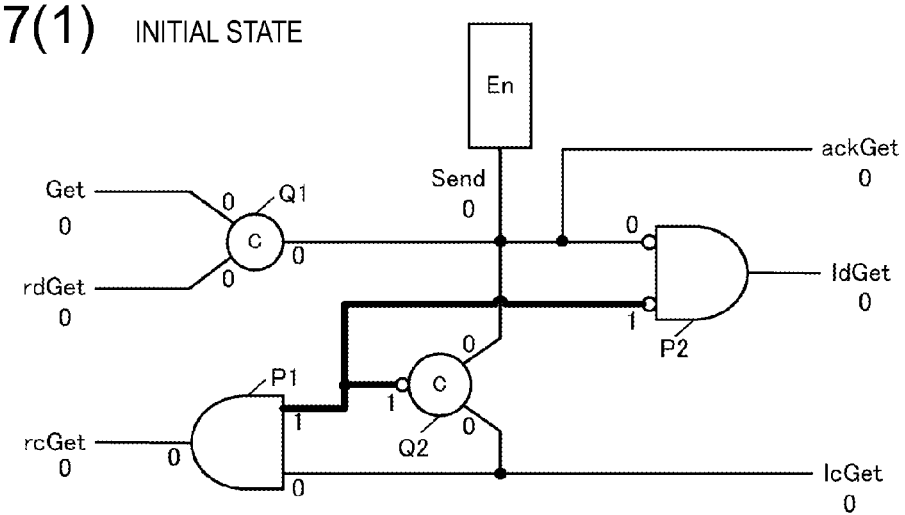
FIG. 7(2)  lcGet→1
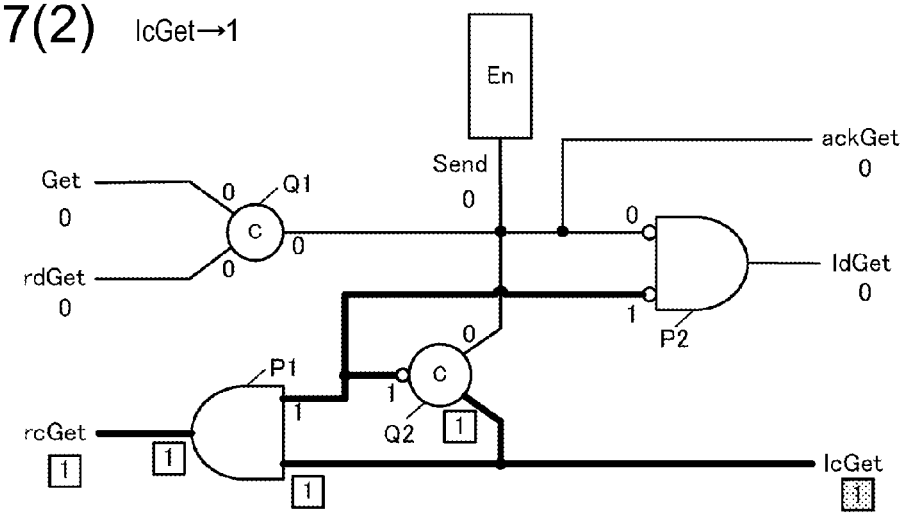
FIG. 7(3)  rdGet→1
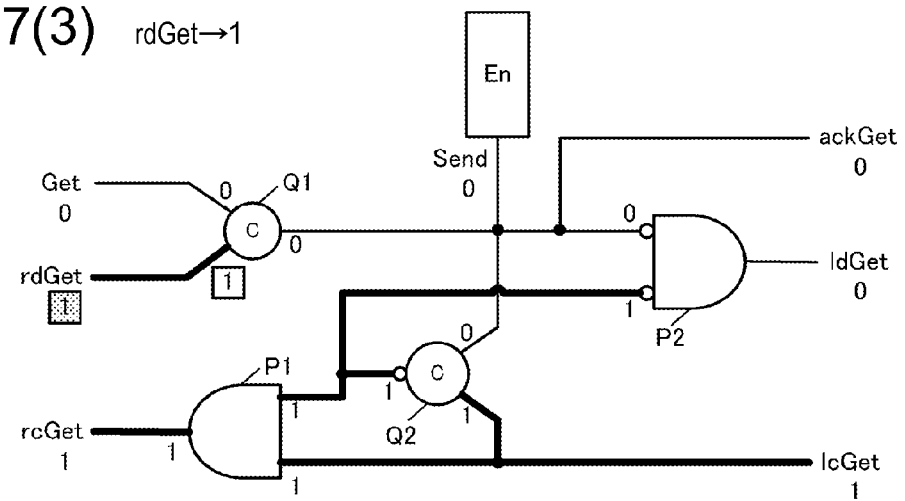

FIG. 8(1) Get→1
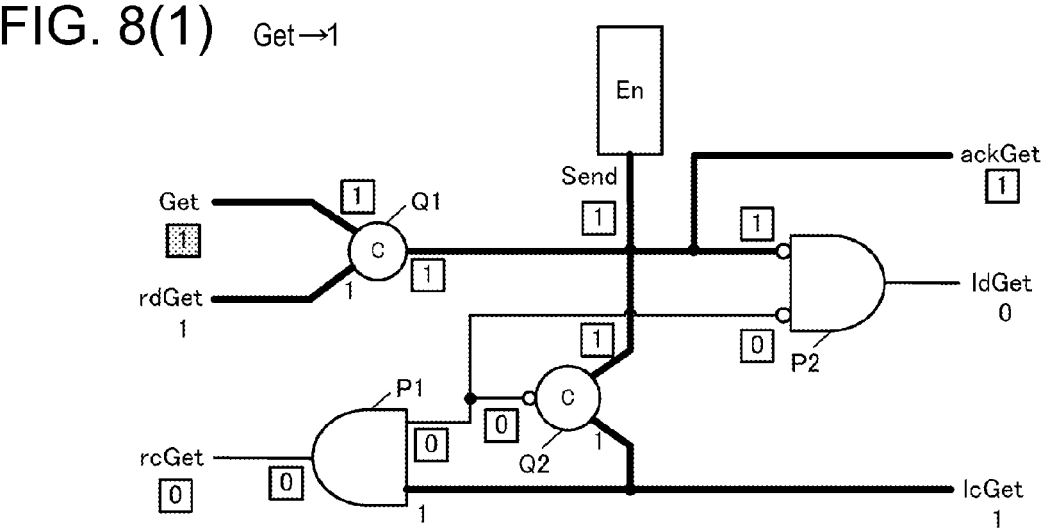
FIG. 8(2) rdGet→0
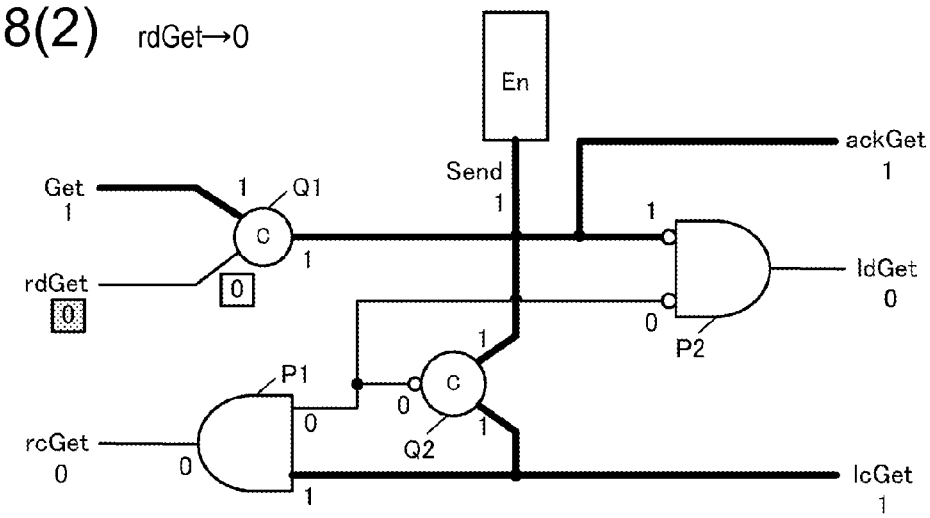
FIG. 8(3) Get→0
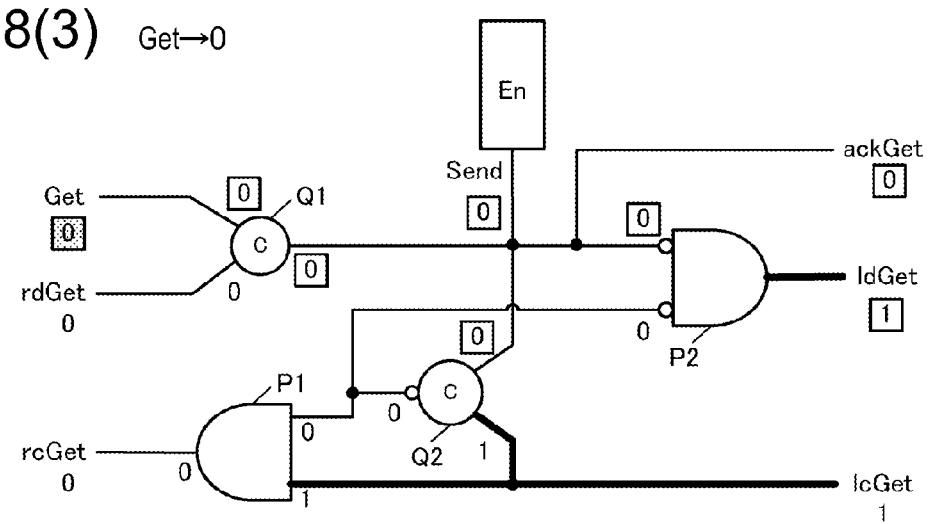

FIG.10(1) INITIAL STATE
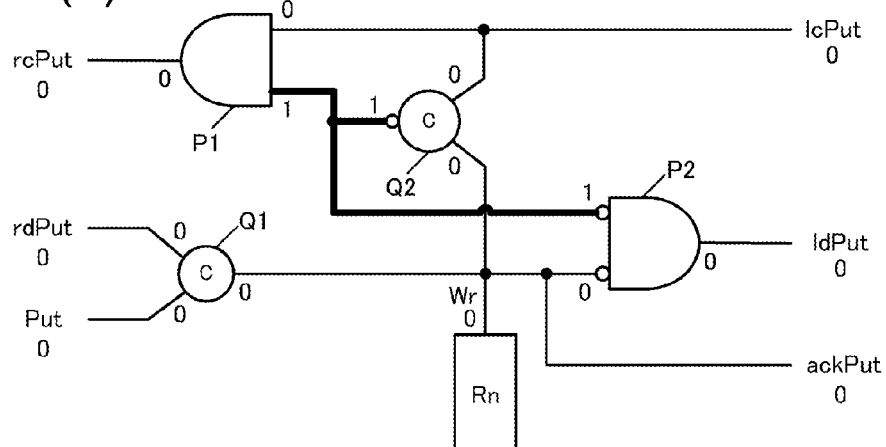
FIG.10(2) lcPut→1
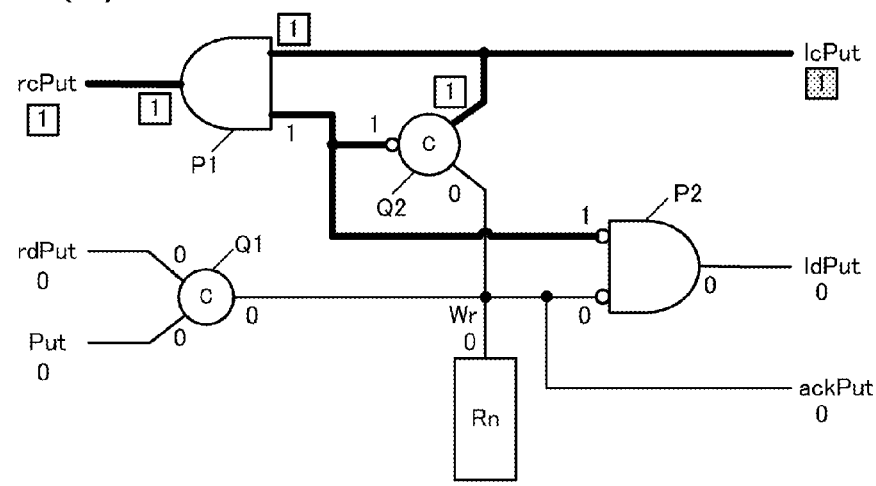
FIG.10(3) rdPut1→1
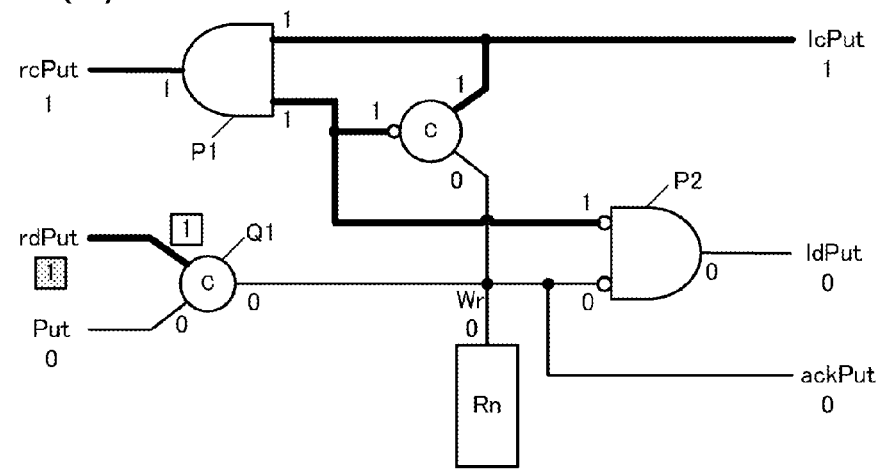

FIG.11(1) Put→1
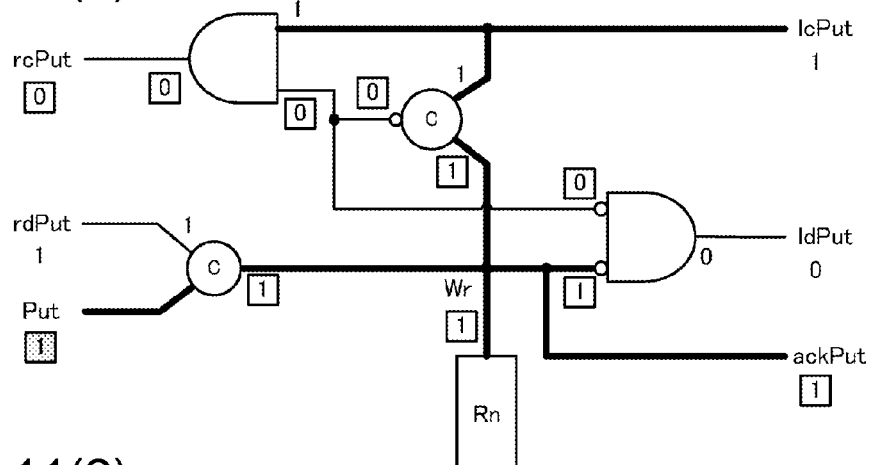
FIG.11(2) rdPut→0
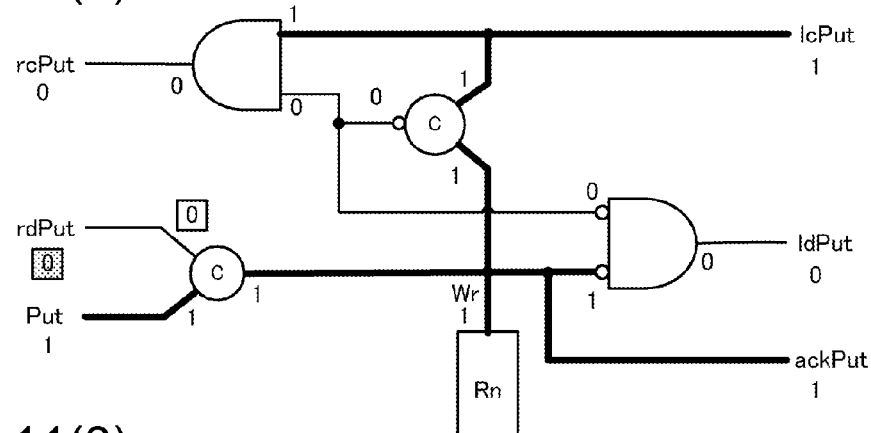
FIG.11(3) Put→0
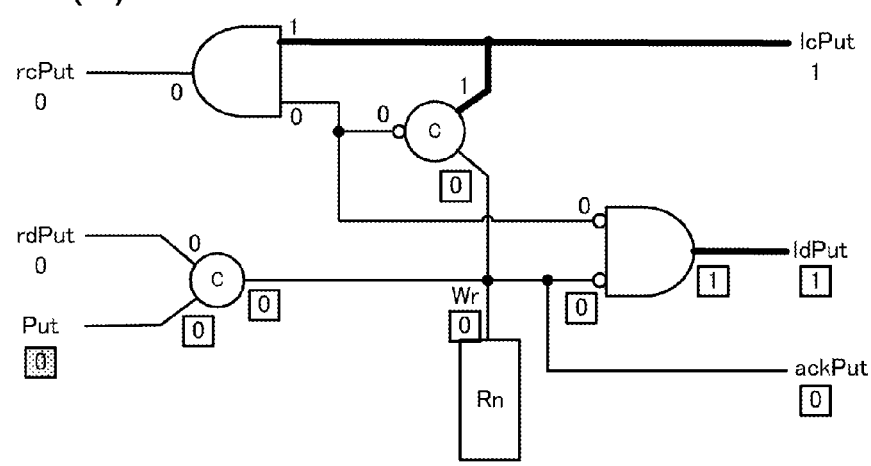

| SECOND ASYNCHRONOUS CORRELATION CIRCUIT | REPLICA DATA | | | | | | | | | | | |
|---|---|---|---|---|---|---|---|---|---|---|---|---|
| | C1 | C2 | C3 | C4 | C5 | C6 | C7 | C8 | C9 | C10 | C11 | ... |
| A | 1A | | | | | 2A | | | | | | |
| B | | | 1B | | | | 2B | | | | | |
| C | | | | 1C | | | | 2C | | | | |
| D | | | | | 1D | | | | 2D | | | |

FIG.14

REPLICA DATA READING
REGISTER MECHANISM (A)

REPLICA DATA READING
REGISTER MECHANISM (B)

REPLICA DATA READING
REGISTER MECHANISM (C)

REPLICA DATA READING
REGISTER MECHANISM (D)

| Pass | In | Tap | Out |
|------|----|----|-----|
| 1 | 0 | * | 0 |
| 1 | 0 | * | 0 |
| 1 | 1 | * | 1 |
| 1 | 1 | * | 1 |
| 0 | 0 | 0 | 0 |
| 0 | 0 | 1 | 1 |
| 0 | 1 | 0 | 1 |
| 0 | 1 | 1 | 0 |

1141

| PRN NUMBER (REPLICA ID) | FIRST LINEAR FEEDBACK REGISTER CIRCUIT | | SECOND LINEAR FEEDBACK REGISTER CIRCUIT | |
|---|---|---|---|---|
| | INITIAL VALUE b(1) (10 BITS) | CIRCUIT SET VALUE Pass(1) (9 BITS) | INITIAL VALUE b(2) (10 BITS) | CIRCUIT SET VALUE Pass(2) (9 BITS) |
| 1 | (1,0,1,···,0) | (0,0,1,···,0) | (0,0,1,···,1) | (1,1,0,···,0) |
| 2 | (0,1,0,···,1) | (0,0,0,···,1) | (1,1,0,···,1) | (0,0,0,···,0) |
| 3 | (1,1,1,···,0) | (1,0,1,···,0) | (0,1,1,···,0) | (0,1,1,···,1) |
| ⋮ | ⋮ | ⋮ | ⋮ | ⋮ |

ASYNCHRONOUS CORRELATION CIRCUIT, ASYNCHRONOUS FULL ADDER CIRCUIT, CALCULATION DEVICE, CORRELATION DEVICE, ASYNCHRONOUS MAXIMUM VALUE N DETECTION CIRCUIT, AND SATELLITE SIGNAL ACQUISITION DEVICE

Japanese Patent Application No. 2012-160507 filed on Jul. 19, 2012, Japanese Patent Application No. 2012-160508 filed on Jul. 19, 2012, and Japanese Patent Application No. 2012-160509 filed on Jul. 19, 2012, are hereby incorporated by reference in their entirety.

BACKGROUND

As a positioning system using positioning satellite signals, GPS (Global Positioning System) has been widely known and used for GPS receivers built in cellular phones, car navigation systems, etc. In GPS, location calculation of obtaining location coordinates and clock errors of a location calculation device is performed based on information of locations of a plurality of GPS satellites and pseudo distances from the respective GPS satellites to the GPS receiver.

The GPS satellite signals sent out from the GPS satellites are modulated using spread codes called C/A (Coarse and Acquisition) codes different from one GPS satellite to another. In order to acquire GPS satellite signals from weak received signals, the GPS receiver acquires GPS satellite signals by performing correlation calculation of the received signals and replica codes simulating the C/A codes.

For example, JP-A-2011-15159 has disclosed a correlation device that realizes correlation calculation of input signals and replica codes by arranging product-sum operators performing product-sum calculation of the input signals and the replica codes in parallel for product-sum calculation.

Recently, for realization of downsizing of electronic equipment containing the GPS receiver and prolonged driving using a battery, power saving of the GPS receiver has been required. In the GPS receiver, a correlation circuit has a higher operating rate and higher power consumption, and power saving of the correlation circuit has been desired.

Using the so-called deep submicron semiconductor technology, reduction of the power consumption using lower voltage and speeding up of the correlation calculation in the correlation circuit may be realized to some degree. However, the correlation circuit in related art is designed based on a synchronous design method and clock is essential, and there is a natural limit to reduction of the power consumption and speeding up of the calculation. For example, to realize speeding up of the calculation, it is necessary to raise the frequency of the clock for driving of the correlation circuit or parallelize the circuit, however, in this case, there is a problem that the power consumption increases in proportion to the frequency of the clock and the degree of the parallelization of the circuit.

Further, a full adder has been widely known as a calculator for addition of given input data. A full adder circuit including one-bit full adders connected in cascade arrangement is called ripple carry type and enables addition of data having arbitrary number of digits by connection of carry output from the lower digit to carry input of the higher digit (for example, JP-A-11-143684, JP-A-2004-265204).

The full adders for the number of digits of calculation are typically cascade-connected, and generally, the circuit size increases with increase of the number of digits. For example, in the case where a full adder circuit of cumulatively adding given input data is formed, full adders for the assumed number of digits as the final cumulative value are cascade-connected. However, as the number of digits of the final cumulative value is larger, the circuit size becomes larger. The increase of the circuit size leads to increase in power consumption and increase in cost, and is desirably suppressed as low as possible. Further, for example, in the case of a circuit having a higher operating rate and the smaller number of digits for one addition than the final cumulative value like the correlation circuit, requirement for reduction of the circuit size is stronger.

In addition, a circuit in related art including the full adder circuit is generally a synchronous type that operates in synchronization with a predetermined clock signal. The increase of the circuit size in the synchronous type also causes problems of larger current and clock skew of the clock signal. Moreover, above all, in the synchronous type, it may be impossible to speed up the circuit calculation to the higher speed than the clock frequency.

Furthermore, in related art, a circuit for detecting the maximum value from input data has been known. For example, JP-A-2004-73735 has disclosed a detection circuit for detecting the maximum value from input data. The maximum value detection circuit is to detect the maximum value in the input data by comparing magnitude between data supplied from an external system at each one clock and data stored in a register, and updating and storing data having the larger value in the register.

The detection circuit of the maximum value that has been known in related art is a synchronous detection circuit designed based on a synchronous design method. That is, a circuit block forming the detection circuit is designed to operate in synchronization with the clock signal.

However, in the synchronous circuit, there has been an issue that the problem of the larger current and clock skew of the clock signal occurs. Further, in addition, issues specific to the synchronous circuit that speeding up of the circuit operation to the higher speed than the clock frequency is not expectable and the power consumption of the entire circuit increases in proportion to the clock frequency are problematic.

SUMMARY

An aspect of the invention relates to an asynchronous correlation circuit including a first data supply unit that has a first dual-rail encoding part dual-rail-encoding first sequence data including an M-bit (M≥1) first data sequence, and supplies first data to be provided for next calculation at each time when calculation is completed, a second data supply unit that has a second dual-rail encoding part dual-rail-encoding second sequence data including a one-bit second data sequence, and supplies second data to be provided for next calculation at each time when calculation is completed, an addition result storage unit that stores an addition result, a third dual-rail encoding unit that dual-rail-encodes a storage value of the addition result storage unit, an asynchronous full addition unit that adds an output value from the first data supply unit to an output value of the third dual-rail encoding unit with a sign in response to an output value from the second data supply unit, and outputs the value, and a dual-rail decoding unit that decodes a dual-rail-encoded output value by the asynchronous full addition unit and outputs the value to the addition result storage unit.

Further, another aspect of the invention relates to an asynchronous full adder circuit including a first dual-rail encoding unit that dual-rail-encodes given input data, a storage unit that stores an input addition result, a second dual-rail encoding unit that dual-rail-encodes a storage value of the storage unit, an asynchronous full addition unit that includes M one-bit asynchronous full adders connected in cascade arrangement, and adds an output value of the first dual-rail encoding unit to an output value of the second dual-rail encoding unit and outputs an M-bit addition result with the highest digit as a sign bit, a dual-rail decoding unit that decodes a dual-rail-encoded output value by the asynchronous full addition unit and outputs the value to the storage unit, an overflow sensing unit that senses occurrence of overflow of the asynchronous full addition unit based on carry output of the one-bit asynchronous full adder at the highest digit and carry output of the one-bit asynchronous full adder at a digit lower by one digit than the highest digit of the asynchronous full addition unit, and a counter that counts the number of times of sensing of the overflow sensing unit by addition or subtraction according to the value of the sign bit.

Furthermore, another aspect of the invention relates to an asynchronous maximum value N detection circuit including N (N≥2) registers, N dual-rail encoders that dual-rail-encodes and outputs data stored in the registers in correspondence with the respective registers, a tournament-sort selection circuit that has (N−1) selection circuits arranged in a tournament sort, and selects the minimum output data among output data of the N dual-rail encoders, an input data dual-rail encoder that dual-rail-encodes and outputs given input data, a comparator that compares magnitude of the output data of the input data dual-rail encoder and the minimum output data selected by the tournament-sort selection circuit, and a control circuit that performs control of rewriting storage contents of the register storing the minimum output data to the output data of the input data dual-rail encoder if the output data of the input data dual-rail encoder is larger as a result of comparison by the comparator, wherein, when M (M≥N) pieces of input data are sequentially input to the input data dual-rail encoder, the higher N pieces of data of the M pieces of input data are stored in the register.

BRIEF DESCRIPTION OF THE DRAWINGS

FIGS. 7(1)-7(3) show shows explanatory diagrams of operations of the reading register mechanism.

FIGS. 8(1)-8(3) show explanatory diagrams of operations of the reading register mechanism.

FIGS. 10(1)-10(3) show explanatory diagrams of operations of the writing register mechanism.

FIGS. 11(1)-11(3) show explanatory diagrams of operations of the writing register mechanism.

FIG. 14 is an explanatory diagram of supply of replica data in a third asynchronous correlation circuit.

FIG. 20 shows an example of a data configuration of setting data.

DESCRIPTION OF EXEMPLARY EMBODIMENTS

Figure 1:
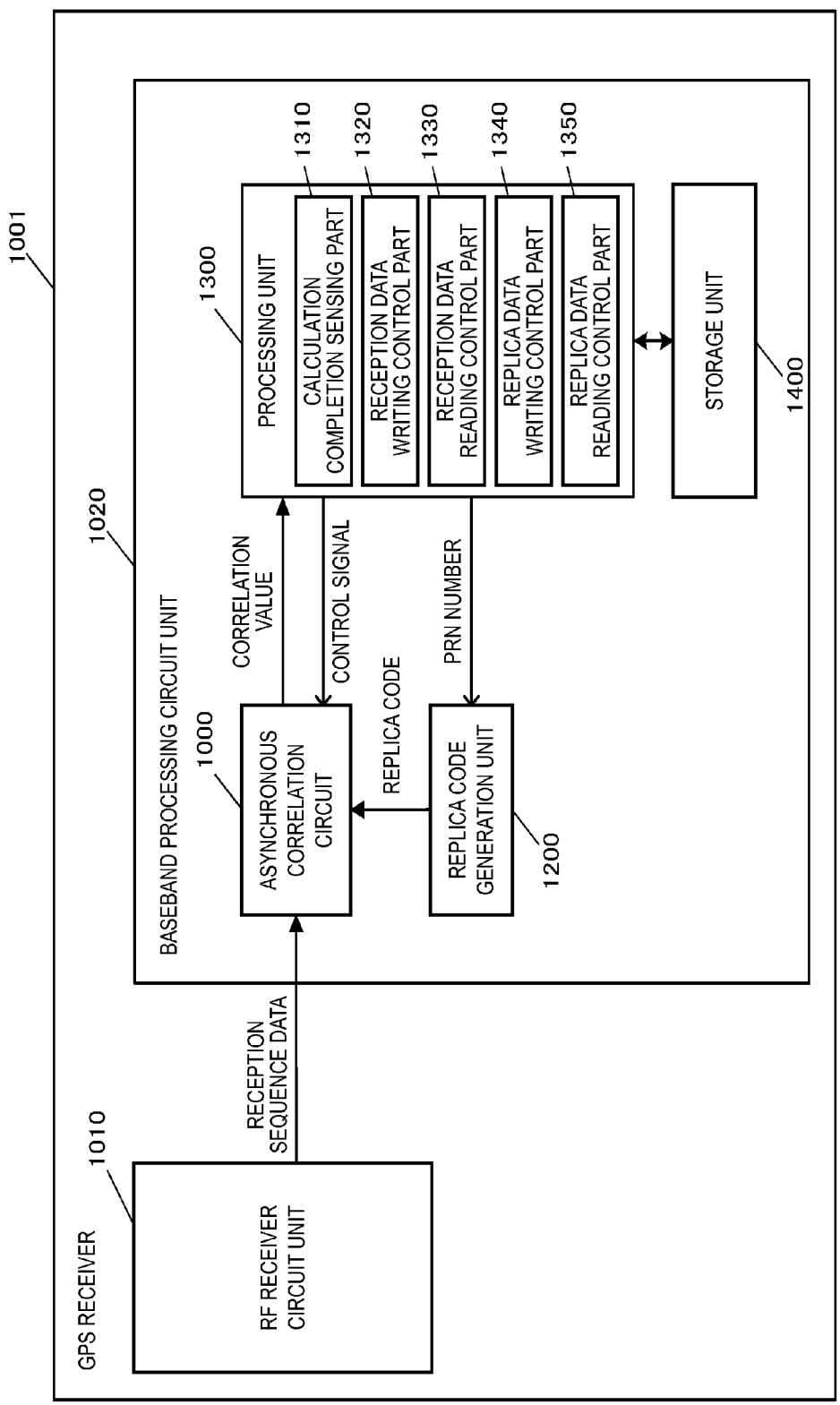
FIG. 1 is a block diagram showing an example of a functional configuration of a GPS receiver.

For solving the above described problems, the first embodiment is an asynchronous correlation circuit including a first data supply unit that has a first dual-rail encoding part dual-rail-encoding first sequence data including an M-bit (M≥1) first data sequence, and supplies first data to be provided for next calculation at each time when calculation is completed, a second data supply unit that has a second dual-rail encoding part dual-rail-encoding second sequence data including a one-bit second data sequence, and supplies second data to be provided for next calculation at each time when calculation is completed, an addition result storage unit that stores an addition result, a third dual-rail encoding unit that dual-rail-encodes a storage value of the addition result storage unit, an asynchronous full addition unit that adds an output value from the first data supply unit to an output value of the third dual-rail encoding unit with a sign in response to an output value from the second data supply unit, and outputs the value, and a dual-rail decoding unit that decodes a dual-rail-encoded output value by the asynchronous full addition unit and outputs the value to the addition result storage unit.

According to the first embodiment, the first sequence data is dual-rail-encoded by the first dual-rail encoding part of the first data supply unit. Further, the second sequence data is dual-rail-encoded by the second dual-rail encoding part of the second data supply unit. Then, the first data supply unit supplies the first data to be provided for the next calculation to the asynchronous full addition unit at each time when calculation of the asynchronous full addition unit is completed, and the second data supply unit supplies the second data to be provided for the next calculation to the asynchronous full addition unit at each time when calculation of the asynchronous full addition unit is completed. The asynchronous full addition unit adds an output value from the first data supply unit to a value obtained by dual-rail encoding of the storage value of the addition result with the sign in response to the output value from the second data supply unit, and outputs the value.

According to the configuration in which the asynchronous full addition unit inputs the dual-rail-encoded data, the asynchronous full addition unit may reliably sense arrival of valid data and perform calculation. In the asynchronous full addition unit, calculation of adding the first data to the latest addition result of the asynchronous full addition unit is performed. In this case, if the sign of the second data is positive, the first data is added (i.e., addition), if the sign of the second data is negative, the first data is added with the sign inverted (i.e., subtraction), and thereby, the correlation calculation may be correctly performed.

In the asynchronous correlation circuit of the embodiment, unlike a synchronous circuit following the worst case scenario in which the entire performance is determined by the circuit that operates most slowly because all circuits are driven by global signals (clock), the circuit follows the average case scenario in which only the necessary circuit in each case event-driven operates. Accordingly, the degree of parallelization may be formed to be higher by the circuit block having relatively small circuit granularity, and the high-speed circuit operation may be realized as the entire correlation circuit. Further, in the CMOS (Complementary Metal Oxide Semiconductor) logic, power in proportion to the gross number of times of switching is consumed, however, the semantically unnecessary switching operation is not performed, and significant power reduction may be realized.

Further, as the second embodiment, in the asynchronous correlation circuit of the first embodiment, the first data supply unit may have a group of first data registers that correspond to the respective first data and store the first data, the second data supply unit may have a group of second data registers that correspond to the respective second data and store the second data, the first dual-rail encoding part may have first dual-rail encoders that are respectively associated with the first data registers forming the group of first data registers and dual-rail-encode the first data stored in the first data registers, the second dual-rail encoding part may have second dual-rail encoders that are respectively associated with the second data registers forming the group of second data registers and dual-rail-encode the second data stored in the second data registers, the first data supply unit may have a first selection part that selects the first dual-rail encoder corresponding to the first data to be provided for the next calculation, and the second data supply unit may have a second selection part that selects the second dual-rail encoder corresponding to the second data to be provided for the next calculation.

According to the second embodiment, the first data supply unit has the group of first data registers, and the first data is stored in the corresponding first data registers among the first data registers forming the group of first data registers. Further, the first dual-rail encoders are provided in correspondence with the respective first data registers forming the group of first data registers. Accordingly, the first selection part selects the first dual-rail encoder corresponding to the first data to be provided for the next calculation, and thereby, the first data is dual-rail-encoded by the corresponding first dual-rail encoder and supplied to the asynchronous full adder. The same applies to the second data.

Furthermore, as the third embodiment, in the asynchronous correlation circuit of the second embodiment, the first selection part may have a first reading register mechanism adapted to be provided with reading token register stages communicating with each other according to four-phase hand-shaking protocol in correspondence with the respective first data so that a reading token may circulate among the reading token register stages, the reading register mechanism moving the reading token to the next reading token register stage at each time when calculation of the asynchronous full addition unit is completed, and may select the first dual-rail encoder corresponding to the first data to be provided for the next calculation based on the reading token, and the second selection part may have a second reading register mechanism adapted to be provided with reading token register stages communicating with each other according to four-phase hand-shaking protocol in correspondence with the respective second data so that a reading token may circulate among the reading token register stages, the reading register mechanism moving the reading token to the next reading token register stage at each time when calculation of the asynchronous full addition unit is completed, and may select the second dual-rail encoder corresponding to the second data to be provided for the next calculation based on the reading token.

According to the third embodiment, in the first reading register mechanism adapted so that the reading token may circulate among the reading token register stages, the reading register mechanism moving the reading token to the next reading token register stage at each time when calculation of the asynchronous full addition unit is completed, the reading token is moved to the next reading token register stage and the first dual-rail encoder corresponding to the first data to be provided for the next calculation is selected based on the reading token, and thereby, the first data to be provided for the next calculation may be easily selected. Further, in the first reading register mechanism, the reading token register stages communicate with each other according to four-phase handshaking protocol, and thus, the reading token register stages may grasp the operation states of each other and realize consistent circuit operation. In this case, the respective reading token register stages return to the original state in the process in which the reading token transitions.

The same applies to the second reading register mechanism.

Moreover, as the fourth embodiment, in the asynchronous correlation circuit of the second embodiment, the asynchronous full addition unit may have a group of tournament-sort full adders in which ($2^K-1$) asynchronous full adders for addition of $2^K$ (K is an integer number equal to or more than one) pieces of the first data are arranged in a tournament sort, the first selection part may have a first reading register mechanism adapted to be provided with reading token register stages communicating with each other according to four-phase hand-shaking protocol in correspondence with the respective first data so that a reading token may circulate among the reading token register stages, the respective reading token register stages associated with the first dual-rail encoders corresponding to the $2^K$ pieces of the first data to be calculated of the asynchronous full addition unit, the reading register mechanism moving the reading token to the next reading token register stage at each time when calculation of the asynchronous full addition unit is completed, and selects the first dual-rail encoder corresponding to the $2^K$ pieces of the first data to be provided for the next calculation based on the reading token, the second selection part may have a second reading register mechanism adapted to be provided with reading token register stages communicating with each other according to four-phase hand-shaking protocol in correspondence with the respective second data so that a reading token may circulate among the reading token register stages, the respective reading token register stages associated with the second dual-rail encoders corresponding to the $2^K$ pieces of the second data as a counterpart of correlation calculation, the reading register mechanism moving the reading token to the next reading token register stage at each time when calculation of the asynchronous full addition unit is completed, and may select the second dual-rail encoder corresponding to the $2^K$ pieces of the second data to be provided for the next calculation based on the reading token, of the group of tournament-sort full adders, each of the lowermost asynchronous full adders may add, to an output value of the first dual-rail encoder relating to one first data of two pieces of the first data to be calculated, an output value of the first dual-rail encoder relating to the other first data with a sign in response to an output value of the second dual-rail encoder according to two pieces of the second data as a counterpart of correlation calculation.

According to the fourth embodiment, the group of tournament-sort full adders in which ($2^K$−1) asynchronous full adders for addition of $2^K$ (K is an integer number equal to or more than one) pieces of the first data are arranged in the tournament sort is formed. In this case, like the third embodiment, using the so-called token passing scheme, the first data and the second data to be provided for the next calculation may be easily supplied to the asynchronous full addition unit respectively by $2^K$ pieces. In this case, depending on the sign of the second data as the counterpart of the correlation calculation, when calculation is performed by the lowermost asynchronous full adders of the group of tournament-sort full adders, not addition, but subtraction of two pieces of first data is necessary. Accordingly, the respective lowermost asynchronous full adders of the group of tournament-sort full adders add, to the output value of the first dual-rail encoder relating to one first data of the two pieces of the first data to be added, the output value of the first dual-rail encoder relating to the other first data with the sign in response to the output value of the second dual-rail encoder relating to the two pieces of the second data as the counterpart of correlation calculation.

In addition, as the fifth embodiment, the asynchronous correlation circuit of the second embodiment may further include a first writing register mechanism adapted so that a writing token may circulate among writing token register stages communicating with each other according to four-phase hand-shaking protocol, the writing register mechanism sequentially moving the writing token to the next writing token register stage and storing the first data in the first data register based on the writing token, and a second writing register mechanism adapted so that a writing token may circulate among writing token register stages communicating with each other according to four-phase hand-shaking protocol, the writing register mechanism sequentially moving the writing token to the next writing token register stage and storing the second data in the second data register based on the writing token.

According to the fifth embodiment, the first writing register mechanism for sequentially moving the writing token to the next writing token register stage and storing the first data to the corresponding first data register based on the writing token is used, and thereby, writing of the first data into the first data register may be easily performed. Further, in the first writing register mechanism, the writing register stages communicate with each other according to four-phase hand-shaking protocol, and thus, the writing token register stages may grasp the operation states of each other and realize consistent circuit operation. In this case, the respective writing register stages return to the original state in the process in which the writing token transitions.

The same applies to the second writing register mechanism.

Further, as the sixth embodiment, the second data supply unit in the asynchronous correlation circuit of the first embodiment may have an asynchronous data generator circuit that generates the second sequence data having a length of $2^L$−1 (L is an integer number equal to or more than three), and the asynchronous data generator circuit may have a first linear feedback shift register circuit in which L stages of first data register parts each formed with a one-bit data register part sandwiched between a dual-rail decoder and a dual-rail encoder and (L−1) stages of first exclusive OR circuits are linear-feedback-connected, a second linear feedback shift register circuit in which L stages of second data register parts each formed with a one-bit data register part sandwiched between a dual-rail decoder and a dual-rail encoder and (L−1) stages of second exclusive OR circuits are linear-feedback-connected, and a coupling part that couples an output value from the first linear feedback shift register circuit and an output value from the second linear feedback shift register circuit, wherein the second dual-rail encoding part may include dual-rail encoders of the first data register parts and dual-rail encoders of the second data register parts, the first linear feedback shift register circuit may be adapted to set respective first initial values of the first data register parts and the first exclusive OR circuits for execution of calculation of exclusive OR, and the second linear feedback shift register circuit may be adapted to set respective second initial values of the second data register parts and the second exclusive OR circuits for execution of calculation of exclusive OR.

According to the sixth embodiment, the second data supply unit has the asynchronous data generator circuit that generates the second sequence data having the length of $2^L$−1 (L is an integer number equal to or more than three). The asynchronous data generator circuit has the two linear feedback shift register circuits in which L stages of data register parts formed with one-bit data register parts sandwiched between the dual-rail decoders and the dual-rail encoders and (L−1) stages of exclusive OR circuits are linear-feedback-connected, and the second sequence data is generated by coupling of output values from the respective linear feedback shift register circuits. The second dual-rail encoding part includes the dual-rail encoder of the first data register part and the dual-rail encoder of the second data register part, and the second data forming the second sequence data is dual-railencoded and supplied to the asynchronous full addition unit. Further, the respective linear feedback shift register circuits are adapted to set the respective initial values of the data register parts and the exclusive OR circuits for execution of calculation of exclusive OR. By appropriate settings, the asynchronous data generator circuit may appropriately generate the second sequence data.

In this case, it is advantageous that, like the seventh embodiment, the second data supply unit in the asynchronous correlation circuit of the sixth embodiment has a setting part that performs setting of the first initial values and the first exclusive OR circuits in response to the second sequence data generated by the asynchronous data generator circuit, and performs setting of the second initial values and the second exclusive OR circuits in response to the second sequence data.

According to the seventh embodiment, the second data supply unit has the setting part that performs setting of the first initial values and the first exclusive OR circuits in response to the second sequence data generated by the asynchronous data generator circuit, and performs setting of the second initial values and the second exclusive OR circuits in response to the second sequence data. Thereby, even when a plurality pieces of sequence data different as the second sequence data exist, setting of the initial values and the exclusive OR circuits in response to the sequence data desired to be generated is performed, and the desired second sequence data may be generated by the asynchronous data generator circuit.

Furthermore, as the eighth embodiment, the asynchronous correlation circuit of any one of the first to seventh embodiments may be an asynchronous circuit that calculates correlation values of received signals and replica codes, wherein the first sequence data may be sequence data obtained by sampling of the received signals from a satellite in a temporal sequence, and the second sequence data may be sequence data obtained by sampling of the replica codes of the satellite in a temporal sequence.

According to the eighth embodiment, the asynchronous correlation circuit that performs correlation calculation of the received signals and replica codes from the satellite may be realized.

The ninth embodiment is an asynchronous full adder circuit including a first dual-rail encoding unit that dual-rail-encodes given input data, a storage unit that stores an input addition result, a second dual-rail encoding unit that dual-rail-encodes a storage value of the storage unit, an asynchronous full addition unit that includes M one-bit asynchronous full adders connected in cascade arrangement, and adds an output value of the first dual-rail encoding unit to an output value of the second dual-rail encoding unit and outputs an M-bit addition result with the highest digit as a sign bit, a dual-rail decoding unit that decodes the dual-rail-encoded output value by the asynchronous full addition unit and outputs the value to the storage unit, an overflow sensing unit that senses occurrence of overflow of the asynchronous full addition unit based on carry output of the one-bit asynchronous full adder at the highest digit and carry output of the one-bit asynchronous full adder at a digit lower by one digit than the highest digit of the asynchronous full addition unit, and a counter that counts the number of times of sensing of the overflow sensing unit by addition or subtraction according to the value of the sign bit.

According to the ninth embodiment, the given input data is dual-rail-encoded by the first dual-rail encoding unit. Further, the storage value of the storage unit is dual-rail-encoded by the second dual-rail encoding unit. The asynchronous full addition unit includes the M one-bit asynchronous full adders connected in cascade arrangement, and adds the output value of the first dual-rail encoding unit to the output value of the second dual-rail encoding unit and outputs the M-bit addition result with the highest digit as the sign bit. The dual-rail encoded output value by the asynchronous full addition unit is decoded by the dual-rail decoding unit and output to the storage unit.

The overflow sensing unit senses occurrence of overflow of the asynchronous full addition unit based on the carry output of the one-bit asynchronous full adder at the highest digit and carry output of the one-bit asynchronous full adder at the digit lower by one digit than the highest digit of the asynchronous full addition unit. The counter counts the number of times of sensing of the overflow sensing unit by addition or subtraction according to the value of the sign bit. If the value of the sign bit is a bit value representing a positive value, the number of times of sensing is added and, if the value of the sign bit is a bit value representing a negative value, the number of times of sensing is subtracted, and thereby, even when overflow occurs in either a positive range of number or a negative range of number, the count value may be appropriately obtained.

The cumulative value may be correctly calculated from the storage values of the storage unit with the number of one-bit asynchronous full adders and the count value of the counter. Accordingly, the full adders for the assumed number of digits as the final cumulative value are not necessarily required, and the number of cascade-connected full adders may be reduced, and thereby, the cumulative addition of the higher number of digits may be performed while the circuit size is reduced. Further, the asynchronous full adder circuit of the embodiment is asynchronously activated, and there is no upper-limit speed for the operation due to the clock signal and the high-speed operation may be performed. Furthermore, the clock signal is unnecessary, and power with the clock signal is unnecessary.

Moreover, as the tenth embodiment, the overflow sensing unit in the asynchronous full adder circuit of the ninth embodiment may sense occurrence of overflow based on exclusive OR of the carry output of the one-bit asynchronous full adder at the highest digit and the carry output of the one-bit asynchronous full adder at the digit lower by one digit than the highest digit of the asynchronous full addition unit.

In the numerical representation with signs, the carry output from the one-bit asynchronous full adder corresponding to two bits of MSB (Most Significant Bit) is used, and thereby, the occurrence of overflow may be sensed. That is, when overflow occurs, the carry output of the one-bit asynchronous full adder at the highest digit and the carry output of the one-bit asynchronous full adder at the digit lower by one digit than the highest digit of the asynchronous full addition unit take different values. Accordingly, like the second embodiment, sensing of overflow may be easily and appropriately performed based on the exclusive OR of the carry output of the one-bit asynchronous full adder at the highest digit and the carry output of the one-bit asynchronous full adder at the digit lower by one digit than the highest digit.

In addition, as the eleventh embodiment, the asynchronous full adder circuit of the ninth or tenth embodiment may further include a calculation completion sensing unit that senses calculation completion of all of the one-bit asynchronous full adders, wherein the overflow sensing unit may sense occurrence of overflow based on carry output of the one-bit asynchronous full adder at the highest digit and carry output of the one-bit asynchronous full adder at a digit lower by one digit than the highest digit when sensing by the calculation completion sensing unit is performed.

According to the eleventh embodiment, the calculation completion sensing unit senses calculation completion of all one-bit asynchronous full adders. Then, the overflow sensing unit senses occurrence of overflow based on the carry output of the one-bit asynchronous full adder at the highest digit and the carry output of the one-bit asynchronous full adder at the digit lower by one digit than the highest digit when sensing by the calculation completion sensing unit is performed. Thereby, occurrence of overflow may be sensed at appropriate times in consideration of differences of individual operation times of the one-bit asynchronous full adders.

Further, as the twelfth embodiment, the asynchronous correlation circuit may include a third dual-rail encoding unit that dual-rail-encodes given one-bit data, and the asynchronous full adder circuit of any one of the ninth to eleventh embodiments, wherein the asynchronous full addition unit may add an output value of the first dual-rail encoding unit to an output value of the second dual-rail encoding unit with a sign in response to an output value of the third dual-rail encoding unit, and thereby, the asynchronous full adder circuit may calculate a correlation value of the given input data and the given one-bit data.

According to the twelfth embodiment, the given one-bit data is dual-rail-encoded by the third dual-rail encoding unit. Then, the asynchronous full addition unit of the asynchronous full adder circuit adds the output value of the first dual-rail encoding unit to the output value of the second dual-rail encoding unit with the sign in response to the output value of the third dual-rail encoding unit, and thereby, the asynchronous full adder circuit calculates the correlation value of the given input data and the given one-bit data. That is, the asynchronous correlation circuit that asynchronously operates may be formed using the asynchronous full adder circuit of the above described embodiments.

Furthermore, as the thirteenth embodiment, a calculation device may include the asynchronous full adder circuit of any one of the ninth to eleventh embodiments, and a calculation unit that calculates a cumulative addition value in the asynchronous full adder circuit using the number of one-bit asynchronous full adders M, a count value of the counter, and a storage value of the storage unit.

According to the thirteenth embodiment, the calculation device including the asynchronous full adder circuit of the above described embodiments, and calculating the cumulative addition value in the asynchronous full adder circuit using the number of one-bit asynchronous full adders M, the count value of the counter, and the storage value of the storage unit of the asynchronous full adder circuit may be formed.

Furthermore, as the fourteenth embodiment, a correlation device may include the asynchronous correlation circuit of the twelfth embodiment, and a calculation unit that calculates a cumulative addition value in the asynchronous full adder circuit as a correlation value of the given input data and the given one-bit data using the number of one-bit asynchronous full adders M, a count value of the counter, and a storage value of the storage unit.

According to the fourteenth embodiment, the correlation device including the asynchronous correlation circuit of the above described embodiment, and calculating the cumulative addition value in the asynchronous full adder circuit as the correlation value of the given input data and the given one-bit data using the number of one-bit asynchronous full adders M, the count value of the counter, and the storage value of the storage unit of the asynchronous correlation circuit may be formed.

The fifteenth embodiment is an asynchronous maximum value N detection circuit including N (N 2) registers, N dual-rail encoders that dual-rail-encode and output data stored in the registers in correspondence with the respective registers, a tournament-sort selection circuit that has (N−1) selection circuits arranged in a tournament sort, and selects the minimum output data among output data of the N dual-rail encoders, an input data dual-rail encoder that dual-rail-encodes and outputs given input data, a comparator that compares magnitude of output data of the input data dual-rail encoder and the minimum output data selected by the tournament-sort selection circuit, and a control circuit that performs control of rewriting storage contents of the register storing the minimum output data to output data of the input data dual-rail encoder if the output data of the input data dual-rail encoder is larger as a result of comparison by the comparator, wherein, when M (M≥N) pieces of input data are sequentially input to the input data dual-rail encoder, the higher N pieces of data of the M pieces of input data are stored in the register.

According to the fifteenth embodiment, the data stored in the N (N≥2) registers are dual-rail-encoded by the respectively corresponding N dual-rail encoders. The minimum output data is selected among the output data of the N dual-rail encoders by the tournament-sort selection circuit. By the (N−1) selection circuits arranged in the tournament sort, the minimum output data among the data stored in the registers may be easily selected.

On the other hand, the given input data is dual-rail-encoded by the input data dual-rail encoder, and the magnitude of the output data of the input data dual-rail encoder and the minimum output data selected by the tournament-sort selection circuit are compared by the comparator. Then, if the output data of the input data dual-rail encoder is larger as the result of the comparison by the comparator, the control of rewriting the storage contents of the register storing the minimum output data to output data of the input data dual-rail encoder is performed by the control circuit. In this case, when M (M≥N) pieces of input data are sequentially input to the input data dual-rail encoder, the higher N pieces of data with the maximum value of the M pieces of input data as the top value are stored in the registers. Therefore, according to the above described configuration, data of the maximum N values of the M pieces of input data may be detected.

The maximum value N detection circuit of the embodiment is an asynchronous circuit. When the maximum value N detection circuit is formed based on a synchronous design method, the circuit follows the worst case scenario in which the entire performance is determined by the circuit that operates most slowly because all circuits are driven by clock signals. However, the maximum value N detection circuit of the embodiment is the asynchronous detection circuit employing the dual-rail encoding method and follows the average case scenario in which only the necessary circuit in each case event-driven operates, and the high-speed circuit operation may be realized as the entire maximum value N detection circuit. Further, the clock signal is unnecessary, and the power consumption may be reduced as the entire circuit.

Further, as the sixteenth embodiment, the control circuit in the asynchronous maximum value N detection circuit of the fifteenth embodiment may determine the register storing the minimum output data based on respective selection results of the (N−1) selection circuits.

According to the sixteenth embodiment, the control circuit may easily and appropriately determine the register storing the minimum output data by referring to the respective selection results of the (N−1) selection circuits.

Furthermore, as the seventeenth embodiment, the asynchronous maximum value N detection circuit of the fifteenth or sixteenth embodiment may further include N absolute value calculators that are provided between the registers and the dual-rail encoders, and calculate absolute values of data stored in the registers and output the values to the dual-rail encoders.

According to the seventeenth embodiment, the absolute value calculators are provided between the registers and the dual-rail encoders, and the absolute values of data stored in the registers are dual-rail-encoded and supplied to the tournament-sort selection circuit. Thereby, in the tournament-sort selection circuit, the data having the minimum absolute value of the data stored in the registers is selected. As a result, the higher N pieces of data with the data having the largest absolute value of the M pieces of input data as the top data may be stored in the registers.

Moreover, as the eighteenth embodiment, in the asynchronous maximum value N detection circuit of any one of the fifteenth to seventeenth embodiments, the dual-rail encoders and the input data dual-rail encoder may execute operation of dual-rail encoding according to an operation command signal from an external system, the control circuit may output a control operation completion signal to the external system, and communication with the external system according to the operation command signal and the control operation completion signal may be realized by four-phase hand-shaking protocol.

According to the eighteenth embodiment, the dual-rail encoders and the input data dual-rail encoder execute operation of dual-rail encoding according to the operation command signal from the external system. Further, the control circuit outputs the control operation completion signal to the external system. In the embodiment, the communication with the external system according to the operation command signal and the control operation completion signal is realized by four-phase hand-shaking protocol, and the control circuit and the external system may grasp the operation states of each other and realize consistent circuit operation.

In addition, as the nineteenth embodiment, a satellite signal acquisition device may include a correlation circuit that performs correlation calculation of received signals obtained by reception of satellite signals and replica codes, the asynchronous maximum value N detection circuit according to the fifteenth to eighteenth embodiments using data of correlation values by the correlation circuit as the input data, and an acquisition unit that acquires the satellite signals using data stored in the registers of the asynchronous maximum value N detection circuit.

According to the nineteenth embodiment, the correlation circuit performs correlation calculation of received signals obtained by reception of satellite signals and replica codes. Then, the data of correlation values by the correlation circuit is input to the asynchronous maximum value N detection circuit of the above described embodiment as input data. Thereby, the maximum N values of the data of the correlation values may be detected. Then, the acquisition unit acquires the satellite signals using data stored in the registers of the asynchronous maximum value N detection circuit, i.e., the correlation values of the detected maximum N values.

1. First Embodiment

As below, an example of preferred embodiments to which the invention is applied will be explained with reference to the drawings. The embodiment is an embodiment of application of GPS as a kind of the satellite positioning system. It is obvious that the embodiment to which the invention may be applied is not limited to the embodiments to be explained.

FIG. 1 is a block diagram showing an example of a functional configuration of a GPS receiver 1001 as a kind of a satellite signal receiving device that receives GPS satellite signals. The GPS receiver 1001 is a device adapted to calculate a location by acquiring GPS satellite signals from RF (Radio Frequency) signals received by a GPS antenna (not shown) and using the acquired GPS satellite signals.

The GPS receiver 1001 includes an RF receiver circuit unit 1010 and a baseband processing circuit unit 1020. Note that the RF receiver circuit unit 1010 and the baseband processing circuit unit 1020 may be manufactured as respective separate LSIs (Large Scale Integrations) or manufactured as one chip.

The RF receiver circuit unit 1010 has a receiver circuit that receives RF signals output from the GPS antenna and an A/D converter circuit that performs A/D conversion by sampling the received signals (analog signals) at given sampling time intervals, and outputs the received signals as reception sequence data.

In the first embodiment, the explanation will be made assuming that N received signals for one millisecond are sampled and N pieces of reception data D1 to DN are obtained. Further, the explanation will be made assuming that the reception data D1 to DN are converted into M-bit (M≤1) digital data by quantization. In the first embodiment, the number of the reception data is shown using "i". That is, "Di" refers to the ith reception data. The reception data corresponds to the first data.

The baseband processing circuit unit 1020 acquires GPS satellite signals by removing carrier wave (carrier) and performing correlation calculation or the like on the received sequence data output from the RF receiver circuit unit 1010. Then, the unit calculates the location and the clock errors using time information, satellite orbit information, etc. extracted from the acquired GPS satellite signals.

In the first embodiment, the baseband processing circuit unit 1020 includes an asynchronous correlation circuit 1100, a replica code generation unit 1200, a processing unit 1300, and a storage unit 1400 as major components.

The asynchronous correlation circuit 1100 is an asynchronous type correlation circuit that performs correlation calculation of the reception sequence data as first sequence data output from the RF receiver circuit unit 1010 and replica codes as second sequence data generated by the replica code generation unit 1200. The configuration and operation of the asynchronous correlation circuit 1100 will be explained later in detail in the first working example to the fourth working example.

The replica code generation unit 1200 is a circuit that generates replica codes as pseudo codes simulating the C/A codes as spread codes of the GPS satellite signals. According to a PRN number (satellite number) output from the processing unit 1300, the replica code generation unit 1200 generates the replica codes relating to the GPS satellite to which the PRN number has been assigned. The replica code generation unit 1200 includes an oscillator such as a code NCO (Numerical Controlled Oscillator).

In the first embodiment, the replica codes are sampled at the same sampling rate as that for the received signals. Specifically, the replica codes for one millisecond are sampled as the N pieces of replica data C1 to CN in the same number as that of the reception data. In the first embodiment, the number of the replica data is shown using "j". That is, "Cj" refers to the jth replica data. The replica data is shown by on bit of "0" or "1". The replica data corresponds to the second data.

The processing unit 1300 is a control device and a calculation device for general control of the respective functional parts of the baseband processing circuit unit 1020, and includes a processor such as a CPU (Central Processing Unit) or a DSP (Digital Signal Processor).

The processing unit 1300 has a calculation completion sensing part 1310, a reception data writing control part 1320, a reception data reading control part 1330, a replica data writing control part 1340, and a replica data reading control part 1350 as major functional parts relating to the first embodiment. These functional parts will be described later.

The storage unit 1400 stores system programs of the baseband processing circuit unit 1020, various programs and data for realization of various functions including a satellite acquisition and tracking control function and a location calculation function, etc. Further, the unit has a work area for temporary storage of data in processing, processing results etc. of various kinds of processing.

Figure 2:
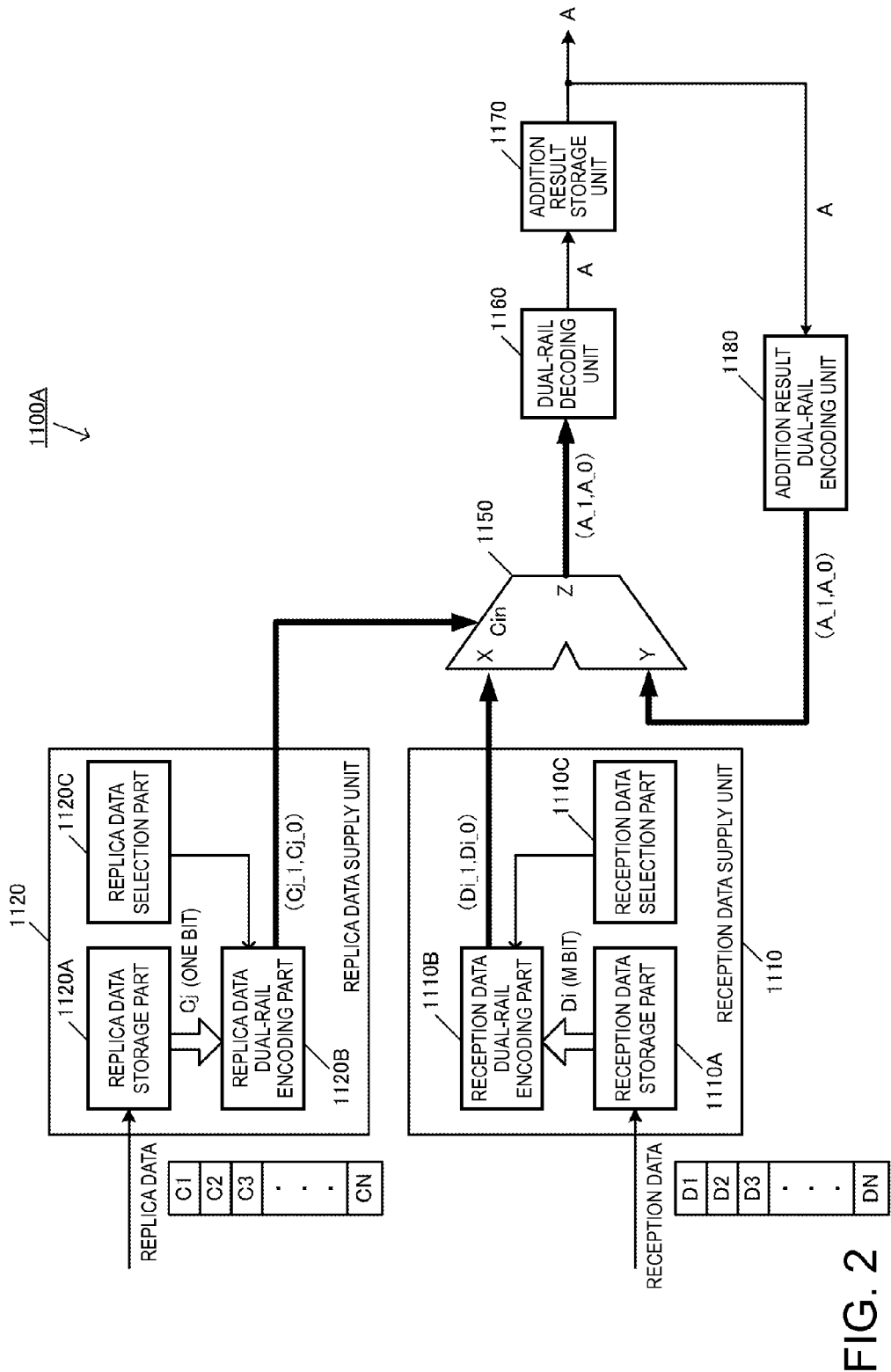
FIG. 2 shows an example of a circuit configuration of a first asynchronous correlation circuit.

1-1. First Working Example 1-1-1. Configuration of Asynchronous Correlation Circuit FIG. 2 shows an example of a circuit configuration of a first asynchronous correlation circuit 1100A in the first working example. In the drawings for reference, flows of dual-rail-encoded data are shown by thick lines for distinction from non-dual-rail-encoded data.

The first asynchronous correlation circuit 1100A has a reception data supply unit 1110, a replica data supply unit 1120, an asynchronous full addition unit 1150, a dual-rail decoding unit 1160, an addition result storage unit 1170, and an addition result dual-rail encoding unit 1180.

The reception data supply unit 1110 is a data supply unit that supplies reception data to be provided for the next calculation at each time when calculation of the asynchronous full addition unit 1150 is completed among the M-bit reception data obtained by sampling of the reception sequence data output from the RF receiver circuit unit 1010 in a temporal sequence. The reception data supply unit 1110 includes a reception data storage part 1110A, a reception data dual-rail encoding part 1110B, and a reception data selection part 1110C.

The reception data storage part 1110A is a storage circuit that stores the M-bit reception data forming the reception sequence data output from the RF receiver circuit unit 1010. In the first working example, the reception data storage part 1110A has a group of reception data registers that respectively correspond to the reception data and store the reception data.

The reception data dual-rail encoding part 1110B dual-rail-encodes the reception data output from the reception data storage part 1110A according to a dual-rail encoding method. In the first working example, the reception data dual-rail encoding part 1110B has dual-rail encoders respectively corresponding to the reception data registers forming the reception data storage part 1110A. The reception data dual-rail encoding part 1110B corresponds to the first dual-rail encoding unit.

The reception data selection part 1110C has a reception data reading register mechanism that moves a reading token to the next reading token register stage at each time when the calculation of the asynchronous full addition unit 1150 is completed, and selects the reception data dual-rail encoder corresponding to the reception data to be provided for the next calculation based on the reading token and sequentially supplies the reception data to the asynchronous full addition unit 1150.

The replica data supply unit 1120 is a data supply unit that supplies replica data to be provided for the next calculation at each time when the calculation of the asynchronous full addition unit 1150 is completed among the one-bit replica data obtained by sampling of the replica codes output from the replica code generation unit 1200 in a temporal sequence. The replica data supply unit 1120 includes a replica data storage part 1120A, a replica data dual-rail encoding part 1120B, and a replica data selection part 1120C.

The replica data storage part 1120A is a storage device that stores replica data forming the replica codes output from the replica code generation unit 1200. In the first working example, the replica data storage part 1120A has a group of replica data registers that respectively correspond to the replica data and store the replica data.

The replica data dual-rail encoding part 1120B is an encoding part that dual-rail-encodes the replica data output from the replica data storage part 1120A according to a dual-rail encoding method. In the first working example, the replica data dual-rail encoding part 1120B has dual-rail encoders respectively corresponding to the replica data registers forming the replica data storage part 1120A. The replica data dual-rail encoding part 1120B corresponds to the second dual-rail encoding unit.

The replica data selection part 1120C has a replica data reading register mechanism that moves a reading token to the next reading token register stage at each time when the calculation of the asynchronous full addition unit is completed. Then, the part selects the replica data dual-rail encoder corresponding to the replica data to be provided for the next calculation based on the reading token, and sequentially supplies the replica data to the asynchronous full addition unit 1150.

Table 1 shows a truth table of the dual-rail encoding method.

TABLE 1

|  | b__1 | b__0 |
|---|---|---|
| Null | 0 | 0 |
| 0 | 0 | 1 |
| 1 | 1 | 0 |
| Inhibit | 1 | 1 |

The dual-rail encoding method is a method of representing one-bit data b using a pair of two signal lines "(b__1, b__0)". "b__1" corresponds to a positive signal line and "b__0" corresponds to a negative signal line. The state in which "(b__1, b__0)" is (0, 0) is called Null and used for delimitation of data. The state of "(0, 1)" expresses "0" and the state of "(1, 0)" expresses "1". Further, the state of "(1, 1)" is called Inhibit and the value is an improper value that is impossible to be taken in operation.

In the asynchronous circuit, input and output of data between the circuit blocks are performed using the data dual-rail-encoded according to the dual-rail encoding method. The input and output of data are performed using the valid code word "1" or "0". The invalid code word "Null" is used at non-calculation time and for delimitation of respective data. If the same valid code word are continuously transmitted, it is impossible to identify the delimitation of data at the reception side, and identification of the valid code words is enabled by alternating transmission of the valid code words and the invalid code words.

The asynchronous full addition unit 1150 adds the output value from the reception data supply unit 1110 to the output value of the addition result dual-rail encoding unit 118 with a sign in response to the output value from the replica data supply unit 1120 and outputs the value. The asynchronous full addition unit 1150 has a first input port X, a second input port Y, a carry input port Cin, and an output port Z.

To the first input port X, the reception data "(Di_1,Di_0)" dual-rail-encoded by the reception data dual-rail encoding part 1110B is input.

To the second input port Y, the product-sum calculation value "(A_1,A_0)" of the asynchronous full addition unit 1150 dual-rail-encoded by the addition result dual-rail encoding unit 1180 is feedback-input.

To the carry input port Cin, the replica data "(Cj_1,Cj_0)" dual-rail-encoded by the replica data dual-rail encoding part 1120B is input.

Each reception data Dj is M-bit data. On the other hand, the replica data Cj is one-bit data. The asynchronous full addition unit 1150 uses the one-bit replica data Cj as carry input and adds the reception data Di to the latest product-sum calculation value A of the asynchronous full addition unit 1150 with a sign in response to the replica data Cj. The reception data Di and the replica data Cj are sequentially supplied to the asynchronous full addition unit 1150, and thereby, product-sum calculation of the reception data Di and the replica data Cj is performed in the asynchronous full addition unit 1150.

The dual-rail decoding unit 1160 decodes the product-sum calculation value A output from the asynchronous full addition unit 1150 according to the dual-rail encoding method. In the asynchronous full addition unit 1150, calculation using the dual-rail-encoded bit value is performed and the calculation result is also dual-rail-encoded, and thereby, the product-sum calculation value A is decoded according to the true table of Table 1 and output to the addition result storage unit 1170.

The addition result storage unit 1170 is a storage circuit that stores the product-sum calculation value A decoded by the dual-rail decoding unit 1160, and is formed as an accumulator, for example. The product-sum calculation value A stored in the addition result storage unit 1170 is output to the processing unit 1300 and feedback-output to the addition result dual-rail encoding unit 1180.

The addition result dual-rail encoding unit 1180 is a dual-rail encoder that dual-rail-encodes the product-sum calculation value A input from the addition result storage unit 1170. The dual-rail-encoded product-sum calculation value A is input to the second input port Y of the asynchronous full addition unit 1150. The addition result dual-rail encoding unit 1180 corresponds to the third dual-rail encoding unit.

Suppose that an amount of shift of the replica data with respect to the reception data is "k", a correlation value "Corr (k)" calculated in the asynchronous full addition unit 1150 is given by the following equation (1).

$$\text{Corr}(k) = \sum_{i=1}^{N} D(i) \cdot C(i+k) \quad (1)$$

For example, suppose that the amount of shift of the replica data is zero (k=0), the correlation value "Corr(0)" calculated by the asynchronous full addition unit 1150 is given by the following equation (2).

$$\text{Corr}(0) = D1 \cdot C1 + D2 \cdot C2 + D3 \cdot C3 + D4 \cdot C4 + \ldots + DN \cdot CN \quad (2)$$

In the processing unit 1300, the reception data reading control part 1330 performs control of sequentially reading out reception data to be provided for the next calculation among the reception data from the reception data registers at each time when the calculation completion sensing part 1310 senses completion of the calculation of the asynchronous full addition unit 1150, and outputs the reception data from the reception data dual-rail encoding part 1110B. Further, in conjunction with that, the replica data reading control part 1350 performs control of sequentially reading out replica data to be provided for the next calculation among the replica data from the replica data registers, and outputs the replica data from the replica data dual-rail encoding part 1120B.

The calculation completion sensing part 1310 senses the completion of the calculation by the asynchronous full addition unit 1150 based on a change of the product-sum calculation value A output from the addition result storage unit 1170. That is, when the product-sum calculation value A stored in the addition result storage unit 1170 is changed from the last value, the part judges that new single calculation has been completed in the asynchronous full addition unit 1150.

1-1-2. Configuration of Asynchronous Full Addition Unit

Figure 3:
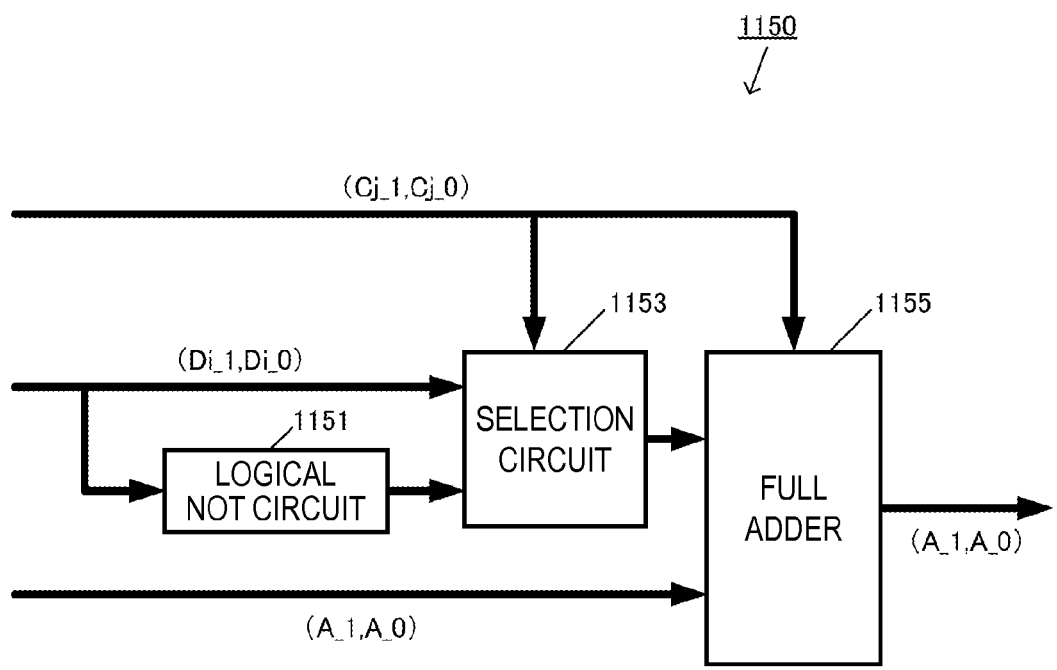
FIG. 3 shows an example of a circuit configuration of an asynchronous full addition unit.

FIG. 3 shows an example of a circuit configuration of the asynchronous full addition unit 1150. The asynchronous full addition unit 1150 includes a logical NOT circuit 1151, a selection circuit 1153, and a full adder 1155.

The logical NOT circuit 1151 is a circuit for logical negation of the dual-rail-encoded reception data input from the reception data dual-rail encoding part 1110B, and outputs a logical negation result to the selection circuit 1153.

The selection circuit 1153 is a circuit for alternative selection of the reception data output from the reception data dual-rail encoding part 1110B and the reception data logically negated by the logical NOT circuit 1151 based on the dual-rail-encoded replica data input from the replica data dual-rail encoding part 1120B. The selection circuit 1153 outputs the selected reception data to the full adder 1155.

If the input replica data Cj is "0", the selection circuit 1153 selects the reception data output from the reception data dual-rail encoding part 1110B and outputs the data to the full adder 1155. On the other hand, if the input replica data Cj is "1", the logically negated reception data output from the logical NOT circuit 1151 is selected and output to the full adder 1155.

In the logical NOT circuit 1151, one's compliment of the reception data is calculated. By addition of "1" of the replica data to the calculation result, two's completion of the reception data is obtained. By addition of two's completion of subtrahend to minuend, subtraction is realized. The subtrahend in this case is the reception data Di and the minuend is the product-sum calculation value A. Therefore, if the replica data Cj is "1", in the full adder 1155, the reception data Di with the reversed sign is added to (subtracted from) the latest product-sum calculation value A. On the other hand, if the replica data Cj is "0", in the full adder 1155, the reception data Di with the sign not reversed is added to the latest product-sum calculation value A.

That is, the asynchronous full addition unit 1150 may be a calculation unit that performs addition or subtraction of the reception data Di to the product-sum calculation value A depending on whether the replica data Cj is "0" or "1" based on the two's complement representation.

1-1-3. Configuration of Register Mechanism

The reception data selection part 1110C has the reception data reading register mechanism as a mechanism for sequentially switching and selecting the reception data to be provided for the next calculation among the reception sequence data at each time when the calculation completion sensing part 1310 senses completion of the calculation of the asynchronous full addition unit 1150. Further, the replica data selection part 1120C has the replica data reading register mechanism as a mechanism for sequentially switching and selecting the replica data to be provided for the next calculation among the replica codes at each time when the calculation completion sensing part 1310 senses completion of the calculation of the asynchronous full addition unit 1150.

The reception data reading register mechanism is a reading register mechanism adapted to be provided with reading token register stages communicating with each other according to four-phase hand-shaking protocol in correspondence with respective reception data so that the reading token may circulate among the reading token register stages. The reception data reading register mechanism moves the reading token to the next reading token register stage at each time when the calculation of the asynchronous full addition unit 1150 is completed. Then, the mechanism selects the reception data dual-rail encoder corresponding to the reception data to be provided for the next calculation based on the reading token, and supplies the dual-rail-encoded reception data to the asynchronous full addition unit 1150.

The same applies to the replica data reading register mechanism.

Further, the first asynchronous correlation circuit 1100A includes the reception data writing register mechanism as a mechanism for realization of writing of reception data in the reception data register. Furthermore, the circuit includes the replica data writing register mechanism as a mechanism for realization of writing of replica data in the replica data register.

The reception data writing register mechanism is a writing register mechanism provided with writing token register stages communicating with each other according to four-phase hand-shaking protocol in correspondence with respective reception data registers, and sequentially moves the writing token to the next writing token register stage and stores the reception data in the corresponding reception data register based on the writing token.

The same applies to the replica data writing register mechanism.

1-1-3-1. Register Mechanisms for Reception Data

Figure 4:
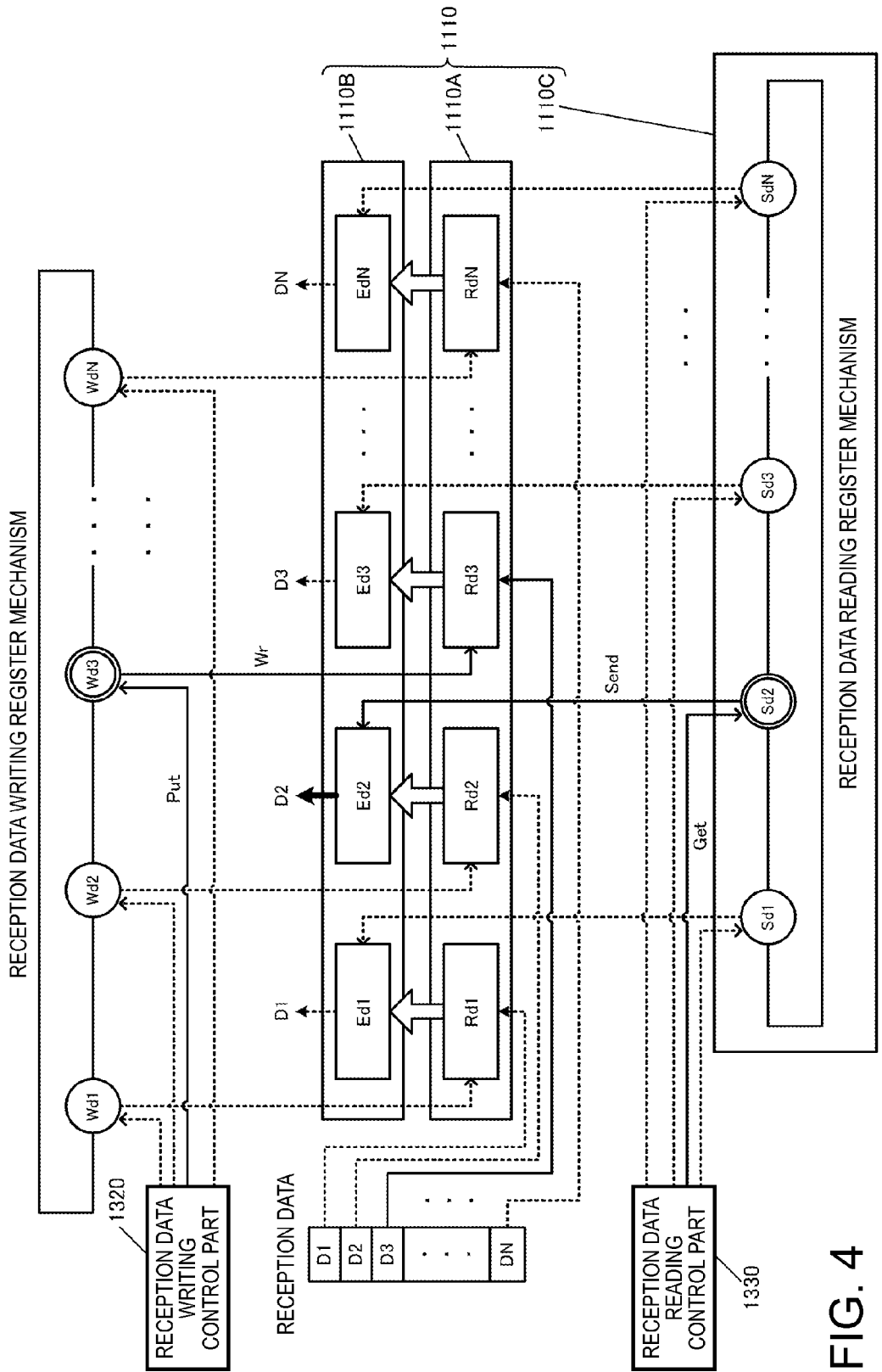
FIG. 4 is an explanatory diagram of a writing register mechanism and a reading register mechanism of reception data in the first asynchronous correlation circuit.

FIG. 4 is a schematic configuration diagram of the reception data reading register mechanism and the reception data writing register mechanism relating to reading and writing of reception data.

The reception data storage part 1110A has reception data registers Rd1 to RdN for respectively storing the reception data D1 to DN. Further, the reception data dual-rail encoding part 1110B has reception data dual-rail encoders Ed1 to EdN in one-to-one correspondence with the reception data registers Rd1 to RdN. From the reception data registers Rd1 to RdN, the stored reception data are output to the corresponding reception data dual-rail encoders Ed1 to EdN as needed. Further, the reception data selection part 1110C has the reception data reading register mechanism as a mechanism for selecting the reception data dual-rail encoder corresponding to the reception data to be provided for the next calculation.

(1) Reception Data Reading Register Mechanism

The reception data reading register mechanism has a configuration in which N reading token register stages Sd1 to SdN respectively connected to the reception data dual-rail encoders Ed1 to EdN are annularly connected. The reading token register stages Sd1 to SdN are annularly connected so that the reading token may circulate among the reading token register stages. That is, the reading token moves (transitions) among the reading token register stages sequentially from Sd1 and reaches SdN, and then, returns to Sd1 again. The reception data reading register mechanism is a mechanism of moving the reading token among the reading token register stages, sequentially switching the access right to the reception data dual-rail encoders Ed1 to EdN, and thereby, outputting the dual-rail-encoded reception data from the reception data dual-rail encoders Ed1 to EdN to the asynchronous full addition unit 1150.

The operation of the reading register mechanism will be described later in detail, and here, the procedure up to execution of dual-rail encoding by the reception data dual-rail encoder is briefly described. The reception data reading control part 1330 outputs a reading request signal Get to the reading token register stage being holding the reading token in response to sensing of calculation completion of the asynchronous full addition unit 1150 by the calculation completion sensing part 1310. The reading token register stage to which the reading request signal Get has been input outputs a dual-rail encoding command signal Send to the reception data dual-rail encoder in connection, and allows the reception data dual-rail encoder to dual-rail encode and output the reception data output from the corresponding reception data register.

For example, in FIG. 4, the reading token register stage Sd2 is holding the reading token (Sd2 is shown by a double circle). Accordingly, the reception data reading control part 1330 outputs the reading request signal Get to the reading token register stage Sd2 (see a solid arrow). Then, the reading token register stage Sd2 outputs the dual-rail encoding command signal Send to the reception data dual-rail encoder Ed2 (see a solid arrow). In response, the reception data dual-rail encoder Ed2 dual-rail-encodes and outputs the reception data D2 output from the reception data register Rd2 (see a thick solid arrow).

(2) Writing Register Mechanism

The reception data writing register mechanism has a configuration in which N writing token register stages Wd1 to WdN respectively connected to the reception data registers Rd1 to RdN are annularly connected. The writing token register stages Wd1 to WdN are annularly connected so that the writing token may circulate among the writing token register stages Wd1 to WdN. That is, the writing token moves (transitions) among the writing token register stages sequentially from Wd1 and reaches WdN, and then, returns to Wd1 again. The reception data writing register mechanism is a mechanism of moving the writing token among the writing token register stages, sequentially switching the access right to the reception data registers Rd1 to RdN, and thereby, sequentially realizing writing of the reception data in the reception data registers Rd1 to RdN.

The reception data writing control part 1320 outputs a writing request signal Put to the writing token register stage being holding the writing token. In response, the writing token register stage outputs a load command signal Wr to the reception data register in connection, and thereby, allows the reception data register to load the reception data of the corresponding number.

For example, in FIG. 4, the writing token register stage Wd3 is holding the writing token (Wd3 is shown by a double circle). Accordingly, the reception data writing control part 1320 outputs the writing request signal Put to the writing token register stage Wd3 (see a solid arrow). In response, the writing token register stage Wd3 outputs the load command signal Wr to the reception data register Rd3 (see a solid arrow), and allows the reception data register Rd3 to load the reception data D3 (see a solid arrow).

1-1-3-2. Replica Data Register Mechanisms

Figure 5:
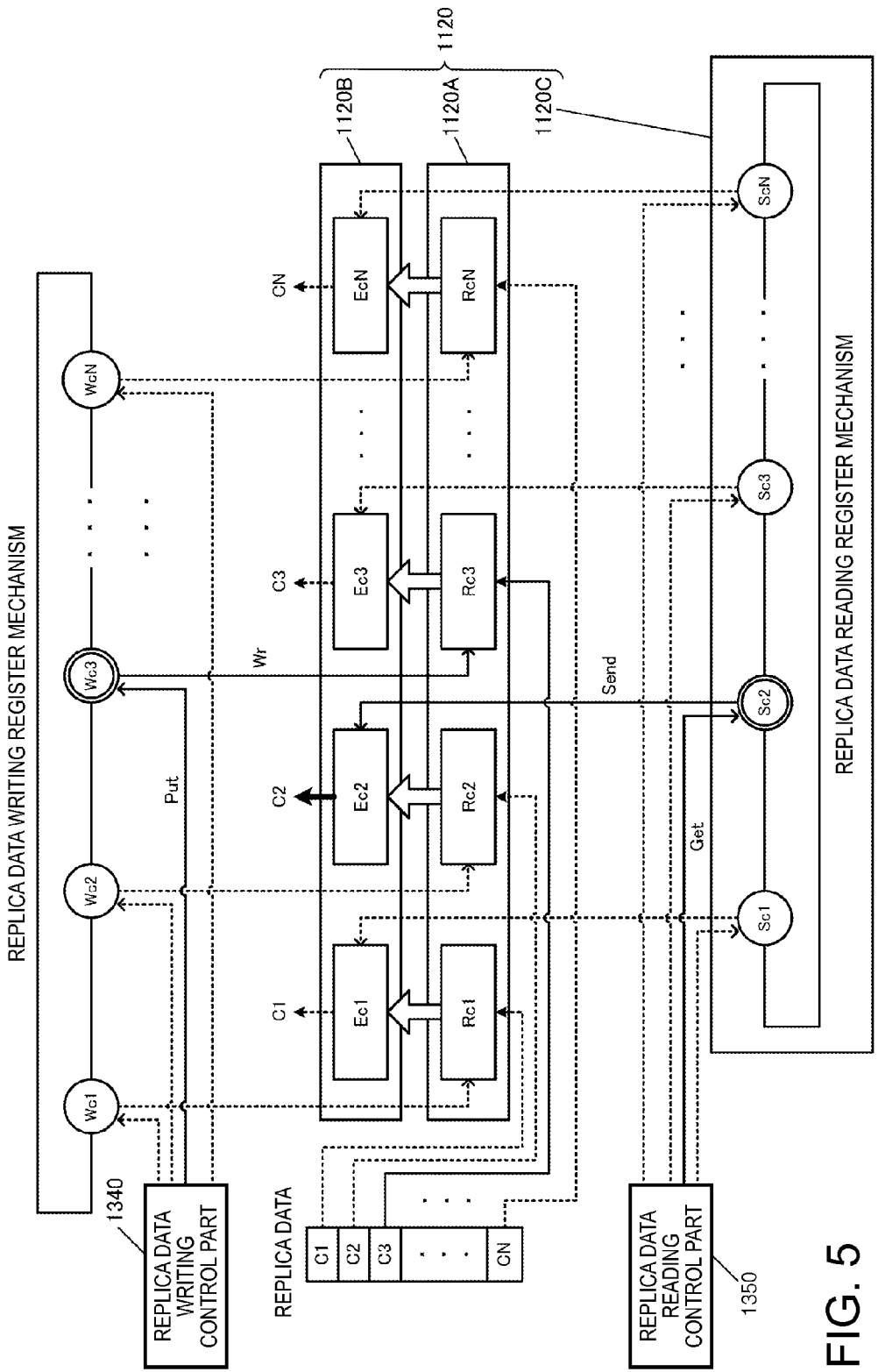
FIG. 5 is an explanatory diagram of a writing register mechanism and a reading register mechanism of replica data in the first asynchronous correlation circuit.

FIG. 5 shows a configuration of replica data register mechanisms.

The replica data storage part 1120A has a group of replica data registers that respectively correspond to the replica data C1 to CN and store the replica data. The group of replica data registers include N replica data registers Rc1 to RcN. Further, the replica data dual-rail encoding part 1120B has replica data dual-rail encoders Ec1 to EcN respectively corresponding to the replica data registers forming the group of replica data registers. Furthermore, the replica data selection part 1120C has the replica data reading register mechanism as a mechanism for selecting the replica data dual-rail encoder corresponding to the replica data to be provided for the next calculation.

The replica data reading register mechanism has a configuration in which N reading token register stages Sc1 to ScN respectively connected to the replica data dual-rail encoders Ec1 to EcN are annularly connected. Further, the replica data writing register mechanism has a configuration in which N writing token register stages Wc1 to WcN respectively connected to the replica data registers Rc1 to RcN are annularly connected.

The operations of the replica data reading register mechanism and the replica data writing register mechanism are the same as the operations of the reception data reading register mechanism and the reception data writing register mechanism explained in FIG. 4. Note that they are different in subject of control of the register mechanisms, and the replica data reading control part 1350 performs the control of the replica data reading register mechanism and the replica data writing control part 1340 performs the control of the replica data writing register mechanism.

1-1-3-3. Specific Configurations and Operations of Register Mechanisms

Next, the configurations and operations of the above described reading register mechanisms and the writing register mechanisms will be explained in detail. There is no difference in these configurations and operations of the register mechanisms between the reception data register mechanisms and the replica data register mechanisms. Accordingly, generalized explanation is made here. That is, the reception data reading register mechanism and the replica data reading register mechanism are inclusively explained as the reading register mechanism and the reception data writing register mechanism and the replica data writing register mechanism are inclusively explained as the writing register mechanism.

Figure 6:
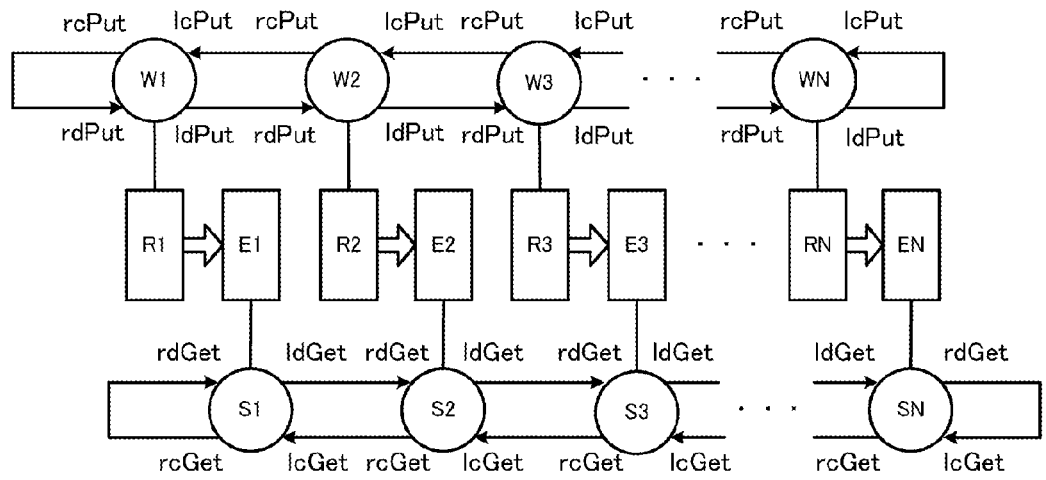
FIGS. 6(1)-6(2) show explanatory diagrams of a configuration and an operation of the register mechanisms.
Figure 6:
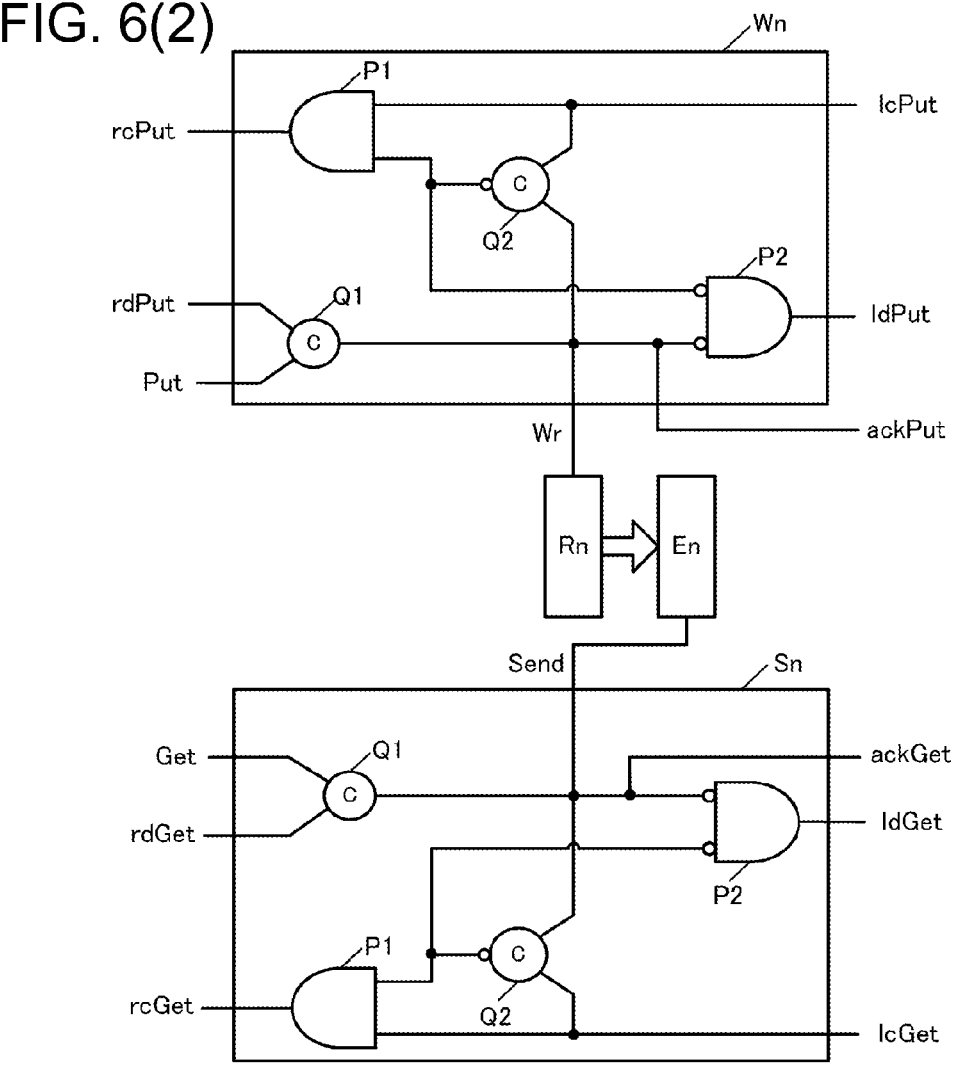

FIG. 6(1) is an overall configuration diagram of the writing register mechanism and the reading register mechanism, and FIG. 6(2) is a circuit configuration diagram focused on the nth writing token register stage and reading token register stage of them. The register stages are generalized and the writing token register stages are shown by "Wn=W1 to WN" and the reading token register stages are shown by "Sn=S1 to SN". Further, the data registers in which data is stored are generalized and shown by "Rn=R1 to RN" and the dual-rail encoders for dual-rail encoding of data are generalized and shown by "En=E1 to EN".

As shown in FIG. 6(1), the adjacent two writing token register stages of the writing register mechanism are connected by two signal lines. Further, in the writing token register stages W1 and WN located at the ends, the signal lines are respectively folded. The respective writing token register stages W1 to WN are connected to the data registers R1 to RN, respectively.

Similarly, the adjacent two reading token register stages of the reading register mechanism are connected by two signal lines. Further, in the reading token register stages S1 and SN located at the ends, the signal lines are respectively folded.

Note that the respective reading token register stages S1 to SN are connected to the dual-rail encoders E1 to EN, respectively.

As shown in FIG. 6(2), the writing token register stages and the reading token register stages are circuits in which an AND element P1, a negated input AND element P2, a C-element Q1, and a negated output C-element Q2 are connected.

The C-element is a logic element known as a Muller C-element, and Table 2 shows a true table thereof.

TABLE 2

| Input | | Output | |
|---|---|---|---|
| X | Y | Z | Z |
| 0 | 0 | 0 | 1 |
| 0 | 1 | Retain value | Retain Value |
| 1 | 0 | Retain Value | Retain Value |
| 1 | 1 | 1 | 0 |

As shown in Table 2, the C-element is an element that outputs "0" when both inputs are "0" and outputs "1" when both inputs are "1". The element has a storage element inside, and, if the two inputs are different, retains the last value and does not change the output.

Next, signals used in the writing register mechanism will be explained. The register stage at the start point side of the arrow showing the signal line is defined as the upstream-side register stage and the register stage at the end point side of the arrow is defined as the downstream-side register stage.

In the writing register mechanism shown in FIG. 6(2), "lcPut" and "rcPut" are signals that transmit in the upper signal line of the writing register mechanism and signals showing the transfer mode of the writing token (hereinafter, referred to as "writing token transfer mode signals". "lcPut" shows the signal from the upstream writing token register stage and "rcPut" shows the signal to the downstream writing token register stage. When these writing token transfer mode signals are asserted, the transfer mode of the writing token is turned ON and, if they negated, the mode is turned OFF.

"rdPut" and "ldPut" are signals that transmit in the lower signal line of the writing register mechanism and signals showing that the writing token is to be transferred (hereinafter, referred to as "writing token transfer signals"). "rdPut" shows the signal from the upstream writing token register stage and "ldPut" shows the signal to the downstream writing token register stage. These writing token transfer signals are signals for transferring the writing token to the next writing token register stage.

"Put" is a writing request signal from the writing control part and "ackPut" is a writing acknowledgement signal for the writing control part. In the reception data writing register mechanism, the reception data writing control part 1320 serves as the writing control part and, in the replica data writing register mechanism, the replica data writing control part 1340 serves as the writing control part. Further, "Wr" is a load command signal of the data output from the writing token register stage to the data register in connection.

Similarly, the signals used in the reading register mechanism will be explained. In the circuit of FIG. 6(2), "lcGet" and "rcGet" are signals that transmit in the lower signal line of the reading register mechanism and signals showing the transfer mode of the reading token (hereinafter, referred to as "reading token transfer mode signals". "lcGet" is the signal from the upstream reading token register stage. "rcGet" is the signal to the downstream reading token register stage. When these reading token transfer mode signals are asserted, the transfer mode of the reading token is turned ON and, if they negated, the mode is turned OFF.

"rdGet" and "ldGet" are signals that transmit in the upper signal line of the reading register mechanism and signals showing that the reading token is to be transferred (hereinafter, referred to as "reading token transfer signals"). "rdGet" is the signal from the upstream reading token register stage and "ldGet" is the signal to the downstream reading token register stage. These reading token transfer signals are signals for transferring the reading token to the next reading token register stage.

"Get" is a reading request signal from the reading control part and "ackGet" is a reading acknowledgement signal for the reading control part. In the reception data reading register mechanism, the reception data reading control part 1330 serves as the reading control part and, in the replica data reading register mechanism, the replica data reading control part 1350 serves as the reading control part. Further, "Send" is a dual-rail encoding command signal output from the writing token register stage to the dual-rail encoder in connection.

Next, the operations of the respective register mechanisms will be explained. The operations of the writing register mechanism and the reading register mechanism are like each other, and, if the operation of one register mechanism is explained, the operation of the other register mechanism is obvious. Accordingly, here, the operation of the reading register mechanism is focused for explanation.

FIGS. 7(1) to 7(3) and FIGS. 8(1) to 8(3) are explanatory diagrams of the operations of the reading register mechanism. Note that in FIGS. 7(1) to 8(3), signal lines relating to signals asserted to be active are shown by thick solid lines and signal lines relating to signals negated to be inactive are shown by normal solid lines. Further, the signals with changed values are shown by rectangles surrounding the values.

In the initial state, as shown in FIG. 7(1), lcGet, rcGet rdGet, ldGet, and Get are "0" with respect to all reading token register stages. In this case, the outputs of the respective logic elements are as shown in FIG. 7(1).

Then, for transition to the transfer mode of the reading token, lcGet of the reading token register stage SN is asserted from the reading token register stage SN as a start. Then, the output of the AND element P2 changes to "1" and rcGet for the downstream reading token register stage is asserted with the change.

As described above, the reading token register stages are connected by the two signal lines. Accordingly, when rcGet of the reading token register stage SN at the uppermost stream side is asserted, all lcGet and rcGet to the reading token register stage S1 at the lowermost stream side are asserted. That is, when rcGet of the reading token register stage SN is asserted, lcGet of the reading token register stage S(N−1) immediately below is asserted. Then, rcGet of the reading token register stage S(N−1) is asserted.

This is repeated, and then, lcGet of the reading token register stage S1 at the lowermost stream side is asserted and rcGet is asserted. This means that the reading register mechanism has transitioned to the transfer mode for transferring the reading token. This state is a state shown in FIG. 7(2).

From here, the reading token is sequentially transferred from the reading token register stages S1 to SN. At the reading token register stage S1, the signal line is folded. Accordingly, when rcGet of the reading token register stage S1 is asserted, rdGet for requesting transfer of the reading token to the reading token register stage S1 is asserted. This means that the reading token has moved to the reading token register stage S1. This state is a state shown in FIG. 7(3).

The reading control part asserts Get for allowing the reading token register stage S1 being holding the reading token to perform reading of data. Then, the output of the C-element Q1 changes from "0" to "1", and the dual-rail encoding command signal Send for the dual-rail encoder is asserted. Thereby, in the dual-rail encoder E1, dual-rail encoding of the data output from the data register is performed and the dual-rail-encoded data is output to the asynchronous full addition unit 1150.

Further, when Get is asserted, ackGet is asserted. Further, when the output of the AND element P1 changes from "1" to "0", rcGet is negated. This state is a state shown in FIG. 8(1).

When rcGet is negated, rdGet folded and input to the reading token register stage S1 is negated. This state is a state shown in FIG. 8(2).

The reading control part that has input the reading acknowledgement signal from the reading token register stage S1 negates the reading request signal Get to the reading token register stage S1. Then, the output of the C-element Q1 changes from "1" to "0", and the dual-rail encoding command signal Send is negated with the change. Thereby, the dual-rail encoding of data in the dual-rail encoder is stopped.

Further, with the stop, ackGet is negated. Further, when the output of the AND element P2 changes from "0" to "1", ldGet is asserted. This means that the reading token is to be transferred to the next reading token register stage S2. This state is a state shown in FIG. 8(3).

Through the above described procedure, the operation relating to reading of data at the reading token register stage S1 ends. When the reading token is transferred to the next reading token register stage S2 in FIG. 8(3), then, reading of data at the reading token register stage S2 is performed in the same procedure. This procedure is repeated to the reading token register stage SN, and thereby, reading of data is sequentially executed from the reading token register stage S1 and the dual-rail-encoded data is sequentially supplied to the asynchronous full addition unit 1150.

When single correlation calculation by the asynchronous full addition unit 1150 is ended, then, the reading start location of the replica data is shifted by one location and replica data is sequentially read and supplied to the asynchronous full addition unit 1150, and thereby, correlation calculation with the received signal may be performed with phase shift of the replica code. In this case, control may be performed so that the reading token register stage in which the reading token is stored in the initial state may be shifted by one stage, and the reading token may be sequentially moved with the reading token register stage as the start.

Figure 9:
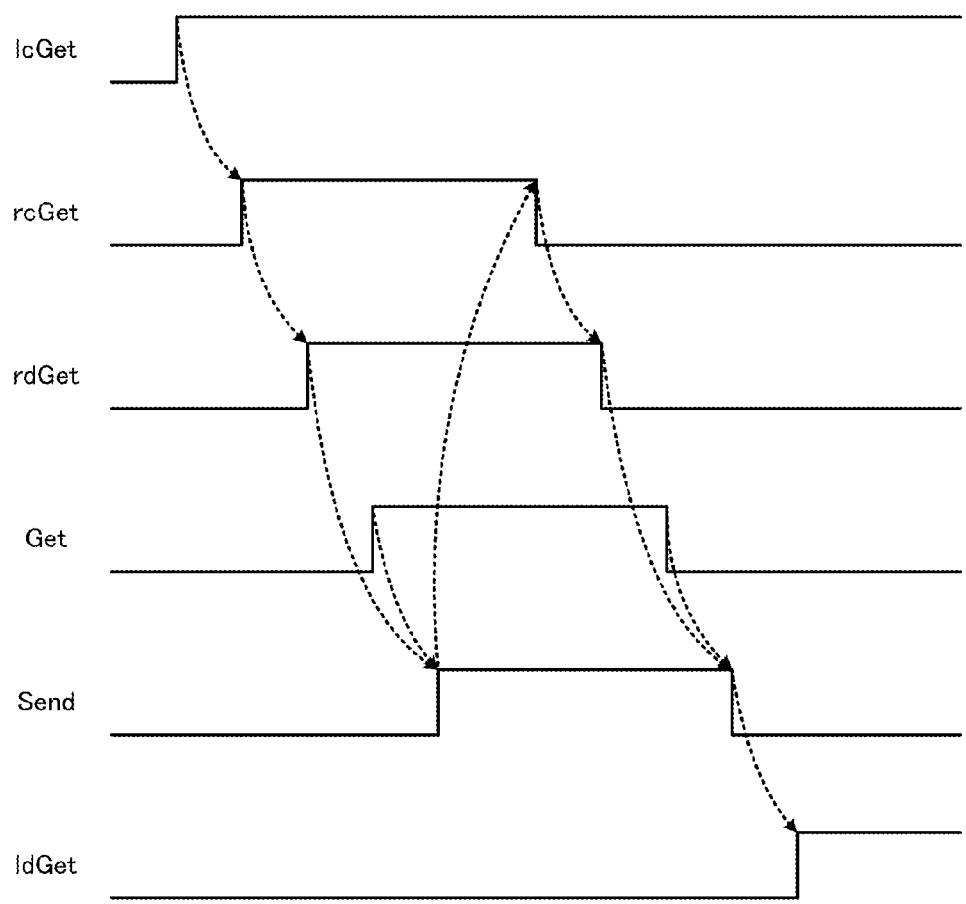
FIG. 9 is an explanatory diagram of four-phase hand-shaking in the reading register mechanism.

FIG. 9 is an explanatory diagram of communication by four-phase hand-shaking in the reading register mechanism, and graphically represents the transition of the respective signals in the temporal sequence. First, with the assertion of lcGet, rcGet is asserted (the state in FIG. 7(2)), and rdGet is asserted (the state in FIG. 7(3)) with the assertion. When Get is asserted in this state, Send is asserted (the state in FIG. 8(1)).

When Send is asserted, rcGet is negated, and rdGet is negated with the negation (the state in FIG. 8(2)). Then, when Get is negated in this state, Send is negated and ldGet is asserted (the state in FIG. 8(3)).

The adjacent reading token register stages communicate with each other according to four-phase hand-shaking protocol. That is, in response to the assertion of the reading token transfer mode signal rcGet, a certain reading token register stage (hereinafter, referred to as "request source reading token register stage") asserts the reading token transfer mode signal rdGet as a request to the reading token register stage at the next lower stream (hereinafter, referred to as "request destination reading token register stage"), and then, the request destination reading token register stage negates the reading token transfer mode signal rcGet as an acknowledgement for the request source reading token register stage. In response to the negation of the reading toke transfer mode signal rcGet, the request source reading token register stage negates the reading token transfer signal rdGet for the request destination reading token register stage.

That is, between the adjacent reading token register stages, when the transmission side asserts the request signal, the reception side asserts the acknowledge signal in response thereto. Then, the transmission side negates the request signal, and the reception side negates the acknowledge signal in response thereto. Therefore, the reading token register stages communicate with each other according to the four-phase hand-shaking protocol.

FIGS. 10(1) to 10(3) and FIGS. 11(1) to 11(3) show procedures of operations in the writing register mechanism. As described above, the operation of the writing register mechanism follows the operation of the reading register mechanism, and the operation of the writing register mechanism may be similarly drawn based on the operation of the reading register mechanism explained in FIGS. 7(1) to 8(3). Accordingly, the operation of the writing register mechanism is only illustrated, but the detailed explanation is omitted.

1-1-4. Advantages

In the first asynchronous correlation circuit 1100A, the asynchronous full addition unit 1150 is adapted to input the dual-rail-encoded data, and the asynchronous full addition unit 1150 may reliably sense arrival of valid data and perform calculation. In the asynchronous full addition unit 1150, calculation of adding reception data to the latest addition result of the asynchronous full addition unit 1150 is performed. In this case, if the sign of the replica data as a counterpart of the correlation calculation is positive, the reception data is added (i.e., addition) and, if the sign of the replica data as the counterpart of the correlation calculation is negative, the reception data is added with the sign inverted (i.e., subtraction), and thereby, the correlation calculation of the received signal and the replica code may be correctly performed.

The first asynchronous correlation circuit 1100A can basically operate only by the circuit block in which delivery and receipt of data are performed without necessity of a synchronization mechanism such as a driving clock of the correlation circuit or the like, and thus, may perform high-speed operation and reduce power consumption. Generally, in a CMOS (Complementary Metal Oxide Semiconductor) circuit, the power consumption is proportional to the total number of switching of the transistor within a fixed time. However, in the first asynchronous correlation circuit 1100A, only the transistor necessary for the operation is switched and the total number of switching may be minimized. This leads to reduction of power consumption.

Further, in the first asynchronous correlation circuit 1100A, the input mechanism and the output mechanism of the reception data and the replica data to the storage part are realized by the writing register mechanism and the reading register mechanism. A configuration of writing reception data and the replica data in the data registers respectively associated one-by-one before calculation and sequentially supplying the data from the data registers with respect to each calculation using a token passing scheme is employed. According to the configuration, reduction of energy relating to supply of data and phase shift are realized.

More specifically, in the case where data is supplied using the shift register scheme that has been generally used in related art, it is necessary to move the data itself and the total number of switching of the transistor becomes vast. However, in the token passing scheme of the first working example, it is not necessary to move the data itself, but only necessary to move the token, and thus, the total number of switching of the transistor may be significantly reduced and significant reduction of coherent noise and significant reduction of power consumption may be realized.

Further, in the GPS receiver, to detect the code phase of the received signal, the correlation calculation of the received signals and the replica codes is performed with the phase shift of the received signal or the replica code. In the asynchronous correlation circuit of the first working example, the reading start location of data is shifted by shifting the initial storage location of the reading token with respect to one of the reception data reading register mechanism and the replica data reading register mechanism, and thereby, phase shift may be easily realized.

In addition, in the first asynchronous correlation circuit 1100A, problems that may be caused when the correlation circuit is designed by the synchronous design method such as a problem of clock skew caused due to propagation delay of the clock signal, wiring delay of the circuit, or the like, a synchronization problem due to the difference in frequency between the clock of the correlation circuit and the clock of the main circuit of the baseband processing circuit unit 1020, and a problem of portability of the correlation circuit resulting therefrom may be avoided.

1-2. Second Working Example

In the asynchronous correlation circuit in the second working example, the asynchronous full addition unit has a group of tournament-sort full adders in which ($2^K$−1) asynchronous full adders for addition of $2^K$ (K is an integer number equal to or more than one) pieces of the reception data are arranged in a tournament sort.

In the first asynchronous correlation circuit 1100A explained in the first working example, the correlation value given by the equation (1) has been calculated by repeating the calculation of inputting the reception data Di and the replica data Cj to the asynchronous full addition unit one by one and adding the data to the latest product-sum calculation value A. However, in the method, many calculation steps are necessary until the correlation value is finally obtained. Accordingly, a configuration of performing the multiplication of the reception data Di and the replica data Cj in parallel and adding the multiplication values is employed, and thereby, the calculation steps until the correlation value is obtained are reduced and the calculation processing time is shortened.

1-2-1. Configuration of Asynchronous Correlation Circuit

Figure 12:
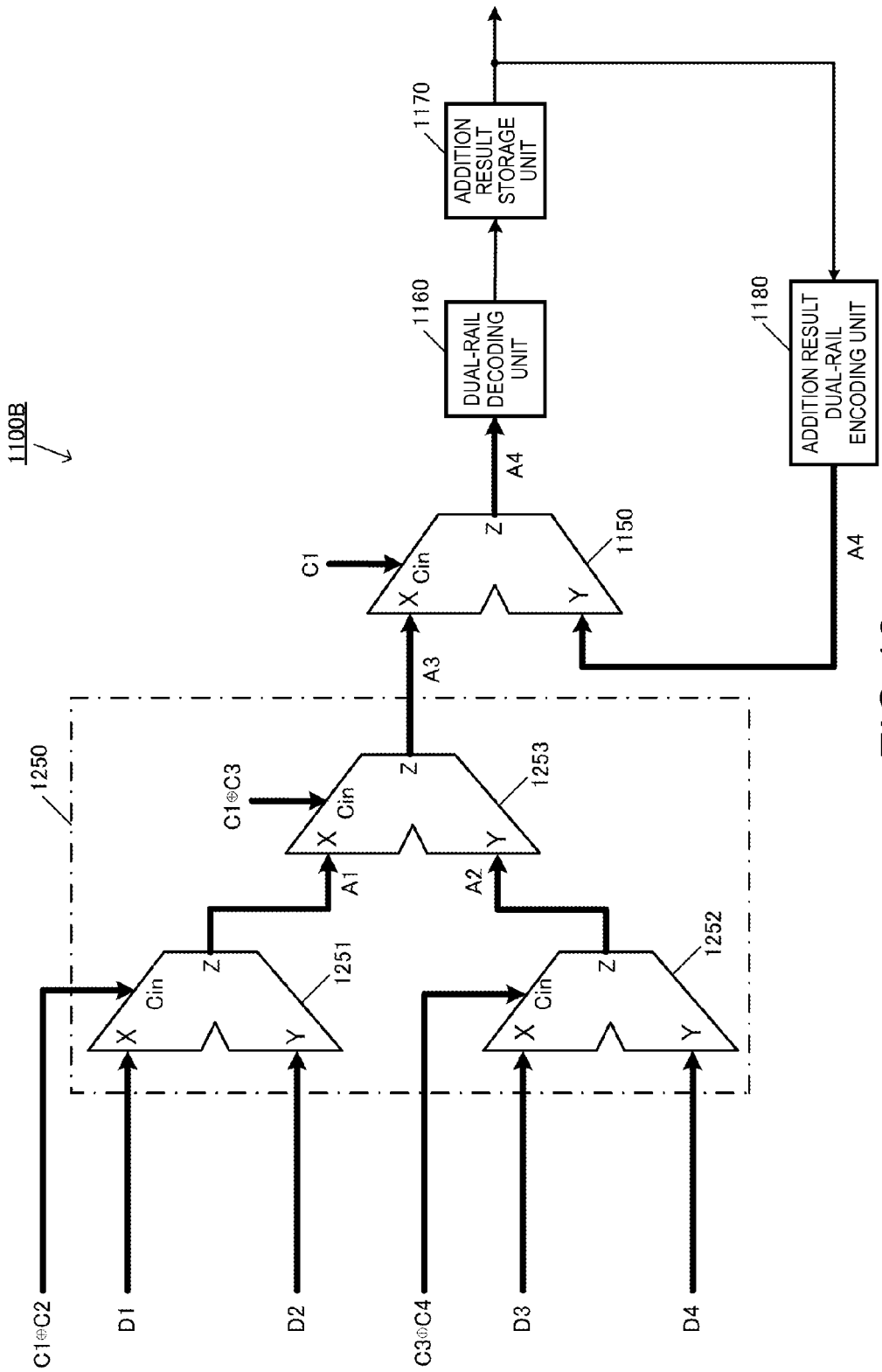
FIG. 12 shows an example of a circuit configuration of a second asynchronous correlation circuit.

FIG. 12 shows an example of a circuit configuration of a second asynchronous correlation circuit 1100B in the second working example. Here, the case where the second asynchronous correlation circuit 1100B is formed with "K=2" is explained as an example. The same component elements as those of the first asynchronous correlation circuit 1100A have the same signs and the repeated explanation is omitted.

In FIG. 12, for simplicity, illustration of the reception data storage part 1110A, the reception data dual-rail encoding part 1110B, and the replica data storage part 1120A and the replica data dual-rail encoding part 1120B is omitted. That is, the illustration is such that the reception data Di and replica data Cj dual-rail-encoded by the dual-rail encoder are supplied to the second asynchronous correlation circuit 1100B.

The second asynchronous correlation circuit 1100B has a group of tournament-sort full adders 1250, the asynchronous full addition unit 1150, the dual-rail decoding unit 1160, the addition result storage unit 1170, and the addition result dual-rail encoding unit 1180.

The group of tournament-sort full adders 1250 have three asynchronous full addition units of a first asynchronous full addition unit 1251 to a third asynchronous full addition unit 1253. Specifically, the group of tournament-sort full adders 1250 include "$(2^2-1)=3$" asynchronous full adders for addition of "$2^2=4$" pieces of reception data arranged in a tournament sort. That is, the first asynchronous full addition unit 1251 and the second asynchronous full addition unit 1252 are provided at the lower stage and the third asynchronous full adder 1253 is provided at the upper stage. The configuration of these asynchronous full addition units is the same as the configuration of the asynchronous full addition unit 1150 explained in FIG. 3.

Of the group of tournament-sort full adders 1250, the first asynchronous full addition unit 1251 and the second asynchronous full addition unit 1252 as the asynchronous full adders at the lowermost stage add, to the output value of the reception data dual-rail encoding unit relating to one reception data of two pieces of reception data to be added, the output value of the reception data dual-rail encoding unit relating to the other reception data with a sign in response to the output value of the replica data dual-rail encoding unit relating to two pieces of replica data as the counterpart of the correlation calculation.

Specifically, in the first asynchronous full addition unit 1251, the reception data D1 dual-rail-encoded by the reception data dual-rail encoding unit is input to the first input port X. The reception data D2 dual-rail-encoded by the reception data dual-rail encoding unit is input to the second input port Y. Further, the exclusive OR of replica data C1 and C2 dual-rail-encoded by the replica data dual-rail encoding unit is input to the carry input port Cin.

In the first asynchronous full addition unit 1251, the replica data C1 and C2 are the two pieces of replica data as the counterpart of the correlation calculation. If the exclusive OR of the replica data C1 and C2 is "0", the reception data D1 is added to the reception data D2 without change. On the other hand, if the exclusive OR of the replica data C1 and C2 is "1", the reception data D1 with its sign inverted is added to the reception data D2 (i.e., subtraction).

In the second asynchronous full addition unit 1252, like the first asynchronous full addition unit 1251, dual-rail-encoded reception data D3 and D4 are added with a sign in response to the exclusive OR of replica data C3 and C4 as two pieces of replica data as the counterpart of the correlation calculation. That is, if the exclusive OR of the replica data C3 and C4 is "0", the reception data D3 is added to the reception data D4 without change. On the other hand, if the exclusive OR of the replica data C3 and C4 is "1", the reception data D3 with its sign inverted is added to the reception data D4 (i.e., subtraction).

In the case where the amount of phase shift of the replica code is set to zero (k=0), the calculation equation for obtaining the correlation value is given by the equation (2). In this case, in the first asynchronous full addition unit 1251, the product sum of the first term and the second term on the right side of the equation (2) is calculated, and the product-sum calculation value A1 is output to the third asynchronous full addition unit 1253. Further, in the second asynchronous full addition unit 1252, the product sum of the third term and the fourth term on the right side of the equation (2) is calculated, and the product-sum calculation value A2 is output to the third asynchronous full addition unit 1253.

In the third asynchronous full addition unit 1253, the product-sum calculation value A1 of the first asynchronous full addition unit 1251 is input to the first input port X, and the product-sum calculation value A2 of the second asynchronous full addition unit 1252 is input to the second input port Y. Further, the exclusive OR of the replica data C1 and C3 is input to the carry input port Cin. Then, the product-sum calculation values A1 and A2 are added with a sign in response to the exclusive OR of the replica data C1 and C3, and a product-sum calculation value A3 as the addition result is output to the asynchronous full addition unit 1150.

In the asynchronous full addition unit 1150, the product-sum calculation value A3 of the third asynchronous full addition unit 1253 is input to the first input port X, and a latest product-sum calculation value A4 output from the addition result dual-rail encoding unit 1180 is input to the second input port Y. Further, the replica data C1 is input to the carry input port Cin. Then, the product-sum calculation values A3 and A4 are added with a sign in response to the replica data C1, and the addition result is output to the dual-rail decoding unit 1160.

1-2-2. Configuration of Reading Register Mechanism

In the second asynchronous correlation circuit 1100B of FIG. 12, it is necessary to select and supply $2^K$ reception data to be provided for the next calculation to the group of tournament-sort full adders 1250 at each time when the calculation of the asynchronous full addition unit 1150 is completed. Accordingly, like the first working example, the reception data reading register mechanism in which reading token register stages that communicate with each other according to four-phase hand-shaking protocol are provided in correspondence with the respective reception data is provided in the second asynchronous correlation circuit 1100B. In this case, the respective reading token register stages are adapted to be associated with the reception data dual-rail encoders corresponding to the $2^K$ reception data to be calculated of the asynchronous full addition unit.

Figure 13:
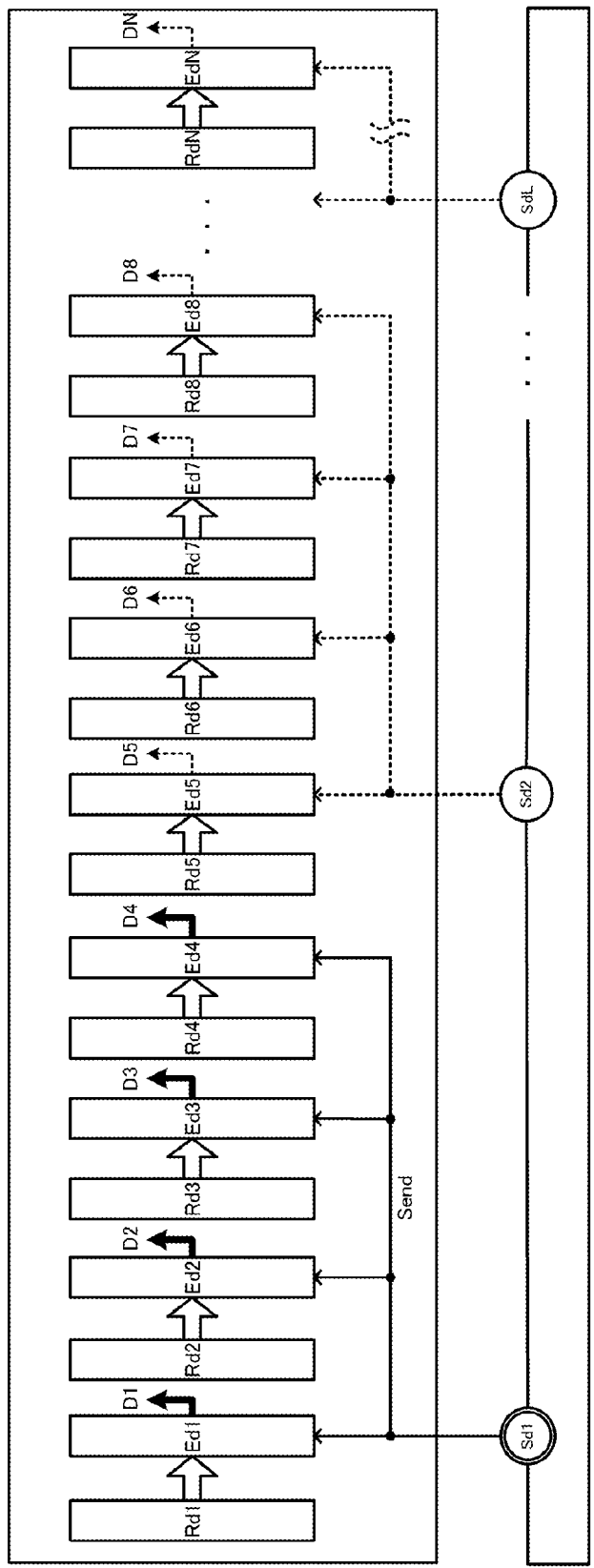
FIG. 13 is an explanatory diagram of a reception data reading register mechanism in the second asynchronous correlation circuit.

FIG. 13 shows a configuration example of the reception data reading register mechanism for "K=2". The reception data reading register mechanism is adapted so that four pieces of reception data are simultaneously dual-rail-encoded using one reading token and supplied to the group of tournament-sort full adders 1250.

Specifically, the reading register mechanism of the reception data has "L=N/4" reading token register stages Sd1 to SdL. The respective reading token register stages are connected to four dual-rail encoders corresponding to the data registers relating to the continuous four pieces reception data. Note that the connection destinations are selected four by four in the temporal sequence of the reception data so that the dual-rail encoders as the connection destinations may not overlap between the adjacent reading token register stages.

More specifically, the reading token register stage Sd1 is connected to reception data dual-rail encoders Ed1 to Ed4 corresponding to reception data registers Rd1 to Rd4. The next reading token register stage Sd2 is connected to reception data dual-rail encoders Ed5 to Ed8 corresponding to reception data registers Rd5 to Rd8. The same applies to the other stages.

In this case, the respective reading token register stages simultaneously output dual-rail encoding command signals Send to the four reception data dual-rail encoders as the connection destinations, and thereby, allow the corresponding dual-rail encoders to dual-rail-encode the continuous four pieces of reception data and supply the data to the group of tournament-sort full adders 1250. In the example of FIG. 13, the state in which the reading token register stage Sd1 shown by a double circle outputs the dual-rail encoding command signals Send to the reception data dual-rail encoders Ed1 to Ed4 as shown by solid lines is shown.

The same applies to the replica data, and it is necessary to select and supply "$2^2=4$" pieces of replica data to be provided for the next calculation to the group of tournament-sort full adders 1250 at each time when the calculation of the asynchronous full addition unit is completed. Accordingly, though the illustration is omitted, like the reception data reading register mechanism in FIG. 13, the replica data reading register mechanism having "L=N/4" reading token register stages Sc1 to ScL may be formed.

The reception data reading register mechanism provided in the second asynchronous correlation circuit 1100B is the reading register mechanism in which reading token register stages that communicate with each other according to four-phase hand-shaking protocol are provided in correspondence with the respective reception data like the reception data reading register mechanisms provided in the first asynchronous correlation circuit 1100A. In the register mechanism, the respective reading token register stages are associated with the reception data dual-rail encoders corresponding to the $2^K$ pieces of reception data to be calculated of the group of tournament-sort full adders, and the reading token is moved to the next reading token register stage at each time when the calculation of the asynchronous full addition unit is completed. Further, the reception data dual-rail encoders corresponding to the $2^K$ pieces of reception data to be provided for the next calculation are selected based on the reading token, and the selected reception data dual-rail encoders are allowed to dual-rail-encode the reception data.

The same applies to the replica data reading register mechanism.

1-3. Third Working Example

The third working example is a working example to which a configuration in which a plurality of the second asynchronous correlation circuits explained in the second working example are provided and the respective second asynchronous correlation circuits are allowed to perform correlation calculation in parallel with phase shift of replica codes from each other is applied.

As a specific example, the case where four of the second asynchronous correlation circuits 1100B with "K=2" explained in FIG. 12 are provided and the correlation calculation is performed will be explained. In this case, "$2^2=4$" of the reception data and the replica data are supplied to the respective four second asynchronous correlation circuits 1100B for calculation by the group of tournament-sort full adders 1250.

With respect to the reception data Di, control is performed so that the same data may be supplied to the four second asynchronous correlation circuits 1100B in single calculation. That is, in the first calculation, the reception data D1 to D4 are simultaneously supplied to the respective second asynchronous correlation circuits 1100B, and, in the second calculation, the reception data D5 to D8 are simultaneously supplied to the respective second asynchronous correlation circuits 1100B. In the same manner, four pieces of the reception data to the reception data DN are supplied in the temporal sequence.

As the mechanism for realization of the supply of reception data, the reception data reading register mechanism shown in FIG. 13 may be applied. That is, the reception data reading register mechanism shown in FIG. 13 may be provided in correspondence with each of the four second asynchronous correlation circuits 1100B and reading of reception data may be performed using the token passing scheme.

On the other hand, with respect to the replica data Cj, control is performed so that four pieces of the data with the reading start location shifted one by one may be supplied to the four second asynchronous correlation circuits 1100B. This is for the four second asynchronous correlation circuits 1100B to perform correlation calculation at the respectively different phases with phase shift of replica code.

FIG. 14 is an explanatory diagram of the supply of replica data in this case. For convenience, numbers with "A to D" are assigned to the four second asynchronous correlation circuits 1100B for explanation. FIG. 14 shows a table in which the numbers of the second asynchronous correlation circuits are associated with replica data supplied to the respective second asynchronous correlation circuits. The hatched parts in the cells of replica data show sets of replica data supplied in single calculation. Further, the number at the head of the set of the replica data shows the number of calculation, and the alphabet at the tail shows the number of the second asynchronous correlation circuit.

According to the table, in the first calculation, the replica data C1 to C4 are supplied to the asynchronous correlation circuit A, the replica data C2 to C5 are supplied to the asynchronous correlation circuit B, the replica data C3 to C6 are supplied to the asynchronous correlation circuit C, and the replica data C4 to C7 are supplied to the asynchronous correlation circuit D.

In the second calculation, the replica data C5 to C8 are supplied to the asynchronous correlation circuit A, the replica data C6 to C9 are supplied to the asynchronous correlation circuit B, the replica data C7 to C10 are supplied to the asynchronous correlation circuit C, and the replica data C8 to C11 are supplied to the asynchronous correlation circuit D. The same applies to the following calculation.

Figure 15:
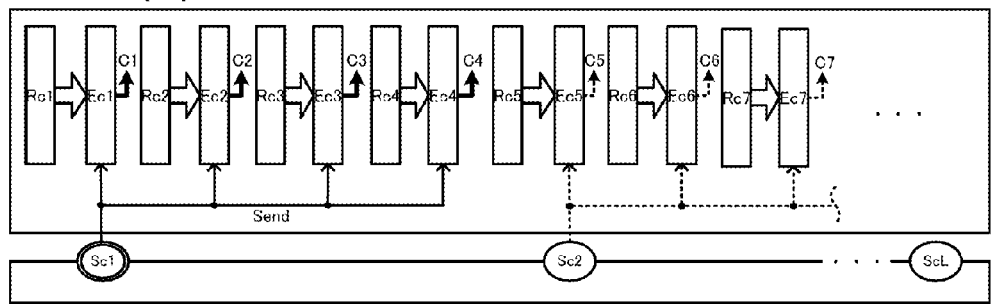
FIGS. 15(1)-15(4) show explanatory diagrams of replica data reading register mechanisms in the third asynchronous correlation circuit.
Figure 15:
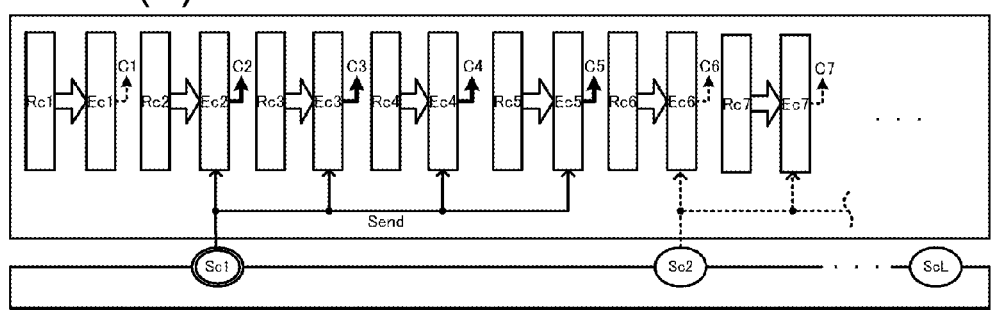
Figure 15:
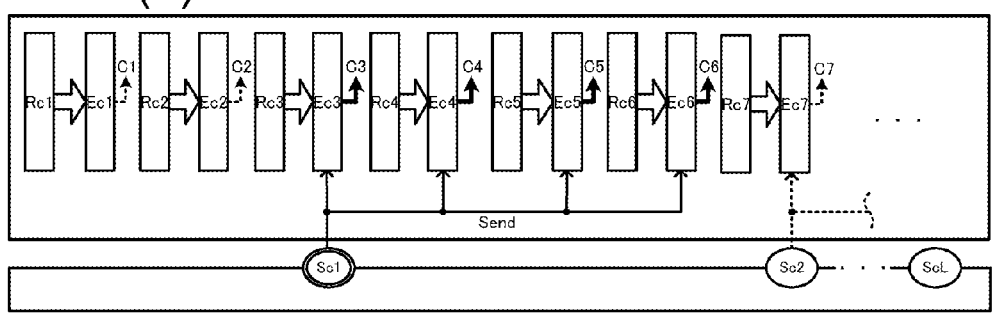
Figure 15:
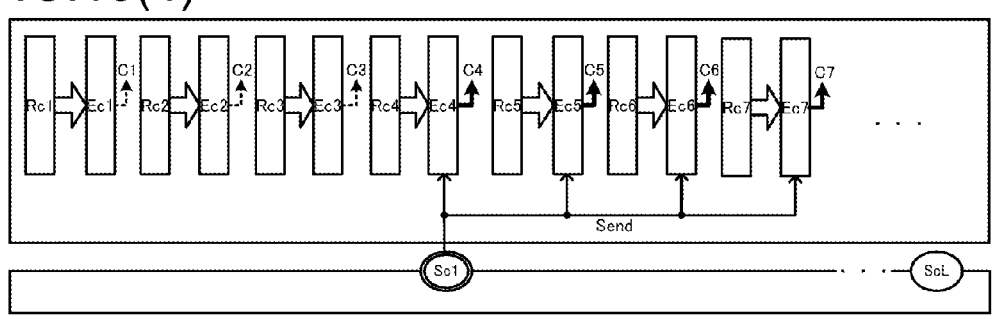

FIGS. 15(1) to 15(4) are configuration diagrams of replica data reading register mechanisms as register mechanisms for realization of the supply of replica data. FIGS. 15(1) to 15(4) show configurations of the replica data reading register mechanisms provided in the asynchronous correlation circuits A to D in FIG. 14, respectively.

In these replica data reading register mechanisms, four pieces of replica data are simultaneously dual-rail-encoded by one reading token. Each replica data reading register mechanism has "L=N/4" reading token register stages Sc1 to ScL.

The respective reading token register stages are connected to four dual-rail encoders corresponding to the data registers relating to the continuous four pieces of replica data. Note that the connection destinations are selected four by four in the temporal sequence of the replica data so that the dual-rail encoders as the connection destinations may not overlap between the adjacent reading token register stages.

The asynchronous correlation circuits A to D are different in that the replica data dual-rail encoders Ec as connection destinations of the reading token register stages Sc1 to ScL are shifted one by one. For example, the reading token register stage Sc1 is focused, and the stage is connected to the dual-rail encoders Ec1 to Ec4 in the asynchronous correlation circuit A, connected to the dual-rail encoders Ec2 to Ec5 in the asynchronous correlation circuit B, connected to the dual-rail encoders Ec3 to Ec6 in the asynchronous correlation circuit C, and connected to the dual-rail encoders Ec4 to Ec7 in the asynchronous correlation circuit D.

The replica data reading token register stages have the above described configurations, and thus, the replica data may be dual-rail-encoded with the reading start locations shifted one by one in the respective asynchronous correlation circuits A to D and provided for the calculation in the group of tournament-sort full adders.

1-4. Fourth Working Example

The fourth working example is a working example in which an asynchronous circuit that generates replica data is provided in the asynchronous correlation circuit.

The C/A codes modulated in the GPS satellite signals are pseudo random noise codes at a repetition frequency of 1 ms with 1023 chips as 1 PN frame and codes specific to the respective GPS satellites. The C/A code is known as a code of Gold sequence (Gold code). The Gold code may be generated by coupling of two M-sequences having equal periods as preferred pairs. In the fourth working example, the asynchronous circuit that generates dual-rail-encoded replica data is realized based on the principle.

Figure 16:
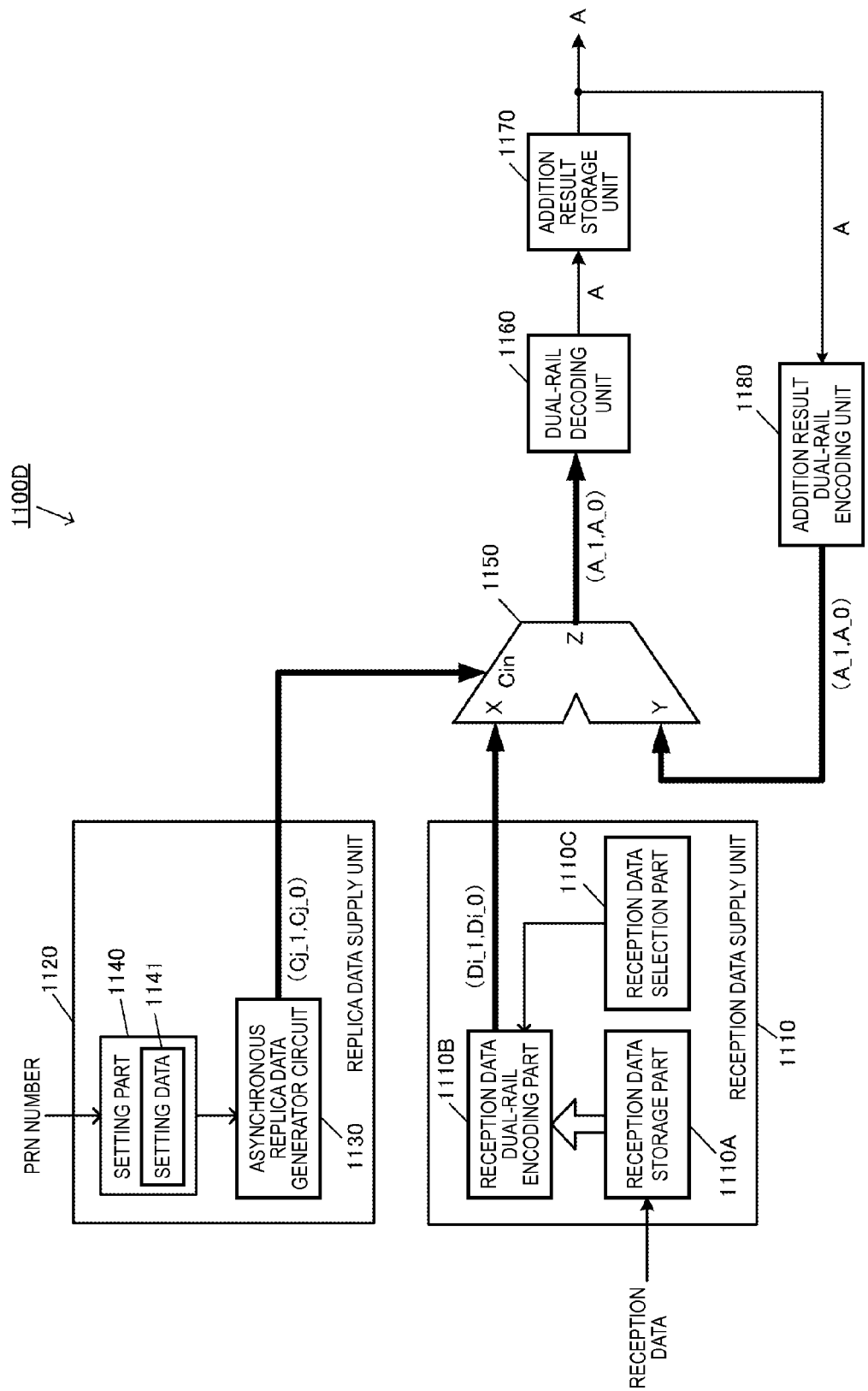
FIG. 16 shows an example of a circuit configuration of a fourth asynchronous correlation circuit.

FIG. 16 shows an example of a circuit configuration of a fourth asynchronous correlation circuit 1100D in the fourth working example. The major configuration of the fourth asynchronous correlation circuit 1100D is the same as that of the first asynchronous correlation circuit 1100A. The difference is that the replica data supply unit 1120 has an asynchronous replica data generator circuit 1130 and a setting part 1140. The asynchronous replica data generator circuit 1130 is a circuit that generates replica data having the same length of 1023 ($=2^{10}-1$) as the code length of the C/A code.

Figure 17:
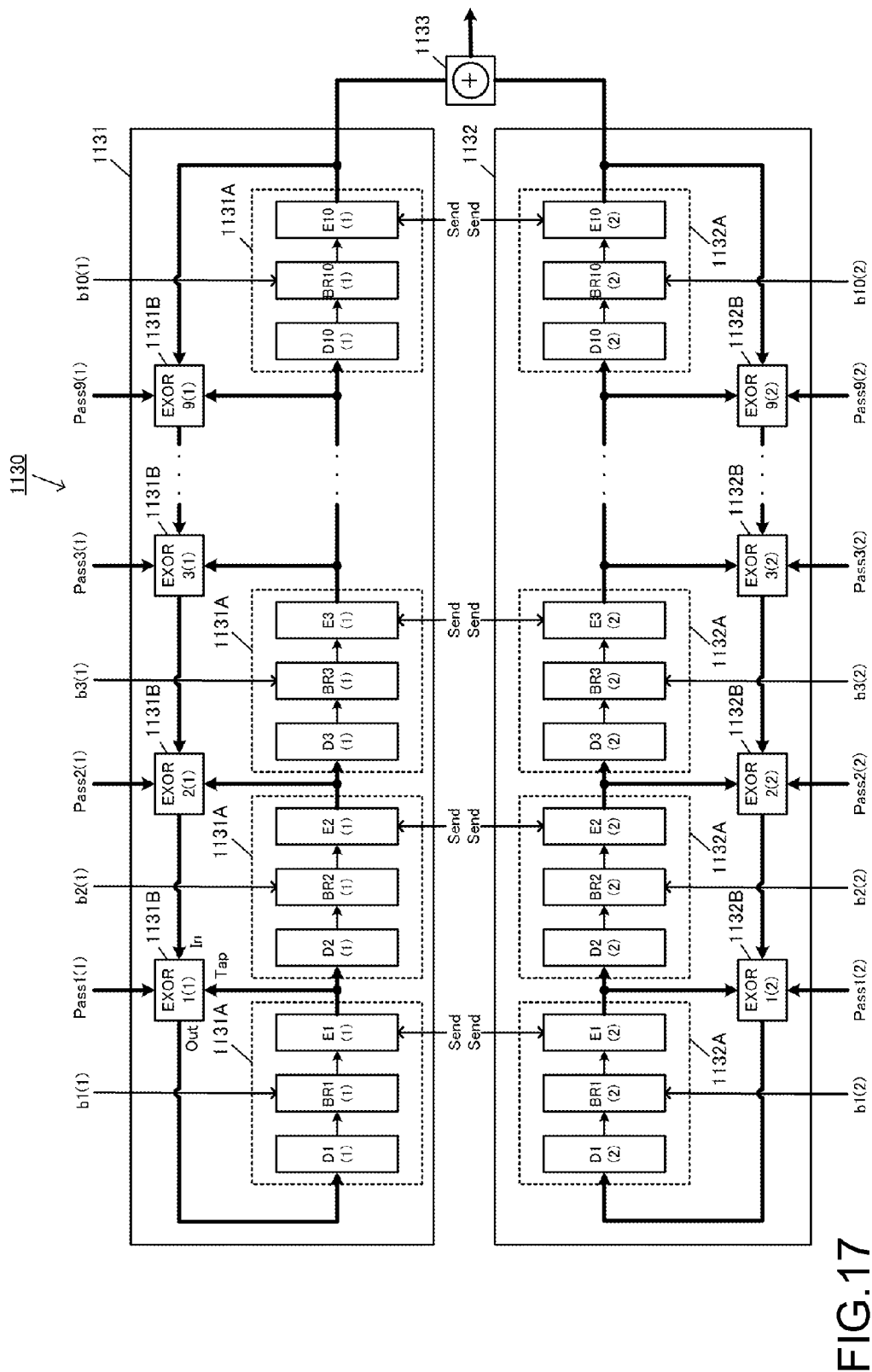
FIG. 17 shows an example of a circuit configuration of an asynchronous replica data generator circuit.

FIG. 17 shows an example of a circuit configuration of the asynchronous replica data generator circuit 1130. The asynchronous replica data generator circuit 1130 has a first linear feedback shift register circuit 1131, a second linear feedback shift register circuit 1132, and a coupling part 1133.

The first linear feedback shift register circuit 1131 is a circuit in which ten stages (=L stages) of first data register parts 1131A and nine stages (=(L−1) stages)) of first exclusive OR circuits 1131B are linear-feedback-connected. Similarly, the second linear feedback shift register circuit 1132 is a circuit in which ten stages (=L stages) of second data register parts 1132A and nine stages (=(L−1) stages)) of second exclusive OR circuits 1132B are linear-feedback-connected.

Each of the first data register part 1131A and the second data register part 1132A is formed with a one-bit data register part sandwiched between a dual-rail decoder and a dual-rail encoder. The dual-rail encoder of the first data register part 1131A and the dual-rail encoder of the second data register part 1132A form the replica data dual-rail encoding part 1120B explained in the first working example.

The one-bit data register part may be formed by a one-bit data register, for example. That is, the data register part is formed with the one-bit data register sandwiched between the dual-rail decoder and the dual-rail encoder. In this case, one-bit data dual-rail-decoded by the dual-rail decoder is stored in the one-bit data register part. Then, the one-bit data output from the one-bit data register part is dual-rail-encoded by the dual-rail encoder and output to the next data register part.

In the drawing, the one-bit data register part forming the data register part is shown by "BRn", the dual-rail decoder is shown by "Dn", and the dual-rail encoder is shown by "En". "n=1 to 10" show the numbers of the data register parts. Further, suffixes (1) are attached to the one-bit data register part, the dual-rail decoder, and the dual-rail encoder forming the first data register part 1131A and suffixes (2) are attached to the one-bit data register part, the dual-rail decoder, and the dual-rail encoder forming the second data register part 1132A, and thereby, they are distinguished.

Note that, in the fourth working example, the case where the one-bit register parts forming the first data register part 1131A and the second data register part 1132A are respectively formed by single one-bit data registers will be illustrated and explained, however, one-bit register parts may be formed by connection of two stages of one-bit data registers respectively having drive signals with different phases instead. This is a mechanism for avoiding racing that may be particularly problematic in asynchronous circuits.

The dual-rail decoder forming the data register part dual-rail-decodes the dual-rail-encoded one-bit data output from the dual-rail encoder forming the upstream data register part, and outputs the decoding result to the one-bit data register part. Further, when the dual-rail encoding start signal Send for commanding the start of dual-rail encoding of data is input from the setting part 1140, the dual-rail encoder forming the data register part starts dual-rail encoding of one-bit data output from the one-bit data register part and asynchronously performs shift operation of the data.

Each linear feedback shift register circuit is adapted to set the initial value of each data register part and the exclusive OR circuit that executes calculation of exclusive OR by the setting part 1140. Specifically, regarding the first linear feedback shift register circuit 1131, initial values B1(1) to B10(1) of the respective one-bit data register parts BR1(1) to BR10(1) forming the first data register part 1131A are set by the setting part 1140. Further, circuit set values Pass1(1) to Pass9(1) are respectively output to first exclusive OR circuits EXOR1(1) to EXOR9(1) by the setting part 1140, and whether or not to allow the first exclusive OR circuits EXOR1(1) to EXOR9(1) to perform calculation of exclusive OR is set by the circuit set values Pass1(1) to Pass9(1).

The same applies to the second linear feedback shift register circuit 1132.

The first exclusive OR circuits 1131B and the second exclusive OR circuits 1132B are respectively provided on the data line of the feedback loop for feedback of the output from the lowermost stream data register part (the tenth data register part) to intervene between the adjacent data register parts one by one.

In the drawing, the exclusive OR circuit is shown by "EXORm". "m=1 to 9" show the numbers of the exclusive OR circuits. Further, suffixes (1) are attached to the first exclusive OR circuits 1131B and suffixes (2) are attached to the second exclusive OR circuits 1132B, and thereby, they are distinguished.

Figures 18, 19:
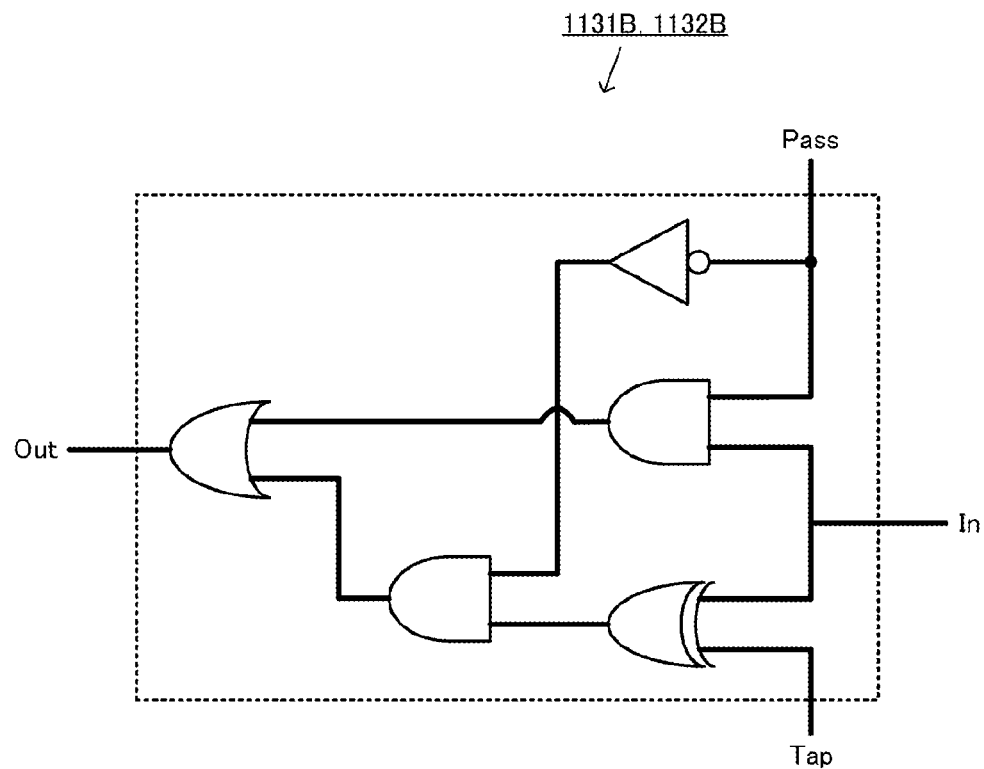
FIG. 18 shows an example of a circuit configuration of an exclusive OR circuit.
FIG. 19 is a truth table relating to calculation of the exclusive OR circuit.

FIG. 18 shows an example of a circuit configuration of the first exclusive OR circuit 1131B and the second exclusive OR circuit 1132B. These exclusive OR circuits 1131B, 1132B are logic circuits that have a plurality of logic elements and perform calculation of exclusive OR of input dual-rail-encoded data. To the exclusive OR circuits 1131B, 1132B, input data In are input from the upstream exclusive OR circuits. Further, outputs of the data register parts having the same numbers as those of the exclusive OR circuits are input as tap data Tap. Furthermore, the circuit set value Pass is input from the setting part 1140 to the exclusive OR circuit, and whether or not to execute the calculation of exclusive OR of the input data In and the tap data Tap is controlled by the circuit set value Pass.

FIG. 19 is a truth table relating to calculation of the exclusive OR circuit. When the circuit set value Pass is "0" (Pass=0), the calculation of exclusive OR of the input data In and the tap data Tap is not executed (i.e., the tap data Tap is neglected), and the input data In is used as output data Out as it is (Out=In). On the other hand, when the circuit set value Pass is "1" (Pass=1), the calculation of exclusive OR of the input data In and the tap data Tap is executed, and the calculation result is used as output data Out (Out=In xor Tap).

This means that the calculation part of the exclusive OR is determined by the circuit set value Pass. That is, nine stages of exclusive OR circuits are provided in the linear feedback shift register circuit of the fourth working example, however, not all of the exclusive OR circuits, but only the exclusive OR circuits necessary for the generation of replica data are allowed to execute the calculation of exclusive OR of the input data In and the tap data Tap.

The coupling part 1133 calculates exclusive OR of the dual-rail-encoded output value output from the first linear feedback shift register circuit 1131 and the dual-rail-encoded output value output from the second linear feedback shift register circuit 1132. Then, the calculation result is output to the asynchronous full addition unit 1150 as dual-rail-encoded replica data.

The setting part 1140 performs setting of the initial values of the first data register 1131A and the first exclusive OR circuits 1131B in response to the replica code generated by the asynchronous replica data generator circuit 1130 and performs setting of the initial values of the second data register 1132A and the second exclusive OR circuits 1132B in response to the replica code. Further, the setting part 1140 outputs the dual-rail encoding start signal Send to the dual-rail encoders of the data register parts forming the respective linear feedback shift register circuits.

FIG. 20 shows an example of a data configuration of setting data 1141 used for the setting part 1140 to perform the above described settings. In the setting data 1141, a PRN number (replica ID) 1141A, a first set value 1141B relating to the first linear feedback shift register circuit 1131, and a second set value 1141C relating to the second linear feedback shift register circuit 1132 are associated and defined.

In the first set value 1141B, 10-bit initial values b(1) (b1(1) to b10 (1)) with respect to the first data register parts 1131A and 9-bit circuit set values Pass(1) (=Pass1(1) to Pass9 (1)) with respect to the first exclusive OR circuits 1131B are defined. Further, in the second set value 1141C, 10-bit initial values b(2) (b1(2) to b10(2)) with respect to the second data register parts 1132A and 9-bit circuit set values Pass(2) (=Pass1(2) to Pass9(2)) with respect to the second exclusive OR circuits 1132B are defined.

The setting part 1140 outputs the first set values 1141B and the second set values 1141C corresponding to the PRN numbers 1141A output from the processing unit 1300 to the first linear feedback shift register circuit 1131 and the second linear feedback shift register circuit 1132, respectively.

The sequence data generated by the first linear feedback shift register circuit 1131 is uniquely determined by the initial values respectively set for the first data register parts 1131A and the first exclusive OR circuits 1131B that allow calculation of exclusive OR. The same applies to the second linear feedback shift register circuit 1132. Accordingly, the initial values and the circuit set values with respect to the respective two linear feedback shift register circuits are determined in advance for each PRN number (replica ID) and the initial values and the circuit set values corresponding to the PRN number of the GPS satellite to be acquired (acquisition target satellite) are output to the asynchronous replica data generator circuit 1130, and thereby, the replica data relating to the acquisition target satellite may be generated by the asynchronous replica data generator circuit 1130.

1-5. Modified Examples

Obviously, the embodiment to which the invention may be applied is not limited to the above described first embodiment, but changes may be appropriately made without departing from the scope of the invention. As below, the modified examples will be explained.

1-5-1. First Sequence Data and Second Sequence Data

In the above described first embodiment, the first sequence data as received signals obtained by reception of GPS satellite signals from the GPS satellite and the second sequence data as replica codes has been explained, however, the types of the first sequence data and the second sequence data are not limited to those.

In the system for data communication using the CDMA (Code Division Multiple Access) method, transmission data is diffusion-modulated using spread codes at the transmitter side and the diffusion-modulated data is inversely diffused at the receiver side and the transmission data is demodulated. In the inverse diffusion, it is necessary to know the phase of the spread codes of the received signals, and thus, correlation calculation of the received signals and the pseudo spread codes is necessary. Therefore, the invention may be applied to other communication systems than the satellite positioning system, and the first sequence data and the second sequence data may be appropriately selected in response to the applied communication system.

1-5-2. Parallelization of First Asynchronous Correlation Circuit

Like the third working example, a plurality of the first asynchronous correlation circuits 1100A explained in the first working example may be arranged and the respective first asynchronous correlation circuits 1100A may be allowed to perform correlation calculation with phase shift of replica codes in parallel.

1-5-3. Register Mechanism

In the above described first embodiment, the reading register mechanism for data (reception data and replica data) formed by annularly connecting reading token register stages has been explained, however, the configuration of the reading register mechanism is just an example. For example, the reading token register stages may be connected in a bus or a star to form the reading register mechanism so that the reading token may circulate among the reading token register stages.

The same applies to the writing register mechanism.

Further, in the above described first embodiment, the writing register mechanism for data (reception data and replica data) with one-to-one correspondence of the data registers and the writing token register stages has been explained. However, a plurality of (e.g., four) data registers may be associated with one writing token register stage and writing of data may be performed by one writing token in the plurality of data registers at the same time.

1-5-4. Asynchronous Data Generator Circuit

The asynchronous data generator circuit of the invention is not limited to the circuit for generation of replica data, but may be obviously applied to a circuit for generation of other gold sequence data. For example, for generation of gold sequence data having length "$31=2^5-1$", two linear feedback shift register circuits in which five stages (=L stages) of data register parts and four stages (=(L−1) stages) of exclusive OR circuits are linear-feedback-connected may be provided and the asynchronous data generator circuit may be formed to couple output values thereof.

1-5-5. Application Examples

The asynchronous correlation circuit of the first embodiment may be provided inside of various receivers and used for correlation calculation. Further, as electronic equipment including the receiver, for example, various electronic equipment including a portable phone, a car navigation system, a portable navigation system, a personal computer, a PDA (Personal Digital Assistance), a pedometer, and a wrist watch may be supposed.

1-5-6. Satellite Positioning System

In the above described first embodiment, the embodiment of the case where the GPS is applied as the satellite positioning system has been explained, however, obviously, other satellite positioning systems including WAAS (Wide Area Augmentation System), QZSS (Quasi Zenith Satellite System), GLONASS (GLObal Navigation Satellite System), and GALILEO may be applied.

2. Second Embodiment

As below, an example of the preferred embodiments to which the invention is applied will be explained with reference to the drawings. The second embodiment is an embodiment of application of the invention to a receiver of GPS as a kind of the satellite positioning system. It is obvious that the embodiment to which the invention may be applied is not limited to the second embodiment to be explained.

The GPS satellite signals sent out from the GPS satellites are modulated using spread codes called C/A (Coarse and Acquisition) codes different with respect to each GPS satellite. In order to acquire the GPS satellite signals among the weak received signals, the GPS receiver acquires the GPS satellite signals by performing correlation calculation of the received signals and the replica codes simulating the C/A codes. Then, using the acquired GPS satellite signals, for example, location calculation is performed using pseudo distances and the location of the GPS receiver is calculated.

2-1. GPS Receiver

Figure 21:
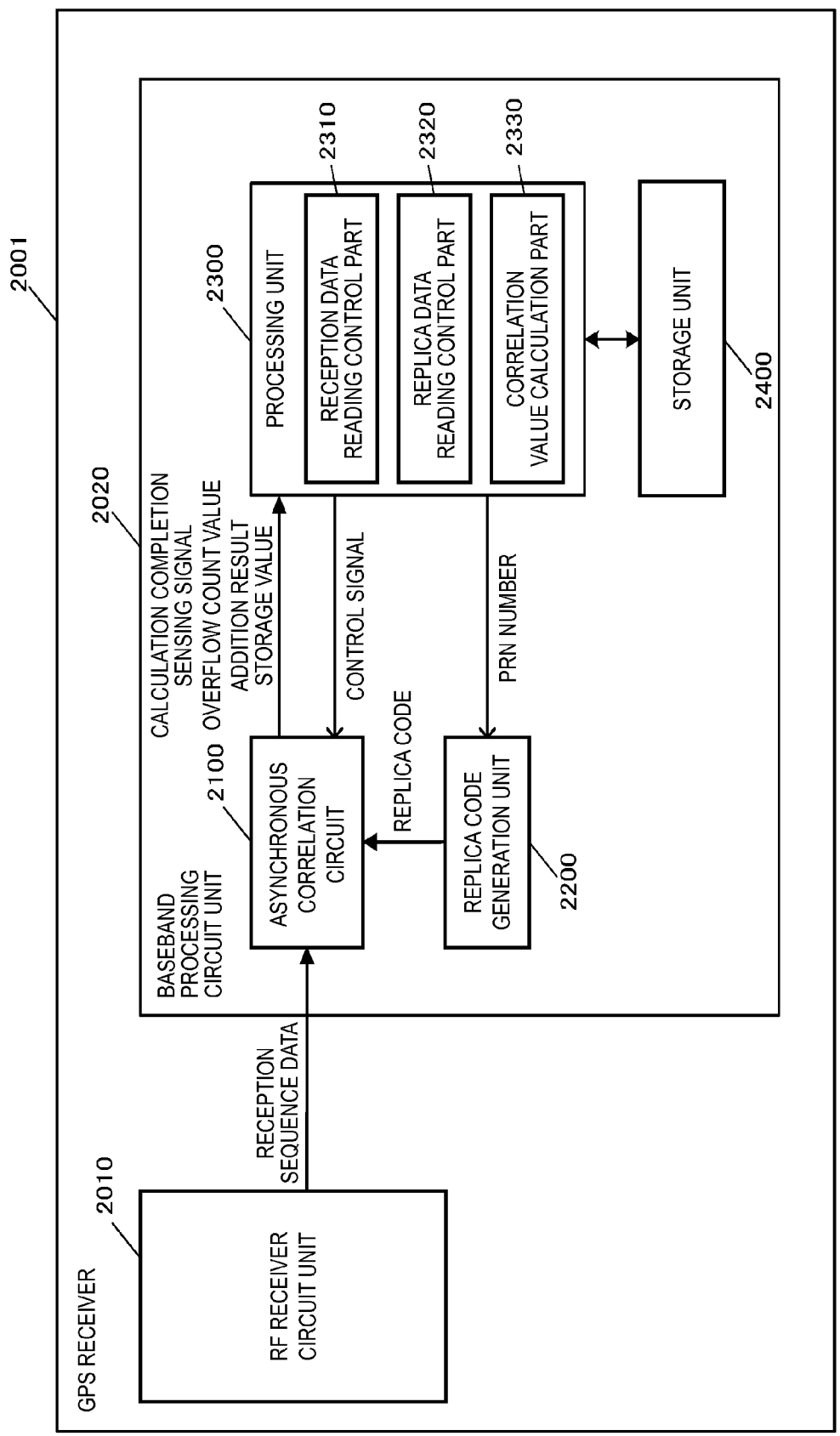
FIG. 21 is a block diagram showing an example of a functional configuration of a GPS receiver.

FIG. 21 is a block diagram showing an example of a functional configuration of a GPS receiver 2001 as a kind of the satellite signal receiving device that receives GPS satellite signals. The GPS receiver 2001 is a device adapted to calculate a location by acquiring GPS satellite signals from RF (Radio Frequency) signals received by a GPS antenna (not shown) and using the acquired GPS satellite signals. In the second embodiment, the GPS receiver functions as a correlation device that performs correlation calculation of the received signals of the GPS satellite signals and the replica codes.

The GPS receiver 2001 includes an RF receiver circuit unit 2010 and a baseband processing circuit unit 2020. Note that the RF receiver circuit unit 2010 and the baseband processing circuit unit 2020 may be manufactured as respective separate LSIs (Large Scale Integrations) or as one chip.

The RF receiver circuit unit 2010 has a receiver circuit that receives RF signals output from the GPS antenna and an A/D converter circuit that performs A/D conversion by sampling the received signals (analog signals) at given sampling time intervals, and outputs the received signals as reception sequence data.

In the second embodiment, the explanation will be made assuming that N received signals for one millisecond are sampled and N pieces of reception data D1 to DN are obtained. The reception data D1 to DN are respectively converted into M-bit digital data by quantization. Note that the highest bit is a code bit. That is, if the code bit is "0", a positive number is represented, and, if the code bit is "1", a negative number is represented based on the two's complement representation. In the second embodiment, the number of the reception data is shown using "i". That is, "Di" refers to the ith reception data.

The baseband processing circuit unit 2020 acquires GPS satellite signals by removing carrier wave (carrier) and performing correlation calculation or the like on the reception sequence data output from the RF receiver circuit unit 2010. Then, the unit calculates the location and the clock errors using time information, satellite orbit information, etc. extracted from the acquired GPS satellite signals.

In the second embodiment, the baseband processing circuit unit 2020 includes an asynchronous correlation circuit 2100, a replica code generation unit 2200, a processing unit 2300, and a storage unit 2400 as major components.

The asynchronous correlation circuit 2100 is an asynchronous type correlation circuit that performs correlation calculation of the reception sequence data output from the RF receiver circuit unit 2010 and replica codes output from the replica code generation unit 2200. The configuration and operation of the asynchronous correlation circuit 2100 will be explained later in detail.

The replica code generation unit 2200 is a circuit that generates replica codes as pseudo codes simulating the C/A (Coarse and Acquisition) codes as spread codes of the GPS satellite signals. According to a PRN number (satellite number) output from the processing unit 2300, the replica code generation unit 2200 generates the replica codes relating to the GPS satellite to which the PRN number has been assigned. The replica code generation unit 2200 includes an oscillator such as a code NCO (Numerical Controlled Oscillator).

In the second embodiment, the replica codes are sampled at the same sampling rate as that for the received signals. Specifically, the replica codes for one millisecond are sampled as N pieces of replica data C1 to CN in the same number as that for the reception data. In the second embodiment, the number of the replica data is shown using "j". That is, "Cj" refers to the jth replica data. The replica data is represented by one bit of "0" or "1".

The processing unit 2300 includes a control device and a calculation device that generally control the respective functional parts of the baseband processing circuit unit 2020, and includes a processor such as a CPU (Central Processing Unit) or a DSP (Digital Signal Processor).

The processing unit 2300 has a reception data reading control part 2310, a replica data reading control part 2320, and a correlation value calculation part 2330 as major functional parts relating to the second embodiment. These functional parts will be described later.

The storage unit 2400 stores system programs of the baseband processing circuit unit 2020, various programs and data for realization of various functions including a satellite acquisition and tracking control function and a location calculation function, etc. Further, the unit has a work area for temporary storage of data in processing, processing results etc. of various kinds of processing.

2-2. Asynchronous Correlation Circuit

Figure 22:
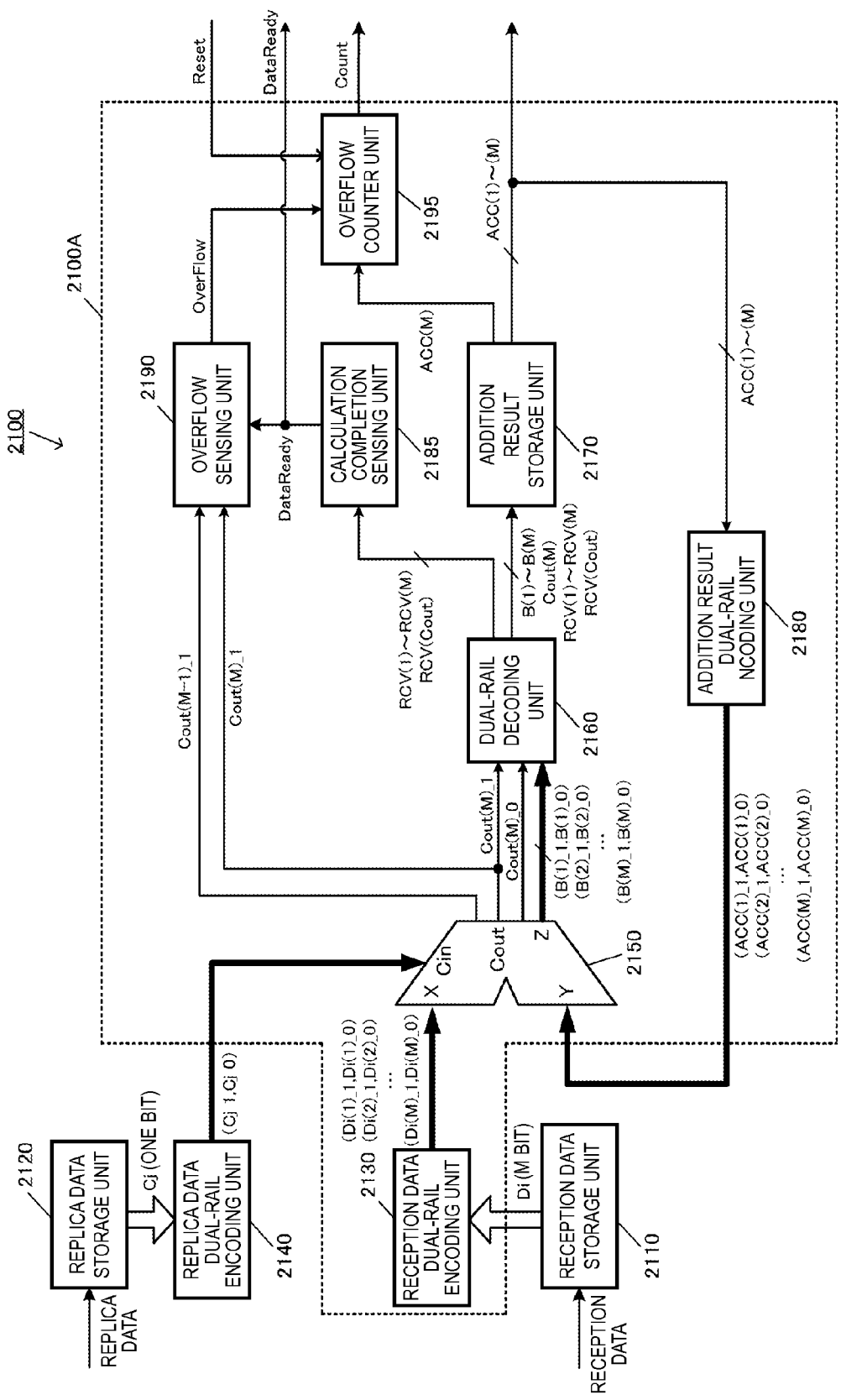
FIG. 22 shows an example of a circuit configuration of an asynchronous correlation circuit.

FIG. 22 shows an example of a circuit configuration of the asynchronous correlation circuit 2100. In the drawings for reference, flows of dual-rail-encoded data are shown by thick lines for distinction from non-dual-rail-encoded data.

The asynchronous correlation circuit 2100 includes a reception data storage unit 2110, a replica data storage unit 2120, a reception data dual-rail encoding unit 2130, a replica data dual-rail encoding unit 2140, an asynchronous full addition unit 2150, a dual-rail decoding unit 2160, an addition result storage unit 2170, an addition result dual-rail encoding unit 2180, a calculation completion sensing unit 2185, an overflow sensing unit 2190, and an overflow counter unit 2195.

The reception data dual-rail encoding unit 2130, the asynchronous full addition unit 2150, the dual-rail decoding unit 2160, the addition result storage unit 2170, the addition result dual-rail encoding unit 2180, the calculation completion sensing unit 2185, the overflow sensing unit 2190, and the overflow counter unit 2195 form an asynchronous full adder circuit 2100A.

The reception data storage unit 2110 is a storage circuit that stores the M-bit reception data Di forming the reception sequence data output from the RF receiver circuit unit 2010. The reception data storage unit 2110 has a group of reception data registers that respectively correspond to the reception data Di and store the reception data Di.

The replica data storage unit 2120 is a storage device that stores one-bit replica data Cj forming the replica codes output from the replica code generation unit 2200. The replica data storage unit 2120 has a group of replica data registers that respectively correspond to the replica data Cj and store the replica data Cj.

The reception data dual-rail encoding unit 2130 dual-rail-encodes the reception data Di output from the reception data storage unit 2110 according to a dual-rail encoding method. The reception data dual-rail encoding unit 2130 has dual-rail encoders respectively corresponding to the reception data registers forming the reception data storage unit 2110, for example. The reception data dual-rail encoding unit 2130 corresponds to the first dual-rail encoding unit.

The replica data dual-rail encoding unit 2140 dual-rail-encodes the replica data Cj output from the replica data storage unit 2120 according to a dual-rail encoding method. The replica data dual-rail encoding unit 2140 has dual-rail encoders respectively corresponding to the replica data registers forming the replica data storage unit 2120, for example. The replica data dual-rail encoding unit 2140 corresponds to the third dual-rail encoding unit.

Table 3 shows a truth table of the dual-rail encoding method.

TABLE 3

|  | b_1 | b_0 |
|---|---|---|
| Null | 0 | 0 |
| 0 | 0 | 1 |
| 1 | 1 | 0 |
| Inhibit | 1 | 1 |

The dual-rail encoding method is a method of representing one-bit data b using a pair of two signal lines "(b_1, b_0)". "b_1" corresponds to a positive signal line and "b_0" corresponds to a negative signal line.

In the dual-rail encoding method, the data b takes either of "1" or "0" as a valid code word or "Null" as an invalid code word. By the dual-rail encoding, "0" as the valid code word is converted into (0,1) and "1" as the valid code word is converted into (1,0). "Null" as the invalid code word is converted into (0,0). Note that "(1,1)" is called Inhibit and an improper value that is impossible to be taken in operation.

In the asynchronous circuit, input and output of data between the circuit blocks are performed using the bit values dual-rail-encoded according to the dual-rail encoding method. The input and output of data are performed using the valid code word "1" or "0". The invalid code word "Null" is used at non-calculation time and for delimitation of respective data. If the same valid code word is continuously transmitted, it is impossible to identify the delimitation of data at the reception side, and identification of the valid code words is enabled by alternating transmission of the valid code words and the invalid code words.

In the specification and the drawings, the numbers from one to M are assigned to the bits of data represented by M bits sequentially from the lower bits and shown with parentheses immediately after the characters representing data and signals. For example, the lowest bit of the reception data Di is shown by Di(1), and the highest bit is shown by Di(M). This applies to the dual-rail-encoded data. For example, the lowest bit of the dual-rail-encoded reception data Di is shown by (Di(1)_1,Di(1)_0), and the highest bit is shown by (Di(M)_1,Di(M)_0). This applies to the other data and signals.

The asynchronous full addition unit 2150 adds the output value of the reception data dual-rail encoding unit 2130 to the output value of the addition result dual-rail encoding unit 2180 with a sign in response to the output value of the replica data dual-rail encoding unit 2140 for output. The asynchronous full addition unit 2150 includes M one-bit asynchronous full adders connected in cascade arrangement. The asynchronous full addition unit 2150 includes a first input port X, a second input port Y, a carry input port Cin, an output port Z, and a carry output port Cout.

To the first input port X, reception data (Di_1,Di_0) dual-rail-encoded by the reception data dual-rail encoding unit 2130 is input. The reception data Di has M bits and, more specifically, a set of M dual-rail-encoded reception data (Di(1)_1,Di(1)_0), (Di(2)_1,Di(2)_0), . . . , (Di(M)_1,Di(M)_0) are input.

To the second input port Y, a storage value (ACC_1, ACC_0) of the addition result storage unit 2170 dual-rail-encoded by the addition result dual-rail encoding unit 2180 is feedback-input. The storage value ACC has M bits and, more specifically, a set of M dual-rail-encoded storage values (ACC(1)_1,ACC(1)_0), (ACC(2)_1,ACC(2)_0), . . . , (ACC(M)_1,ACC(M)_0) are input.

To the carry input port Cin, replica data (Cj_1,Cj_0) dual-rail-encoded by the replica data dual-rail encoding unit 2140 is input.

The asynchronous full addition unit 2150 uses the one-bit replica data Cj as carry input and adds the reception data Di to the storage value ACC dual-rail-encoded by the addition result dual-rail encoding unit 2180 with a sign in response to the replica data Cj. That is, if the replica data Cj is "0", the reception data Di is added to the storage value ACC (i.e. addition), and, if the replica data Cj is "1", the reception data Di with its sign inverted is added to the storage value ACC (i.e., subtraction). Then, an addition value B as an addition result is output from the output port Z and the carry output value (carry output value) Cout is output from the carry output port Cout.

The reception data reading control part 2310 and the replica data reading control part 2320 as the functional parts of the processing unit 2300 perform control of sequentially reading out the reception data Di and the replica data Cj from the reception data storage unit 2110 and the replica data storage unit 2120, respectively, and outputting the data to the reception data dual-rail encoding unit 2130 and the replica data dual-rail encoding unit 2140, respectively. Thereby, the dual-rail-encoded reception data Di and replica data Cj are sequentially supplied to the asynchronous full addition unit 2150, and correlation calculation of the reception data Di and the replica data Cj is performed in the asynchronous full addition unit 2150.

The dual-rail decoding unit 2160 decodes the dual-rail-encoded addition value B and the carry output value Cout output from the asynchronous full addition unit 2150 according to the dual-rail encoding method. In the asynchronous full addition unit 2150, calculation using the dual-rail-encoded data is performed and the calculation result is also dual-rail-encoded, and thereby, the addition value B is decoded according to the true table of Table 3 and output to the addition result storage unit 2170. Further, the dual-rail decoding unit 2160 outputs a decoding completion signal RCV, which will be described later, to the calculation completion sensing unit 2185.

The addition result storage unit 2170 is a storage circuit that stores the addition value B dual-rail-decoded by the dual-rail decoding unit 2160, and is formed as an accumulator, for example. In the second embodiment, the explanation is made with the number of significant digits of the addition result storage unit 2170 as M digits. The addition value B stored in the addition result storage unit 2170 is output to the processing unit 2300 as the storage value ACC and feedback-output to the addition result dual-rail encoding unit 2180.

The addition result dual-rail encoding unit 2180 dual-rail-encodes the storage value ACC input from the addition result storage unit 2170. The dual-rail-encoded storage value ACC is output to the second input port Y of the asynchronous full addition unit 2150. The addition result dual-rail encoding unit 2180 corresponds to the second dual-rail encoding unit.

The calculation completion sensing unit 2185 senses completion of one calculation by the asynchronous full addition unit 2150 based on the decoding completion signal RCV output from the dual-rail decoding unit 2160. When sensing calculation completion of all one-bit asynchronous full adders forming the asynchronous full addition unit 2150, the calculation completion sensing unit 2185 outputs a calculation completion signal DataReady to the overflow sensing unit 2190.

The overflow sensing unit 2190 senses occurrence of overflow of the asynchronous full addition unit 2150 based on the carry output of the one-bit asynchronous full adder at the highest digit and the carry output of the one-bit asynchronous full adder at the digit lower by one digit than the highest digit output from the asynchronous full addition unit 2150. Then, the unit outputs an overflow sensing signal OverFlow to the overflow counter unit 2195 according to the calculation completion sensing signal DataReady output from the calculation completion sensing unit 2185.

The overflow counter unit 2195 has a counter that counts the number of times of sensing of the overflow sensing unit 2190 based on the highest bit ACC (M) of the addition value ACC output from the addition result storage unit 2170 and the overflow sensing signal OverFlow output from the overflow sensing unit 2190. The overflow counter unit 2195 outputs a count value Count to the processing unit 2300. Further, the overflow counter unit 2195 is reset-controlled according to a reset signal Reset output from the processing unit 2300.

2-3. Asynchronous Full Addition Unit

Figure 23:
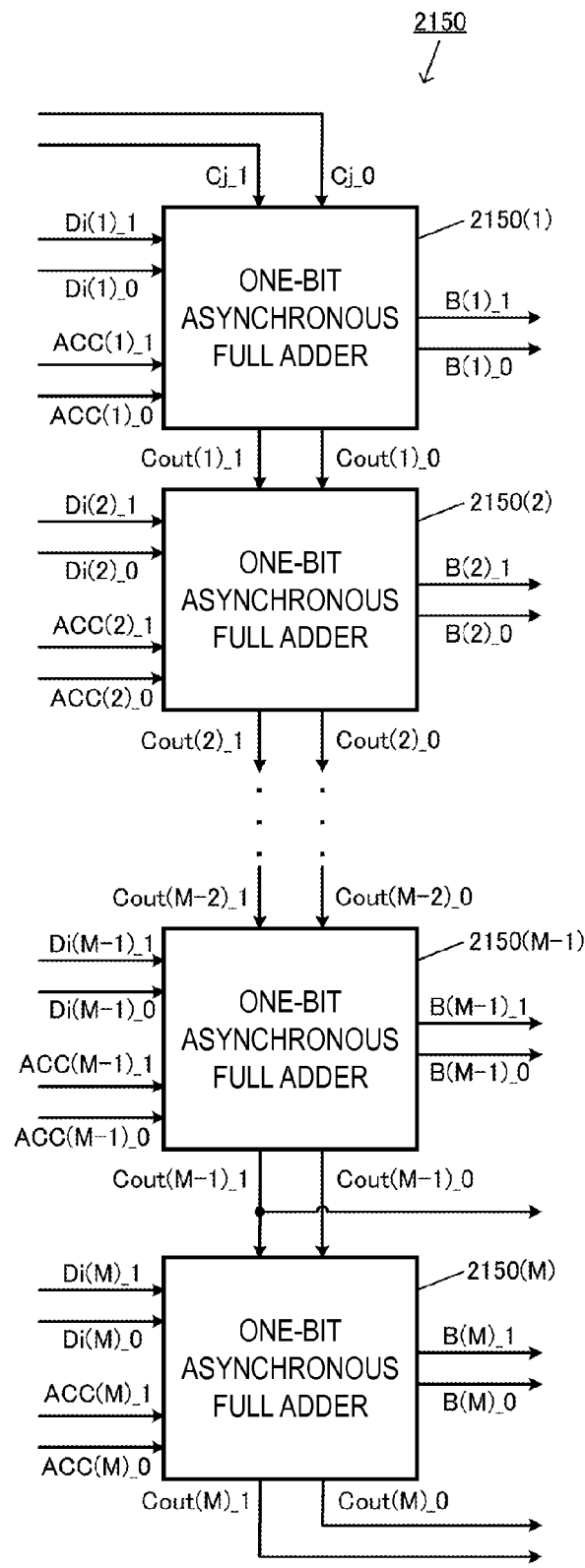
FIG. 23 shows an example of a circuit configuration of an asynchronous full addition unit.

FIG. 23 shows an example of a circuit configuration of the asynchronous full addition unit 2150. The asynchronous full addition unit 2150 is formed by cascade connection of M one-bit asynchronous full adders 2150(1) to 2150(M). To the respective one-bit asynchronous full adders 2150(1) to 2150(M), the dual-rail-encoded data having the corresponding number of the reception data Di and the dual-rail-encoded data having the corresponding number of the storage value ACC are input. The dual-rail-encoded addition value B calculated in each of the one-bit asynchronous full adders 2150(1) to 2150(M) is output to the dual-rail decoding unit 2160 and the carry output value Cout is carry-output to the next higher one-bit asynchronous full adder.

To the lowermost one-bit asynchronous full adder 2150(1), the dual-rail-encoded reception data (Di(1)_1,Di(1)_0) and the dual-rail-encoded storage value (ACC(1)_1,ACC(1)_0) are input. Further, the dual-rail-encoded replica data (Cj_1, Cj_0) is carry-input. Then, the addition value (B(1)_1,B(1)_0) as the addition result is output to the dual-rail decoding unit 2160. Further, the carry output value (Cout(1)_1, Cout(1)_0) is carry-output to the next higher one-bit asynchronous full adder 2150(2).

The same applies to the subsequent adders, and the carry-output value (Cout(M−1)_1,Cout(M−1)_0) of the one-bit asynchronous full adder 2150(M−1) at the (M−1) digit is carry output to the one-bit asynchronous full adder 2150(M) at the M digit (the highest digit). Further, the carry output value Cout(M−1)_1 transmitting in the positive signal line is output to the overflow sensing unit 2190.

The carry output value (Cout(M)_1,Cout(M)_0) of the one-bit asynchronous full adder 2150(M) at the M digit (the highest digit) is output to the dual-rail decoding unit 2160 as the carry output value Cout of the asynchronous full addition unit 2150. Further, the carry output value Cout(M)_1 transmitting in the positive signal line is output to the overflow sensing unit 2190.

2-4. Dual-Rail Decoding Unit

Figure 24:
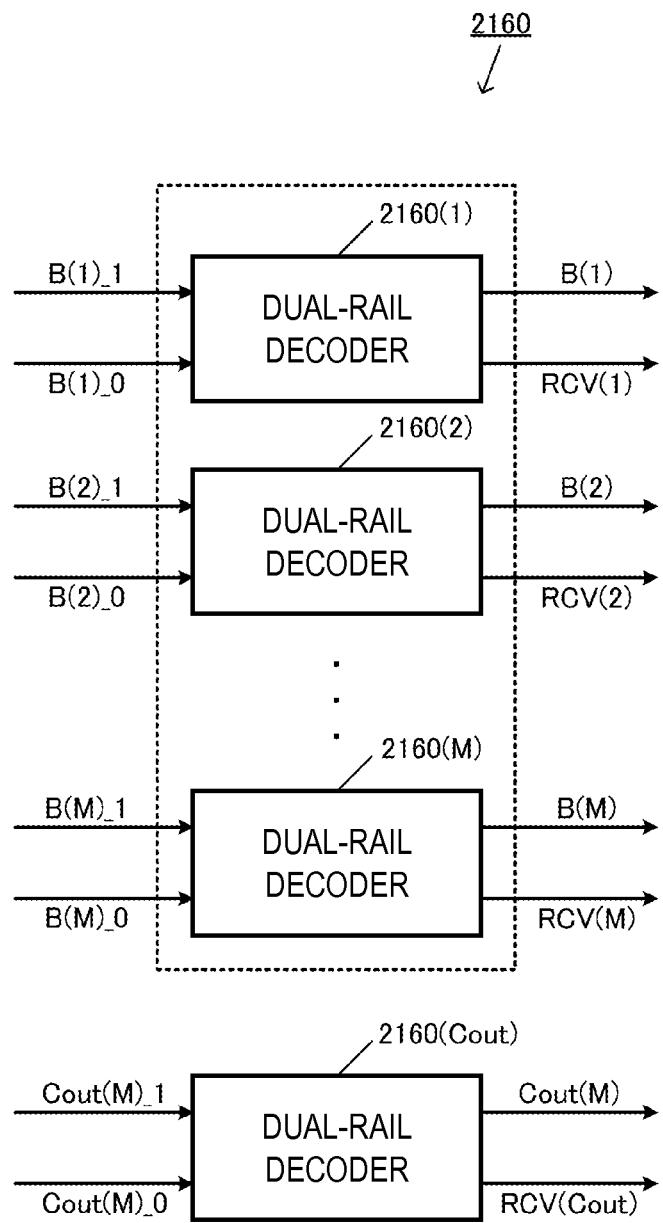
FIG. 24 shows an example of a circuit configuration of a dual-rail decoding unit.

FIG. 24 shows an example of a circuit configuration of the dual-rail decoding unit 2160.

The dual-rail decoding unit 2160 has (M+1) dual-rail decoders in total including dual-rail decoders 2160(1) to 2160(M) for M sets of addition values that respectively dual-rail decode the M sets of dual-rail-encoded addition values (B(1)_1,B(1)_0) to (B(M)_1,B(M)_0) output from the asynchronous full addition unit 2150 and the dual-rail decoder 2160(Cout) for carry output value that dual-rail decodes the carry output value (Cout(M)_1,Cout(M)_0) output from the asynchronous full addition unit 2150.

The addition value dual-rail decoders 2160(1) to 2160(M) respectively dual-rail-decode the addition values (B(1)_1,B(1)_0) to (B(M)_1,B(M)_0) and respectively output the addition values B(1) to B(M) as the decoding results to the addition result storage unit 2170. Further, the dual-rail decoders 2160(1) to 2160(M) respectively output the decoding completion signals RCV(1) to RCV(M) that represent completion of decoding to the calculation completion sensing unit 2185.

The carry output dual-rail decoder 2160(Cout) dual-rail-decodes the carry output value (Cout(M)_1,Cout(M)_0) and outputs the carry output value Cout(M) as the decoding result to the addition result storage unit 2170. Further, dual-rail decoder 2160(Cout) outputs the decoding completion signal RCV(Cout) that represents completion of decoding to the calculation completion sensing unit 2185.

Table 4 shows a truth table relating to decoding of the dual-rail decoding unit 2160.

TABLE 4

| Input | | Output | |
|---|---|---|---|
| A | B | C | RCV |
| 0 | 0 | Null | 0 |
| 0 | 1 | 0 | 1 |
| 1 | 0 | 1 | 1 |
| 1 | 1 | — | — |

Decoding with respect to the addition value and the carry output value is performed according to the truth table of dual-rail encoding shown in Table 3. That is, the input of (0,0) is decoded to "Null", the input of (0,1) is decoded to "0", and the input of (1,1) is decoded to "1". Note that (1,1) is an improper value, and it is preferable to inform the system that abnormality has occurred in circuit operation if the value is input, for example.

The decoding completion signal RCV is determined so that "0" may be output for the input (0,0) and "1" may be output for the input (0,1) or (1,0). That is, if a valid code word is input, the decoding completion signal RCV is set to "HIGH" and, if an invalid code word is input, the decoding completion signal RCV is set to "LOW".

2-5. Calculation Completion Sensing Unit and Overflow Sensing Unit

Figure 25:
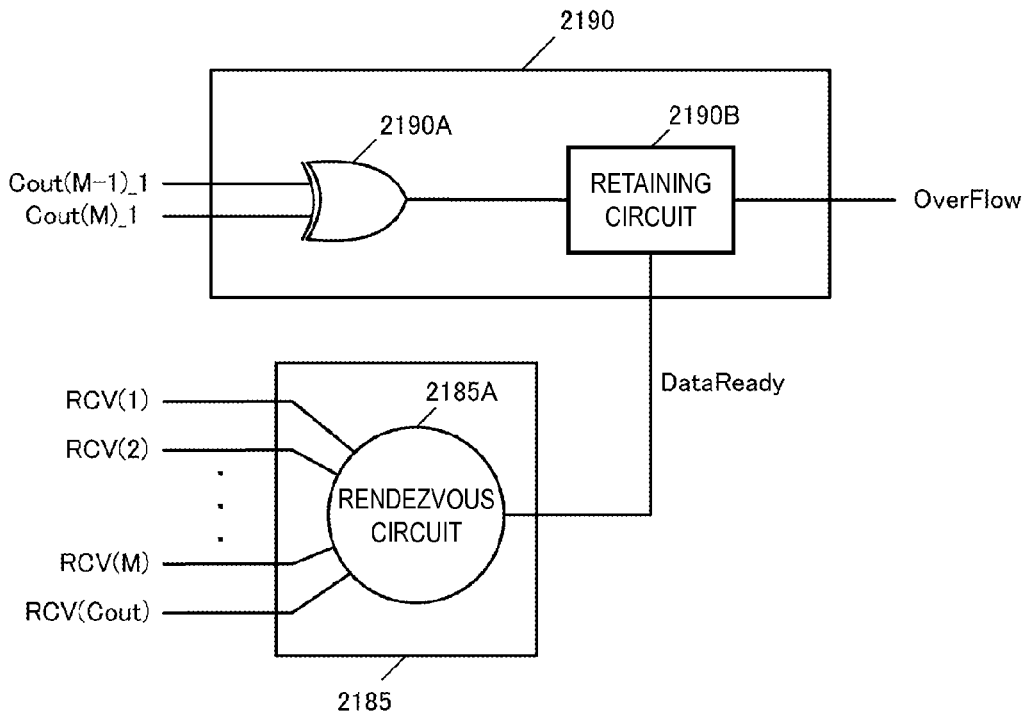
FIG. 25 shows an example of a circuit configuration of a calculation completion sensing unit and an overflow sensing unit.

FIG. 25 shows an example of a circuit configuration of the calculation completion sensing unit 2185 and the overflow sensing unit 2190.

The calculation completion sensing unit 2185 has an (M+1) input rendezvous circuits 2185A. Specifically, (M+1) decoding completion signals RCV including the decoding completion signals RCV(1) to RCV(M) respectively output from the dual-rail decoders 2160(1) to 2160(M) and the decoding completion signal RCV(Cout) output from the dual-rail decoder 2160(Cout) are input to the rendezvous circuit 2185A.

The rendezvous circuit 2185A is a circuit that outputs "0" if all input values are the same "0" and outputs "1" if all input values are the same "1". The circuit contains a storage element and, if there is any one different input value, retains the last value and does not change its output. Therefore, the calculation completion sensing unit 2185 outputs "1" as the output value when the decoding completion signals RCV output from the all dual-rail decoders of the dual-rail decoding unit 2160 are "HIGH". The output from the calculation completion sensing unit 2185 is output to a retaining circuit 2190B of the overflow sensing unit 2190 as the calculation completion sensing signal DataReady.

The overflow sensing unit 2190 has an EXOR (EXclusive OR) circuit 2190A and the retaining circuit 2190B. The EXOR circuit 2190A is a circuit for calculation of two input exclusive OR, and the carry output value Cout(M)_1 of the asynchronous full adder 2150(M) at the highest digit and the carry output value Cout (M-1)_1 of the one-bit asynchronous full adder 2150(M-1) at the digit lower by one digit than the highest digit are input.

In the case of using the two's complement representation, the overflow of the asynchronous full addition unit 2150 may be detected using the carry output value from the MSB 2 bits. For example, a four-bit full adder is supposed and the case where overflow occurs in a negative range of number is exemplified.

The range of number that may be handled by the four-bit full adder is "−8 to +7". In this case, for example, if "−8" and "−1" are added, overflow occurs. In the signed binary, "−8" is "1000" and "−1" is "1111". When the two numbers are added, "10111" is obtained and beyond the range of number that may be handled by the four-bit full adder, and causes overflow.

In this case, the carry output value from the highest one-bit asynchronous full adder is "1", and the carry output value from the one-bit asynchronous full adder at the digit lower by one digit than the highest digit is "0". The two carry output values are different, and thereby, occurrence of overflow may be determined. The case where overflow occurs by addition of positive values may be considered in the same way. Therefore, the occurrence of overflow may be easily sensed by the exclusive OR of the carry output value from the MSB 2 bits.

Note that, in the second embodiment, the carry output values Cout(M)_1 and Cout(M−1)_1 transmitting in the positive signal line output from the asynchronous full addition unit 2150 are input to the EXOR circuit 2190A for sensing of the occurrence of overflow, however, the carry output values Cout(M)_0 and Cout(M−1)_0 transmitting in the negative signal line may be input for sensing of the occurrence of overflow.

The retaining circuit 2190B is a latch circuit that retains the output value of the EXOR circuit 2190A at rising of the calculation completion sensing signal DataReady output from the calculation completion sensing unit 2185. That is, the retaining circuit 2190B latches the calculation value of the EXOR circuit 2190A when the calculation completion sensing signal DataReady rises from "0" to "1", and outputs it as the overflow sensing signal OverFlow to the overflow counter unit 2195.

2-6. Overflow Counter Unit

Figure 26:
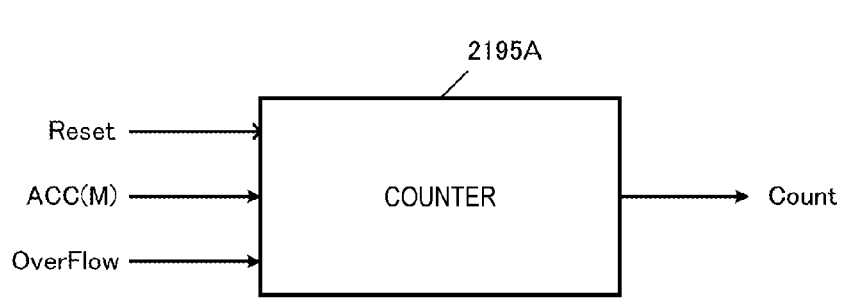
FIG. 26 shows an example of a configuration of an overflow counter unit.

FIG. 26 shows an example of a circuit configuration of the overflow counter unit 2195.

The overflow counter unit 2195 has a counter 2195A for a predetermined number of bits. To the counter 2195A, a reset signal Reset output from the processing unit 2300, the highest bit ACC (M) of the storage value output from the addition result storage unit 2170, and the overflow sensing signal OverFlow output from the overflow sensing unit 2190 are input.

The counter 2195A increases and decreases the count value one by one at each time when the positive logic overflow sensing signal OverFlow is input. The increase and decrease of the count value are determined by the highest bit ACC(M) of the storage value. The ACC(M) is a sign bit and, if ACC(M) is "0", occurrence of overflow in the positive range of number is determined and the count value is increased. On the other hand, if ACC(M) is "1", occurrence of overflow in the negative range of number is determined and the count value is decreased. The counter 2195A outputs the count value to the processing unit 2300.

2-7. Calculation Processing of Correlation Values

Figure 27:
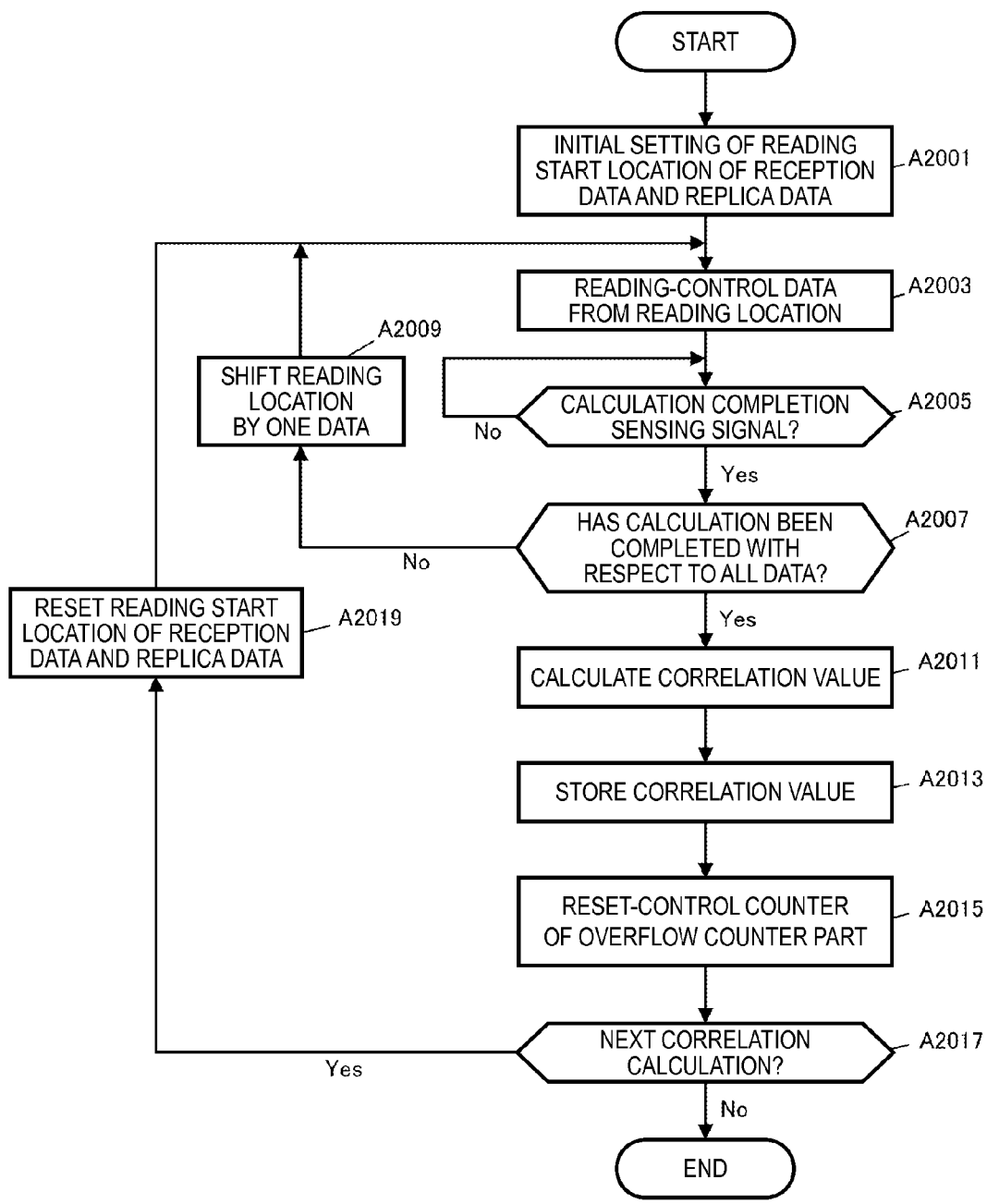
FIG. 27 is a flowchart showing a flow of calculation processing of correlation values.

FIG. 27 is a flowchart showing a flow of calculation processing of correlation values executed by the processing unit 2300 of the baseband processing circuit unit 2020. The processing unit 2300 performs the processing according to the program stored in the storage unit 2400.

First, the processing unit 2300 respectively initially sets the reading start locations of the reception data and the replica data (step A2001). In the first correlation calculation, for example, the reading start location is set to the storage location of the first data D1 of the N pieces of reception data Di and the reading start location is set to the storage location of the first data C1 of the N pieces of replica data Cj.

Then, the reception data reading control part 2310 reads out the reception data Di from the currently set reading location of the reception data storage unit 2110 and outputs the data to the reception data dual-rail encoding unit 2130 (step A2003). Similarly, the replica data reading control part 2320 reads out the replica data Cj from the currently set reading location of the replica data storage unit 2120 and outputs the data to the replica data dual-rail encoding unit 2140 (step A2003).

Then, the processing unit 2300 waits until the calculation completion sensing signal is input from the calculation completion sensing unit 2185 (step A2005; No), and, if the calculation completion sensing signal is input (step A2005; Yes), determines whether or not the calculation in the asynchronous full addition unit 2150 has been completed with respect to all of the N pieces of data of the reception data Di and the replica data Cj (step A2007).

If determination that the calculation has not yet completed is made (step A2007; No), the processing unit 2300 shifts the reading locations of the reception data and the replica data by one piece of data (step A2009). Then, the unit returns to step A2003.

On the other hand, if determination that the calculation in the asynchronous full addition unit 2150 has been completed with respect to all of the data is made (step A2007; Yes), the correlation value calculation part 2330 calculates the correlation values of the reception sequence data and the replica codes (step A2011).

Figure 28:
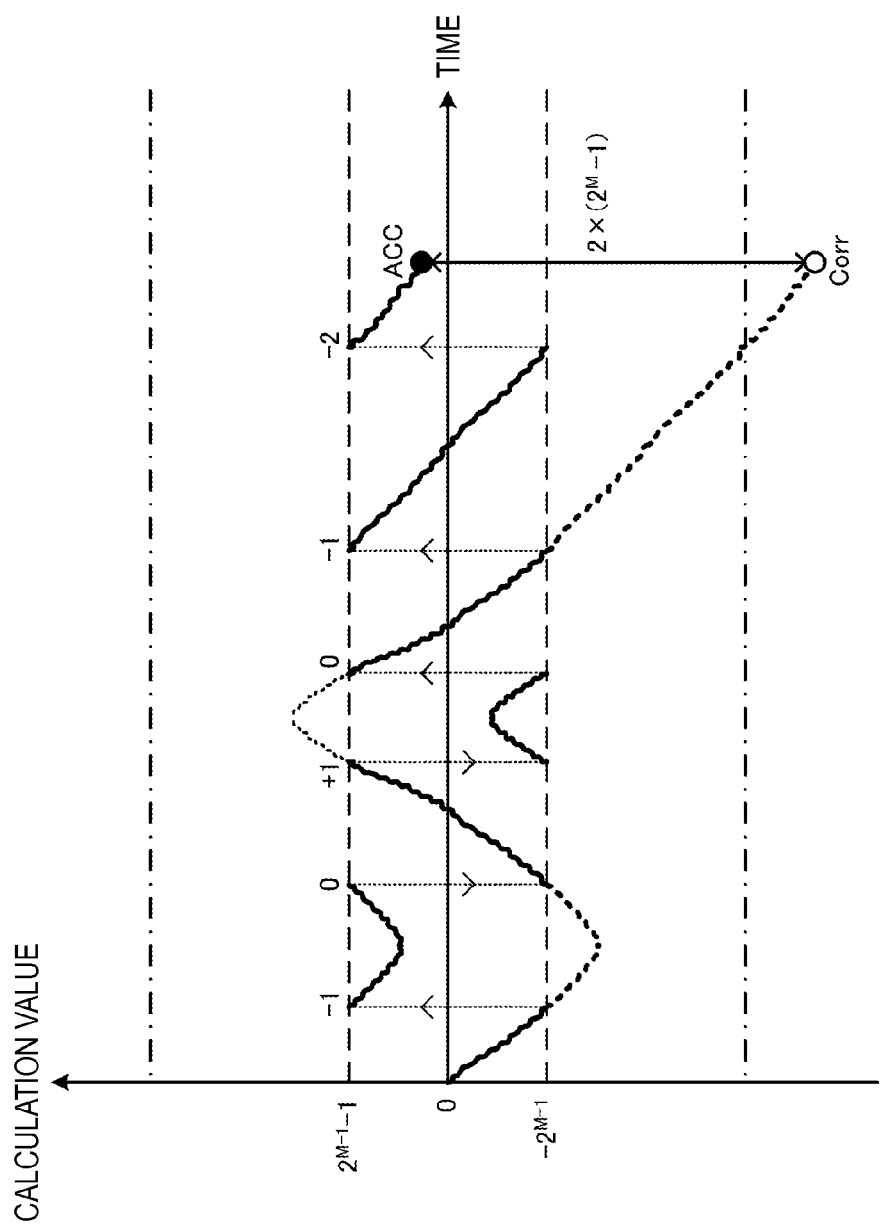
FIG. 28 is an explanatory diagram of a principle of calculation of a correlation value.

FIG. 28 is an explanatory diagram of a method of calculating a correlation value. In FIG. 28, the horizontal axis is a time axis and the vertical axis indicates a product sum value of the asynchronous full addition unit 2150. The range of number surrounded by two broken lines shown in parallel to the time axis is a range of number representing the number of significant digits of the addition result storage unit 2170. In the second embodiment, the number of significant digits of the addition result storage unit 2170 is M digits, and the range of number is "$-2^{M-1}$ to $2^{M-1}-1$".

FIG. 28 shows an example of the temporal change of the product sum value obtained by product-sum operation of the reception data Di and the replica data Cj. The thick dotted line in the drawing is the product sum value. Further, the thick solid line in the drawing is the storage value ACC stored in the addition result storage unit 2170.

In FIG. 28, first, the product sum value decreases and, when falling below the range of number of the addition result storage unit 2170, overflow occurs in the asynchronous full addition unit 2150 and the count value becomes "−1". In this case, the overflow occurs in the negative range of number, and thus, the product sum value that is supposed to be a negative value is stored as a positive value in the addition result storage unit 2170.

Then, the product sum value increases and, when reaching within the range of number of the addition result storage unit 2170, overflow occurs again in the asynchronous full addition unit 2150 and the count value becomes "0" from "−1". Then, the product sum value increases and, when rising above the range of number of the addition result storage unit 2170, overflow occurs in the asynchronous full addition unit 2150 and the count value becomes "+1". In this case, the overflow occurs in the positive range of number, and thus, the product sum value that is supposed to be a positive value is stored as a negative value in the addition result storage unit 2170.

Then, for example, suppose that the product sum value changes to decrease and, when falling below the range of number of the addition result storage unit 2170, the count value becomes "−1", then, the product sum value continues to decrease and overflow further occurs again and the count value becomes "−2". Then, suppose that the calculation is completed with respect to all of the data.

In this case, the correlation value calculation part 2330 calculates a correlation value Corr (white circle in the drawing) from the storage value ACC (black circle in the drawing) stored in the addition result storage unit 2170. In FIG. 28, the difference between the storage value ACC and the correlation value Corr corresponds to two ranges of number of the addition result storage unit 2170, i.e., "$2 \times (2^M - 1)$". Accordingly, the correlation value Corr may be calculated as "Corr=ACC+ $(-2) \times (2^M - 1)$".

This is generalized, and the correlation value Corr may be calculated in the following equation (3) using the number of asynchronous full adders 2150M, the count value Count of the overflow counter unit 2195, and the storage value ACC of the addition result storage unit 2170.

$$\text{Corr} = ACC + \text{Count} \times (2^M - 1) \qquad (3)$$

Returning to the explanation of FIG. 27, the processing unit 2300 allows the storage unit 2400 to store the calculated correlation value (step A2013). Then, the processing unit 2300 outputs the reset signal to the overflow counter unit 2195 to reset-control the counter 2195A (step A2015). One correlation calculation ends with the processing so far.

Suppose that the amount of shift of the replica data with respect to the reception data is "k", the correlation value "Corr(k)" may be formulated as in the following equation (4).

$$\text{Corr}(k) = \sum_{i=1}^{N} Di \cdot C(i+k) \qquad (4)$$

In the first correlation calculation, the amount of shift of the replica data with respect to the reception data is set to zero (k=0), and the calculated correlation value "Corr(0)" is expressed by the following equation (5).

$$\text{Corr}(0) = D1 \cdot C1 + D2 \cdot C2 + D3 \cdot C3 + D4 \cdot C4 + \ldots + DN \cdot CN \qquad (5)$$

Then, the processing unit 2300 determines whether or not to perform the next correlation calculation (step A2017). If the determination to perform the next correlation calculation is made (step A2017; Yes), the processing unit 2300 resets the reading start locations of the reception data and the replica data (step A2019).

Specifically, to perform correlation calculation of the reception sequence data and the replica codes with phase shift, the reading start location of one data of the reception data and the replica data is shifted by one piece of data and the reading start location of the other data is not changed as it is. Then, the processing unit 2300 returns to step A2003.

For example, the phase of the replica code is shifted and the reading start location of the replica data is shifted by one piece of data, and thereby, the correlation value "Corr(1)" given by the following equation (6) is calculated at step A2011 of the next correlation calculation.

$$\text{Corr}(1) = D1 \cdot C2 + D2 \cdot C3 + D3 \cdot C4 + D4 \cdot C5 + \ldots + DN \cdot C1 \qquad (6)$$

On the other hand, if the determination not to perform the next correlation calculation is made at step S2017 (step A2017; No), the processing unit 2300 ends the calculation processing of the correlation value.

2-8. Advantages

In the asynchronous correlation circuit 2100, the reception data of the GPS satellite signals is dual-rail-encoded by the reception data dual-rail encoding unit 2130 (the first dual-rail encoding unit). Further, the storage value of the addition result storage unit 2170 is dual-rail-encoded by the addition result dual-rail encoding unit 2180 (the second dual-rail encoding unit). The asynchronous full addition unit 2150 includes the cascade-connected M one-bit asynchronous full adders 2151(1) to 2150(M). Further, the product-sum calculation of the reception data and the replica data is performed by adding the output value of the reception data dual-rail encoding unit 2130 to the output value of the addition result dual-rail encoding unit 2180 with the sign in response to the output value of the replica data dual-rail encoding unit 2140.

In the ripple-carry full adder circuit including the cascade-connected one-bit full adders, the carry output sequentially propagates from the lowest bit to the highest bit. Accordingly, the propagation path of the carry output is the critical path, and a delay time proportional to the bit length of the data to be added is caused until the calculation result of the highest bit and the carry output thereof are settled. However, the asynchronous full addition unit 2150 of the second embodiment is the asynchronous type, and the expectation value of the delay time is determined by the average calculation time of the individual one-bit asynchronous full adders. Therefore, in the asynchronous full adder circuit 2100A of the second embodiment, the advantage that the delay time is made shorter than that in the synchronous full adder circuit may be expected.

Further, in the asynchronous correlation circuit 2100 of the second embodiment, the overflow sensing unit 2190 senses occurrence of overflow of the asynchronous full addition unit 2150 based on the carry output of the asynchronous full adder at the highest digit and the carry output of the asynchronous full adder at the digit lower by one digit than the highest digit of the asynchronous full addition unit 2150. Then, the overflow counter unit 2195 counts the number of times of sensing of the overflow sensing unit 2190 by addition or subtraction according to the value of the sign bit.

Specifically, overflow may occur in either the positive range of number or the negative range of number, and, if the value of the sign bit is "0" (i.e., the positive number), the count value is increased and, if the value of the sign bit is "1" (i.e., the negative number), the count value is decreased. Thereby, the processing unit 2300 may correctly calculate the correlation value of the reception data and the replica data from the equation (3) using the number of one-bit asynchronous full adders M, the count value of the counter 2190A, and the storage value of the addition result storage unit 2170.

Therefore, the full adders for the number of digits assumed as the final correlation value are not necessarily required and the number of cascade-connected full adders may be reduced, and thus, the correlation calculation of the larger number of digits may be performed while the circuit size is reduced. Further, in the case where the correlation circuit is formed by the synchronous design method, the power consumption tends to increase in proportion to the frequency of the clock signal. However, the asynchronous correlation circuit 2100 of the second embodiment has no clock, and the power consumption is reduced in the absence of power consumption with the clock signal. Further, there is no upper limit to the high-speed operation due to the clock frequency, and the high-speed operation may be performed.

2-9. Modified Examples

Obviously, the embodiment to which the invention may be applied is not limited to the above described second embodiment, but changes may be appropriately made without departing from the scope of the invention. As below, the modified examples will be explained.

2-9-1. Application Examples

In the above described second embodiment, the example of the case where the asynchronous full adder circuit of the invention is provided and used in the asynchronous correlation circuit for correlation calculation of the received signals of the GPS satellite signals and the replica codes has been explained, however, the application example of the asynchronous full adder circuit is not limited to that. In the asynchronous full adder circuit of the invention, cumulative addition of the input may be asynchronously performed.

For example, a calculation device including the asynchronous full adder circuit may be formed. In this case, the asynchronous full addition unit of the asynchronous full adder circuit performs cumulative addition of given input. The overflow sensing unit of the asynchronous full adder circuit senses occurrence of overflow of the asynchronous full addition unit and the overflow counter unit counts the number of times of sensing like the second embodiment. Then, a processing unit (calculation unit) of the calculation device calculates a cumulative addition value in the asynchronous full adder circuit using the number of asynchronous full adders M, the count value of the counter, and the storage value of the addition result storage unit in the same manner as that of the second embodiment.

Further, in the system for data communication using the CDMA (Code Division Multiple Access) method, transmission data is diffusion-modulated using spread codes at the transmitter side and the diffusion-modulated data is inversely diffused at the receiver side and the transmission data is demodulated. In the inverse diffusion, it is necessary to know the phase of the spread codes of the received signal, and thus, correlation calculation of the received signals and the pseudo spread codes is necessary. Therefore, the asynchronous correlation circuit of the invention may be applied to other communication systems than the satellite positioning system.

2-9-2. Parallelization of Circuit

In the above described second embodiment, the explanation that one asynchronous correlation circuit is provided and correlation calculation is repeatedly executed by one asynchronous correlation circuit with shift of the reading start location of the reception data or the replica data has been made. However, a plurality of the asynchronous correlation circuits may be arranged and the respective asynchronous correlation circuits may be allowed to perform correlation calculation of the received signals and the replica codes with different phases in parallel.

This applies to the asynchronous full adder circuit. That is, the circuit may be adapted so that a plurality of the asynchronous full adder circuits may be arranged and the respective asynchronous full adder circuits are allowed to perform cumulative addition of input data in parallel and the final cumulative addition value may be calculated using these addition values.

2-9-3. Electronic Equipment

The asynchronous full adder circuit and the asynchronous correlation circuit of the above described second embodiment may be provided in various calculation devices and correlation devices for use. Further, as electronic equipment including the calculation device and the correlation device, for example, various kinds of electronic equipment including a portable phone, a car navigation system, a portable navigation system, a personal computer, a PDA (Personal Digital Assistance), a pedometer, and a wrist watch may be supposed.

2-9-4. Satellite Positioning System

In the above described second embodiment, the embodiment of the case where the GPS is applied as the satellite positioning system has been explained, however, obviously, other satellite positioning systems including WAAS (Wide Area Augmentation System), QZSS (Quasi Zenith Satellite System), GLONASS (GLObal Navigation Satellite System), and GALILEO may be applied.

3. Third Embodiment

As below, an example of the preferred embodiments to which the invention is applied will be explained with reference to the drawings. The third embodiment is an embodiment of application of the invention to a receiver of GPS as a kind of the satellite positioning system. It is obvious that the embodiment to which the invention may be applied is not limited to the third embodiment to be explained.

The GPS satellite signals sent out from the GPS satellites are modulated using spread codes called C/A (Coarse and Acquisition) codes different with respect to each GPS satellite. In order to acquire the GPS satellite signals among the weak received signals, the GPS receiver acquires the GPS satellite signals by performing correlation calculation of the received signals and the replica codes simulating the C/A codes. Then, using the acquired GPS satellite signals, for example, location calculation is performed using pseudo distances and the location of the GPS receiver is calculated.

3-1. GPS Receiver

Figure 29:
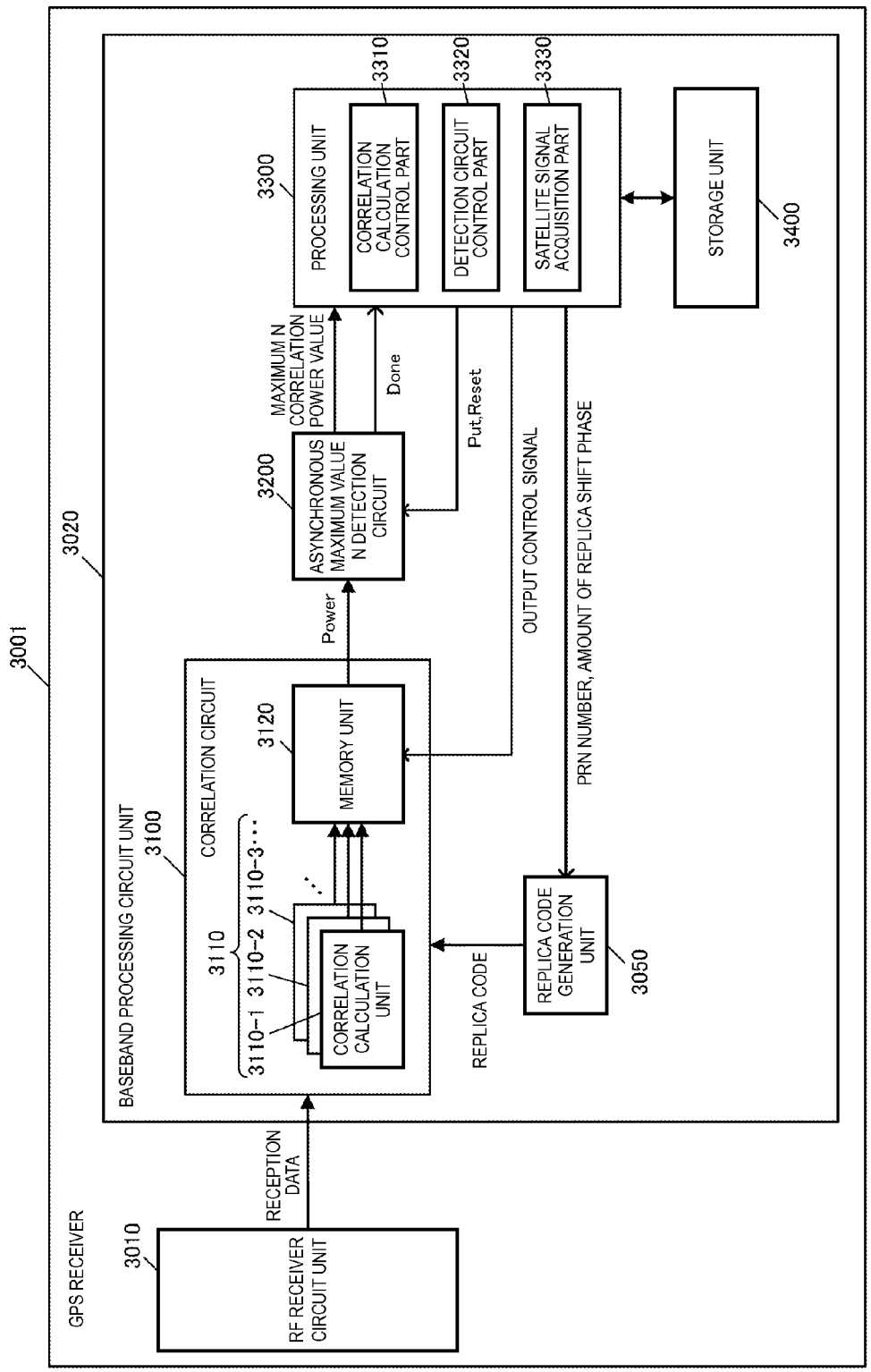
FIG. 29 is a block diagram showing an example of a functional configuration of a GPS receiver.

FIG. 29 is a block diagram showing an example of a functional configuration of a GPS receiver 3001 as a kind of the satellite signal receiving device. The GPS receiver 3001 is a device adapted to calculate a location by acquiring GPS satellite signals from RF (Radio Frequency) signals received by a GPS antenna (not shown) and using the acquired GPS satellite signals. In the third embodiment, the GPS receiver 3001 functions as a satellite signal acquisition device that acquires GPS satellite signals by performing correlation calculation of the received signals of the GPS satellite signals and the replica codes.

The GPS receiver 3001 includes an RF receiver circuit unit 3010 and a baseband processing circuit unit 3020. Note that the RF receiver circuit unit 3010 and the baseband processing circuit unit 3020 may be manufactured as respective separate LSIs (Large Scale Integrations) or as one chip.

The RF receiver circuit unit 3010 has a receiver circuit that receives RF signals output from the GPS antenna and an A/D converter circuit that performs A/D conversion by sampling the received signals (analog signals) at given sampling time intervals, and outputs the received signals to the baseband processing circuit unit as digitized reception data.

The baseband processing circuit unit 3020 acquires GPS satellite signals by removing carrier wave (carrier) and performing correlation calculation or the like on the reception data output from the RF receiver circuit unit 3010. Then, the unit calculates the location and the clock errors using time information, satellite orbit information, etc. extracted from the acquired GPS satellite signals.

In the third embodiment, the baseband processing circuit unit 3020 includes a replica code generation unit 3050, a correlation circuit 3100, an asynchronous maximum value N detection circuit 3200, a processing unit 3300, and a storage unit 3400 as major components.

The replica code generation unit 3050 is a circuit that generates replica codes as pseudo codes simulating the C/A (Coarse and Acquisition) codes as spread codes of the GPS satellite signals. According to a PRN number (satellite number) and an amount of replica phase shift output from the processing unit 3300, the replica code generation unit 3050 generates the replica codes relating to the GPS satellite to which the PRN number has been assigned in the designated amount of phase shift and outputs the codes to the correlation circuit 3100. The replica code generation unit 3050 includes an oscillator such as a code NCO (Numerical Controlled Oscillator).

The correlation circuit 3100 is a circuit unit for correlation calculation of the received signal output from the RF receiver circuit unit 3010 and the replica code output from the replica code generation unit 3050, and has a plurality of correlation calculation units 3110 (3110-1, 3110-2, 3110-3, . . . ) and a memory unit 3120. The plurality of correlation calculation units 3110 are provided so that correlation calculation of the received signals and the replica codes is performed in parallel with different phases of the replica codes from each other. This means that a plurality of channels for acquisition of satellite signals are provided.

The respective correlation calculation units 3110 perform correlation calculation of the received signals output from the RF receiver circuit unit 3010 and the replica codes output from the replica code generation unit 3050. Then, resulting correlation power values are output to the memory unit 3120.

The memory unit 3120 is a storage circuit that stores correlation power values (Power) respectively calculated by the correlation calculation units 3110. The memory unit 3120 outputs the correlation power values (Power) one by one to the asynchronous maximum value N detection circuit 3200 according to the output control signal from the processing unit 3300. In the third embodiment, the explanation that M correlation power values (Power[1] to Power[M]) are sequentially supplied to the asynchronous maximum value N detection circuit 3200 will be made.

The asynchronous maximum value N detection circuit 3200 detects the higher N correlation power values having the maximum value as the top value among the M correlation power values (Power[1] to Power[M]) sequentially supplied from the memory unit 3120. Note that $N \geq 2$ and $M \geq N$.

To the asynchronous maximum value N detection circuit 3200, a dual-rail encoding operation command signal (Put) and a reset signal (Reset) are input from the processing unit 3300. Further, N correlation power values and control operation completion signals (Done) are output from the asynchronous maximum value N detection circuit 3200 to the processing unit 3300 in descending order. The configuration and the operation of the asynchronous maximum value N detection circuit 3200 will be described later in detail.

The processing unit 3300 is a control device and a calculation device for general control of the respective functional parts of the baseband processing circuit unit 3020, and includes a processor such as a CPU (Central Processing Unit) or a DSP (Digital Signal Processor).

The processing unit 3300 has a correlation calculation control part 3310, a detection circuit control part 3320, and a satellite signal acquisition part 3330 as major functional parts relating to the third embodiment. In the third embodiment, the processing unit 3300 functions as an external system that communicates with the asynchronous maximum value N detection circuit 3200.

The storage unit 3400 stores system programs of the baseband processing circuit unit 3020, various programs and data for realization of various functions including a satellite acquisition and tracking control function and a location calculation function, etc. Further, the unit has a work area for temporary storage of data in processing, processing results etc. of various kinds of processing.

3-2. Asynchronous Maximum Value N Detection Circuit

Figure 30:
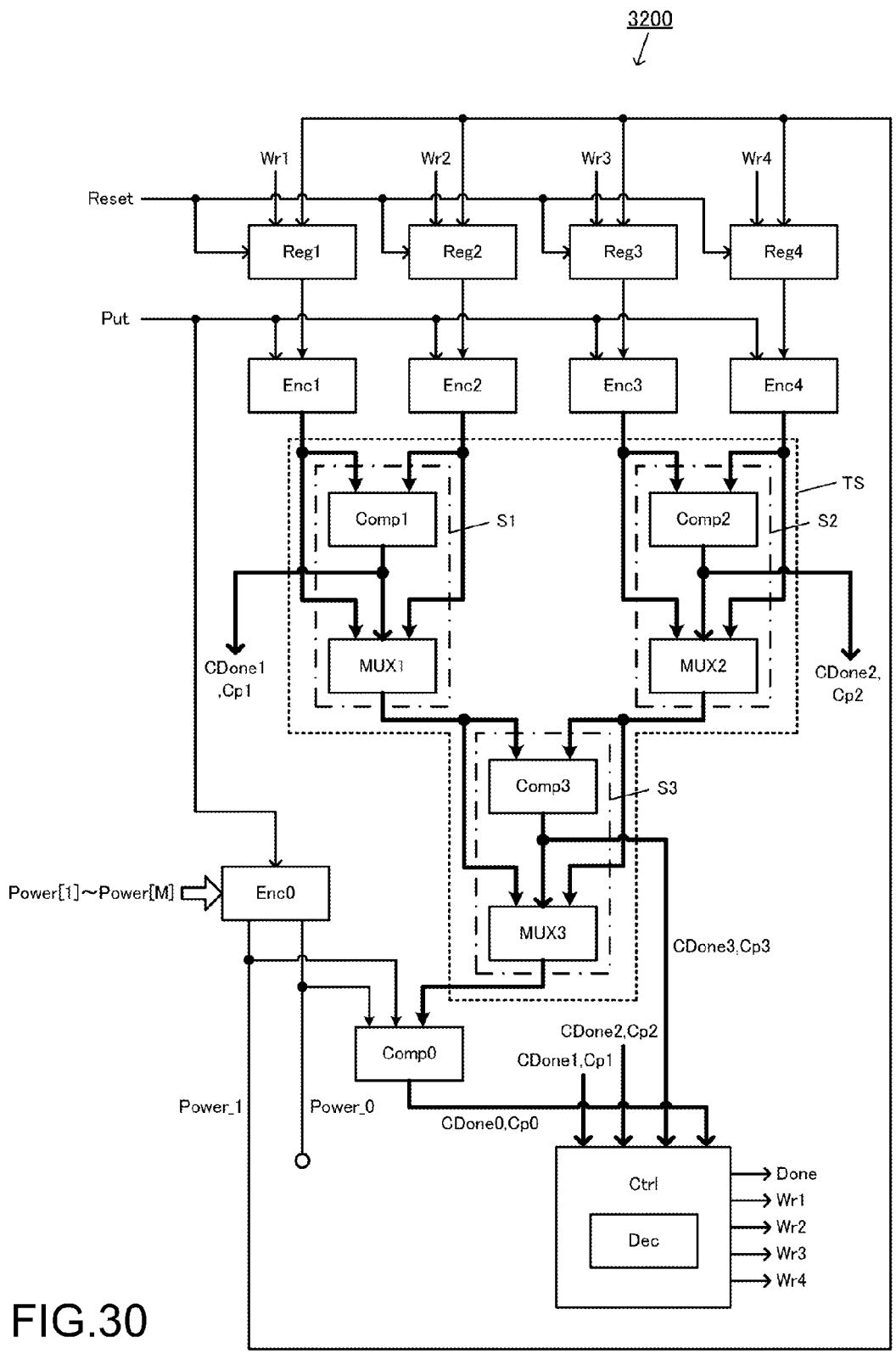
FIG. 30 shows an example of a circuit configuration of an asynchronous maximum value N detection circuit.

FIG. 30 shows an example of a circuit configuration of the asynchronous maximum value N detection circuit 3200. In the drawings for reference as below, flows of dual-rail-encoded data are shown by thick lines for distinction from data not dual-rail-encoded. Further, here, as a simple example, the number of registers is four (N=4), and a configuration of an asynchronous maximum four correlation power values detection circuit that detects the higher four correlation power values of the M correlation power values will be illustrated and explained.

The asynchronous maximum value N detection circuit 3200 has four (=N) registers Reg of first register Reg1 to fourth register Reg4, four dual-rail encoders Enc of first dual-rail encoder Enc1 to fourth dual-rail encoder Enc4, a tournament-sort selection circuit TS, an input data dual-rail encoder Enc0, an input data comparator Comp0, and a control circuit Ctrl.

In the first register Reg1 to the fourth register Reg4, of the correlation power values, four pieces of data from the maximum value are sequentially and respectively stored. These registers Reg load the correlation power values (Power) transmitting on the data bus according to load command signals Wr1 to Wr4 output from the control circuit Ctrl. Further, in these registers Reg, their storage contents are reset according to the reset signal (Reset) output from the processing unit 3300.

The first dual-rail encoder Enc1 to the fourth dual-rail encoder Enc4 correspond to the first register Reg1 to the fourth register Reg4, respectively, and dual-rail-encode the data stored in the registers Reg and output the data to the tournament-sort selection circuit TS. These dual-rail encoders Enc dual-rail-encode the data stored in the corresponding registers Reg according to the dual-rail encoding operation command signal Put output from the processing unit 3300 for output.

Table 5 shows a truth table of the dual-rail encoding method.

TABLE 5

|  | b_1 | b_0 |
|---|---|---|
| Null | 0 | 0 |
| 0 | 0 | 1 |
| 1 | 1 | 0 |
| Inhibit | 1 | 1 |

The dual-rail encoding method is a method of representing one-bit data b using a pair of two signal lines "(b_1, b_0)". "b_1" corresponds to a positive signal line and "b_0" corresponds to a negative signal line.

In the dual-rail encoding method, the data b takes either of "1" or "0" as a valid code word or "Null" as an invalid code word. By the dual-rail encoding, "0" as the valid code word is converted into (0,1) and "1" as the valid code word is converted into (1,0). "Null" as the invalid code word is converted into (0,0). Note that "(1,1)" is called Inhibit and an improper value that is impossible to be taken in operation.

In the asynchronous circuit, input and output of data between the circuit blocks are performed using the bit values dual-rail-encoded according to the dual-rail encoding method. The input and output of data are performed using the valid code word "1" or "0". The invalid code word "Null" is used at non-operation time and for delimitation of respective data. If the same valid code word are continuously transmitted, it is impossible to identify the delimitation of data at the reception side, and identification of the valid code words is enabled by alternating transmission of the valid code words and the invalid code words.

The tournament-sort selection circuit TS is formed by arranging three (=N−1) selection circuits S1 to S3 in a tournament sort. Specifically, the circuit has the three selection circuits S of the first selection circuit S1 to which data is input from the first dual-rail encoder Enc1 and the second dual-rail encoder Enc2, the second selection circuit S2 to which data is input from the third dual-rail encoder Enc3 and the fourth dual-rail encoder Enc4, and the third selection circuit S3 provided at the uppermost stage.

Each selection circuit S includes a comparator Comp and a multiplexer MUX. That is, the first selection circuit S1 has the first comparator Comp1 and the first multiplexer MUX1, the second selection circuit S2 has the second comparator Comp2 and the second multiplexer MUX2, and the third selection circuit S3 has the third comparator Comp3 and the third multiplexer MUX3.

The comparator Comp is a circuit element that compares magnitude of values of input dual-rail-encoded data, and known as a comparator. The comparator Comp compares the magnitude of two pieces of data, and outputs a comparison operation completion signal CDone showing completion of the comparison operation and a comparison result signal Cp showing a result of the magnitude comparison to the corresponding multiplexer MUX and the control circuit Ctrl. Concurrently, the comparator Comp dual-rail-encodes and outputs the signals.

The comparison operation completion signal CDone shows the state in which the comparison has not been completed as "0" and the state in which the comparison has been completed as "1", for example. Then, if the comparison has been completed, (1,0) obtained by dual-rail encoding of "1" is output and the completion of the comparison operation is informed to the multiplexer MUX and the control circuit Ctrl.

The comparison result signal Cp is adapted, with respect to combinations of two pieces of data input to the comparator, for example, to output "1" if the data transmitting in the data line on the left of the drawing is smaller than data transmitting in the data line on the right and output "0" in the reverse situation. For example, the first comparator Comp1 is adapted to set the comparison result signal Cp to "1" and outputs (1,0) obtained by dual-rail encoding of the signal if the data input from the first dual-rail encoder End is smaller than the data input from the second dual-rail encoder Enc2. In the reverse situation, the comparator is adapted to set the comparison result signal Cp to "0" and outputs (0,1) obtained by dual-rail encoding of the signal. The same applies to the second comparator Comp2 and the third comparator Comp3.

The distinction between the comparison operation completion signal CDone and the comparison result signal Cp may be realized by inserting an invalid code word Null between them. That is, in the dual-rail encoding method, valid data may be identified by alternate transmission of a valid code word and an invalid code word. Accordingly, after the comparison operation completion signal CDone (0,1) is output, (0,0) corresponding to the invalid code word "Null" is output and (0,1) or (1,0) is output as the comparison result signal Cp, and then, two types of signals may be identified at the reception side of the signals.

The multiplexer MUX is a circuit that alternatively selects and outputs two pieces of dual-rail-encoded data input to the multiplexer MUX according to the comparison result signal Cp output from the corresponding comparator Comp. In the third embodiment, the multiplexer MUX selects and outputs the data having the smaller value of the two pieces of data according to the comparison result signal Cp to the downstream.

In the first selection circuit S1, the magnitude of the data respectively dual-rail-encoded in the first dual-rail encoder Enc1 and the second dual-rail encoder Enc2 is compared and the data having the smaller value of them is output to the third selection circuit S3. In the second selection circuit S2, the magnitude of the data respectively dual-rail-encoded in the third dual-rail encoder Enc3 and the fourth dual-rail encoder Enc4 is compared and the data having the smaller value of them is output to the third selection circuit S3. In the third selection circuit S3, the magnitude of the dual-rail-encoded data output from the first selection circuit S1 and the dual-rail-encoded data output from the second selection circuit S2 is compared, and the data having the smaller value of them is output to the input data comparator Comp0.

Thereby, the data output from the third selection circuit S3 is the data having the minimum value of the data stored in the four registers Reg1 to Reg4. The data output from the third selection circuit S3 is referred to as "the most significant selection data".

The input data dual-rail encoder Enc0 has the M correlation power values (Power[1] to Power[M]) supplied from the memory unit 3120 as input data and dual-rail-encodes the input data. The correlation power values are output-controlled from the memory unit 3120 according to the control of the processing unit 3300 one by one. Then, the input data dual-rail encoder Enc0 dual-rail-encodes and outputs the correlation power values supplied from the memory unit 3120 according to the dual-rail encoding operation command signal Put output from the processing unit 3300.

The input data comparator Comp0 compares magnitude of the data of the dual-rail-encoded correlation power values output from the input data dual-rail encoder Enc0 and the dual-rail-encoded data output from the third multiplexer MUX3. Then, like the first comparator Comp1 to the third comparator Comp3, the dual-rail-encoded comparison operation completion signal CDone and comparison result signal Cp0 are output to the control circuit Ctrl. The input data comparator Comp0 is adapted to output "1" if the input data is smaller than the most significant selection data and output "0" in the reverse situation as the comparison result signal Cp0 to the control circuit Ctrl.

Of the dual-rail-encoded correlation power values, the data value of the positive line is transmitted on the data bus parallel-connected to the first register Reg1 to the fourth register Reg4. According to the truth table in Table 5, the data value "0" is converted into (0,1) by dual-rail encoding and the data value "1" is converted into (1,0) by dual-rail encoding. That is, the bit value of the positive line of the dual-rail-encoded data is the same as the bit value before the dual-rail encoding. Actually, the correlation power value is represented not by one bit, but several bits, and the bit value of the positive line does not change when the respective bit values are dual-rail-encoded. Accordingly, in the third embodiment, the circuit is formed so that the data value of the positive line of the dual-rail-encoded correlation power values may be transmitted to the registers Reg.

Note that, in place of the circuit having the above described configuration, a dual-rail decoder may be provided on the data bus connecting the input data dual-rail encoder Enc0 and the register Reg. That is, the circuit may be adapted so that the correlation power values dual-rail-encoded by the input data dual-rail encoder Enc0 may be dual-rail-decoded by a dual-rail decoder and the dual-rail-decoded data is written in the registers Reg.

The control circuit Ctrl is a control unit that generally controls the asynchronous maximum value N detection circuit 3200, and has a dual-rail decoder Dec for decoding of the dual-rail-encoded data. The dual-rail decoder Dec dual-rail decodes the dual-rail-encoded comparison operation completion signals CDone and comparison result signals Cp respectively output from the first comparator Comp1 to the third comparator Comp3 and the input data comparator Comp0. Then, the circuit controls whether or not to rewrite the contents of the registers Reg by the input data based on the dual-rail-decoded comparison result signals Cp.

Specifically, the control circuit Ctrl determines the register Reg in which the data having the minimum value is stored among the four registers Reg based on the comparison result signals Cp input from the respective comparators Comp. That is, the circuit determines the register Reg storing the minimum output data based on the respective selection results of the three (=N−1) selection circuits S1 to S3. Then, when the comparison result signal Cp0 input from the input data comparator Comp0 shows that the output data of the input data dual-rail encoder Enc0 is larger, the circuit performs control of rewriting the storage contents of the register storing the minimum output data into the output data of the input data dual-rail encoder Enc0 by outputting the load command signal Wr to the register Reg.

For the purpose of sequentially detecting the four correlation power values having the larger values, it is necessary to sequentially rewrite the contents of the registers Reg by data having the larger values. In this regard, when the input data is larger than the highest selection data, to rewrite the contents of the register Reg storing the highest selection data by the input data, the control circuit Ctrl controls the register Reg to load the input data on the data bus by outputting the load command signal Wr to the register Reg.

3-3. Flow of Processing

Figure 31:
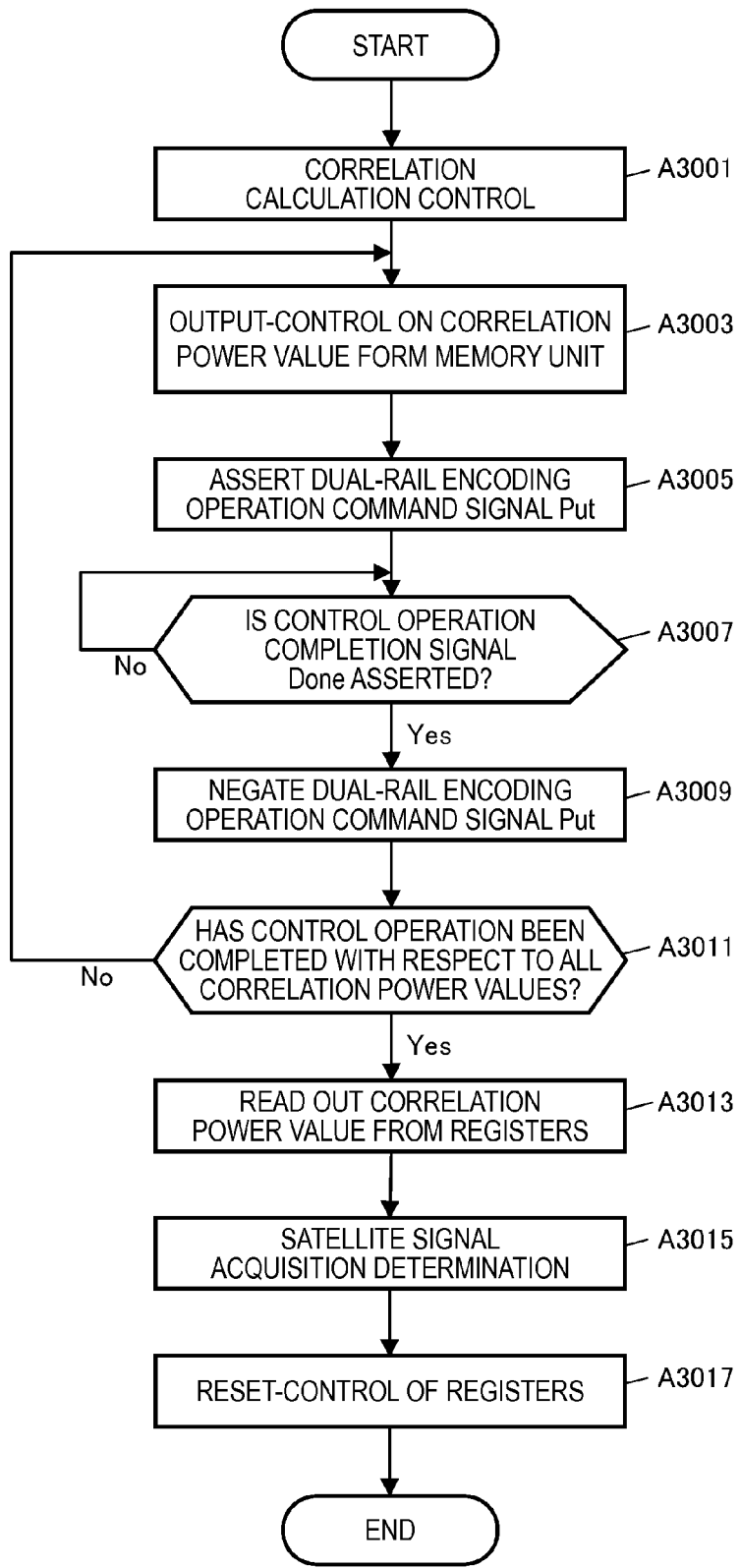
FIG. 31 is a flowchart showing a flow of satellite signal acquisition processing.

FIG. 31 is a flowchart showing a flow of satellite signal acquisition processing executed by the processing unit 3300. The processing unit 3300 executes the satellite signal acquisition processing according to the program stored in the storage unit.

First, the correlation calculation control part 3310 controls correlation calculation by the correlation circuit 3100 (step A3001). Specifically, the PRN number of the GPS satellite to be acquired (acquisition target satellite) is output and the amount of phase shift of the replica code is commanded to the replica code generation unit 3050. Then, the part allows the respective correlation calculation units 3110 forming the correlation circuit 3100 to perform correlation calculation of the received signals and the replica codes with different phases of replica codes. Note that searching in the frequency direction is also necessary for acquisition of satellite signals, and the search frequency for the case may be determined by estimation of an approximate value of the Doppler frequency.

Then, the detection circuit control part 3320 starts control relating to the detection of the correlation power values in the asynchronous maximum value N detection circuit 3200. Specifically, the detection circuit control part 3320 output-controls one correlation power value to the asynchronous maximum value N detection circuit 3200 by outputting the output control signal for the correlation power value to the memory unit 3120 (step A3003).

Then, the detection circuit control part 3320 asserts the dual-rail encoding operation command signal Put (step A3005). In response, the first dual-rail encoder Enc1 to the fourth dual-rail encoder Enc4 of the asynchronous maximum value N detection circuit 3200 dual-rail encode the data stored in the first register Reg to the fourth register Reg, respectively. Further, the input data dual-rail encoder Enc0 dual-rail-encodes the correlation power value supplied from the memory unit 3120.

Then, the detection circuit control part 3320 waits until a control operation completion signal Done of the control circuit Ctrl of the asynchronous maximum value N detection circuit 3200 is asserted (step A3007; No), and, if determination that the signal has been asserted is made (step A3007; Yes), negates the dual-rail encoding operation command signal Put (step A3009). In response, the first dual-rail encoder Enc1 to the fourth dual-rail encoder Enc4 and the input data dual-rail encoder Enc0 stop execution of dual-rail encoding. Further, in response to the negation of the dual-rail encoding operation command signal Put, the control circuit Ctrl negates the control operation completion signal Done.

In the third embodiment, communication between the processing unit 3300 and the control circuit Ctrl using the dual-rail encoding operation command signal Put and the control operation completion signal Done according to four-phase hand-shaking protocol is realized. Specifically, when the processing unit 3300 asserts the dual-rail encoding operation command signal Put, the control circuit Ctrl executes the control operation relating to rewriting of input data. Then, when the control operation is completed, the control circuit Ctrl asserts the control operation completion signal Done. The processing unit 3300 negates the dual-rail encoding operation command signal Put in response to the assertion of the control operation completion signal Done by the control circuit Ctrl. Then, the control circuit Ctrl negates the control operation completion signal Done in response to the negation of the dual-rail encoding operation command signal Put by the processing unit 3300.

Then, the detection circuit control part 3320 determines whether or not the control operation by the control circuit Ctrl has been completed with respect to all correlation power values (step A3011), and, if the part determines that the operation has not been completed (step A3011; No), returns to step A3003. Further, if the part determines that the operation has been completed (step A3011; Yes), reads out the correlation power values from the registers Reg of the asynchronous maximum value N detection circuit 3200 (step A3013).

Then, the satellite signal acquisition part 3330 performs satellite signal acquisition determination (step A3015). Specifically, for example, the part calculates an average value of the correlation power values read out from the respective registers Reg. When the calculated average value of the correlation power values exceeds a predetermined threshold value, the part determines that acquisition of the satellite signals from the acquisition target satellite has been successful. Then, the part determines the code phase based on the correlation power values read out from the respective registers Reg.

Finally, the detection circuit control part 3320 performs control of resetting the storage contents of the registers Reg by outputting the reset signal (Reset) to the asynchronous maximum value N detection circuit 3200 (step A3017), and then, ends the satellite signal acquisition processing.

3-4. Advantages

In the asynchronous maximum value N detection circuit 3200, the data stored in the N (N≥2) registers Reg are dual-rail-encoded by the respectively corresponding N dual-rail encoders Enc. By the tournament-sort selection circuit TS, the minimum output data is selected among the output data of the N dual-rail encoders Enc. On the other hand, the correlation power values calculated by the correlation calculation of the correlation circuit 3100 are stored in the memory unit 3120, and the correlation power values are output from the memory unit 3120 to the asynchronous maximum value N detection circuit 3200 one by one according to the control of the processing unit 3300.

In the asynchronous maximum value N detection circuit 3200, the input correlation power values are dual-rail-encoded by the input data dual-rail encoder Enc0. Then, the magnitude of the output data of the input data dual-rail encoder Enc0 and the minimum output data selected by the tournament-sort selection circuit TS is compared by the input data comparator Comp0. Then, as a result of the comparison by the input data comparator Comp0, when the output data of the input data dual-rail encoder Enc0 is larger, the control of rewriting the storage contents of the register Reg storing the minimum output data into the output data of the input data dual-rail encoder Enc0 is performed by the control circuit Ctrl. In this case, when the M (M≥N) correlation power values are sequentially input to the input data dual-rail encoder Enc0, the higher N correlation power values with the maximum value of the M correlation power values as the top value are stored in the registers Reg. Therefore, according to the above described configuration, the maximum N values of the M correlation power values may be detected.

The maximum value N detection circuit of the embodiment is a detection circuit formed by an asynchronous design method. When a maximum value N correlation power value detection circuit is formed by a synchronous design method, the respective circuits forming the maximum value N detection circuit are driven by the clock signals of the clock provided in the GPS receiver 3001 (for example, TCXO (Temperature Compensated Crystal Oscillator), and thus, the circuit follows the worst case scenario in which the entire performance is determined by the circuit that operates most slowly. However, the maximum value N detection circuit of the embodiment is the asynchronous detection circuit employing the dual-rail encoding method, and thus, the circuit follows the average case scenario in which only the necessary circuit in each case event-driven operates, and the high-speed circuit operation may be realized as the entire maximum value N detection circuit. Further, the clock is unnecessary and the power saving may be realized as the entire circuit, and the occurrence of problems including clock skew due to the propagation delay of the clock signal, the wiring delay of the circuit, or the like may be also avoided.

3-5. Modified Examples

Obviously, the embodiment to which the invention may be applied is not limited to the above described embodiment, but changes may be appropriately made without departing from the scope of the invention. As below, the modified examples will be explained.

3-5-1. Application Examples

The asynchronous maximum value N detection circuit of the invention may be used not only to be built in the satellite signal acquisition device like that explained in the above described third embodiment but also to be mounted on various kinds of devices and equipment. For example, the asynchronous maximum value N detection circuit of the invention may be used to be built in an image processing device for image processing or a sound processing device for sound processing.

For example, for filtering processing (e.g., feature extraction processing and smoothing processing) on an input image in the image processing device, for the purpose of checking the distribution of brightness values as preprocessing, for example, detection of the maximum N values may be performed with data of brightness values of the respective pixels as input data.

Further, the asynchronous maximum value N detection circuit of the invention may be built in, not the receiving devices for receiving signal modulated by BPSK (Binary Phase Shift Keying) modulation scheme like GPS, but a receiving device for receiving signals modulated by QAM (Quadrature Amplitude Modulation) modulation scheme, for example. In this case, with complex correlation values calculated in a complex correlator provided in the receiving device and power values calculated using real parts and imaginary parts of the complex correlation values as input data, the detection of the maximum N values may be performed in the same manner as the third embodiment.

3-5-2. Maximum N Values Detection of Absolute Values

Figure 32:
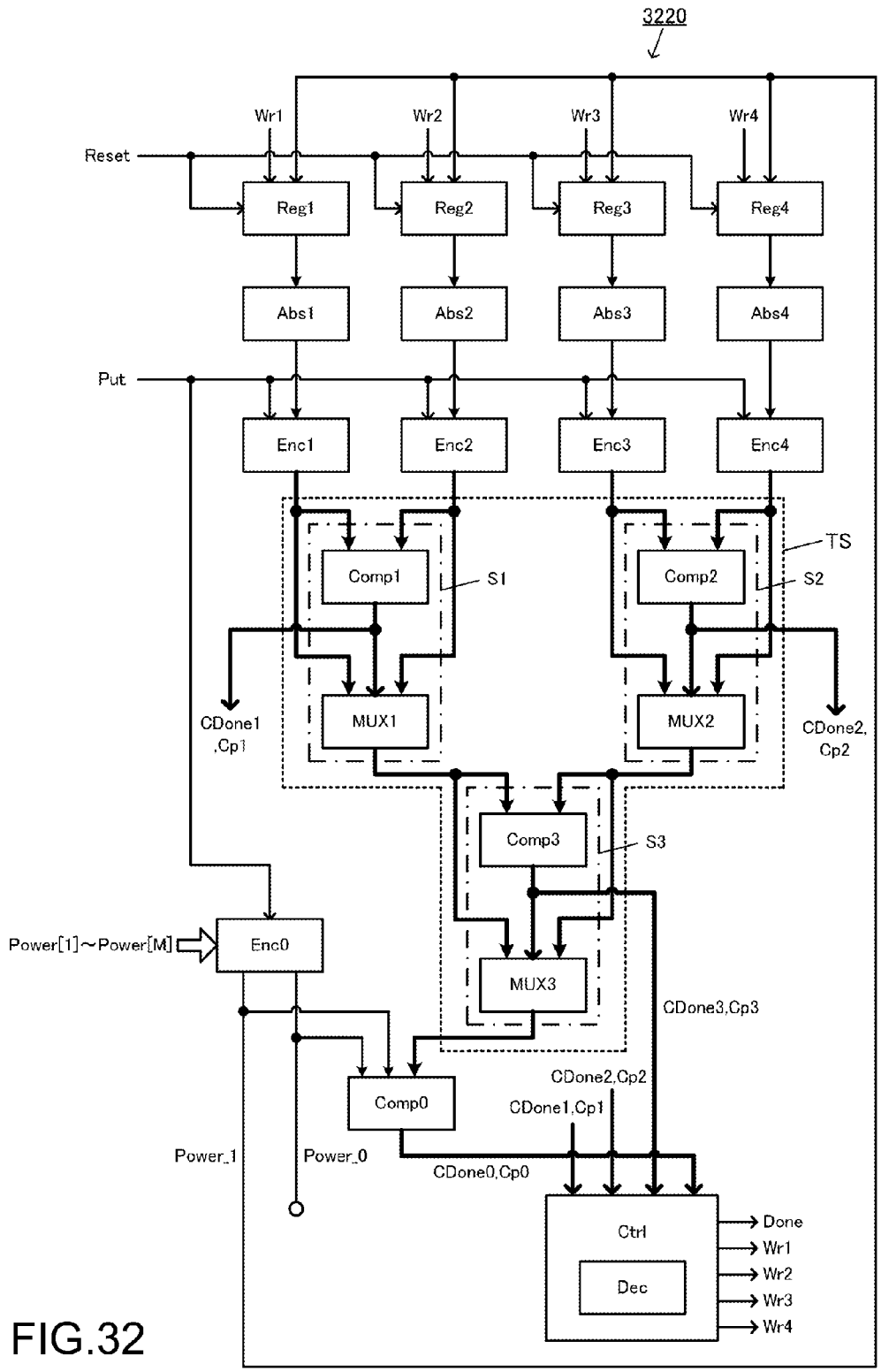
FIG. 32 shows an example of a circuit configuration of an asynchronous absolute maximum value N detection circuit.

FIG. 32 shows an example of a circuit configuration of an asynchronous absolute maximum value N detection circuit 3220 in a modified example. Like the detection circuit exemplified in FIG. 30, the case where the number of registers Reg is four will be explained as an example (N=4).

In the asynchronous absolute maximum value N detection circuit 3220, four (=N) absolute value calculators Abs that calculate absolute values of data stored in the registers Reg and output the values to the dual-rail encoders are provided between the registers Reg and the dual-rail encoders Enc. That is, first absolute value calculator Abs1 to fourth absolute value calculator Abs4 for calculation of the absolute values of data stored in the registers Reg are provided in correspondence with the first register Reg1 to the fourth register Reg4.

Further, unlike the asynchronous maximum value N detection circuit explained in FIG. 30, the input data comparator Comp0 is adapted to compare the magnitude of the absolute value output data obtained by calculation of the absolute values of the output data of the input data dual-rail encoder Enc0 and the minimum output data selected by the tournament-sort selection circuit TS. This is because the absolute value of the minimum output data selected by the tournament-sort selection circuit TS has been calculated by the absolute value calculator Abs provided at the upstream part and the value comparison between the absolute values is necessary. In this case, the higher four pieces of data with data having the maximum absolute value of the M pieces of input data as the top value are stored in the registers Reg.

In the case where the asynchronous maximum value N detection circuit is applied to the GPS receiver 3001 in the above described third embodiment, for example, the circuit may be used for the usage for detecting a predetermined number of higher correlation values from the correlation values having the larger absolute values calculated in the correlation calculation part.

3-5-3. Minimum N Values Detection Circuit

In the above described third embodiment, the embodiment of the detection circuit for detecting the higher N pieces of data from the M input data has been explained, and, obviously, a detection circuit for detecting lower N pieces of data with the minimum value of the M pieces of input data as the lowest value (asynchronous minimum value N detection circuit) may be realized by the same circuit configuration as that of FIG. 30. Further, obviously, a detection circuit for detecting lower N pieces of data with data having the minimum absolute value of the M pieces of input data as the lowest data (asynchronous absolute minimum value N detection circuit) may be realized by the same circuit configuration as that of FIG. 32.

3-5-4. Number of Registers and Tournament-Sort Selection Circuit

In the above described third embodiment, the number of registers N has been four (N=4), however, this is just an example and N may be equal to or more than two (N≥2), for example. Further, in this case, the arrangement of the selection circuits for forming the tournament-sort selection circuit may be freely determined.

3-5-5. Electronic Equipment

The satellite signal acquisition device explained in the above described third embodiment may be provided in various kinds of electronic equipment including, for example, a portable phone, a car navigation system, a portable navigation system, a personal computer, a PDA (Personal Digital Assistance), a pedometer, and a wrist watch.

3-5-6. Satellite Positioning System

In the above described third embodiment, the GPS has been applied as the satellite positioning system, however, obviously, other satellite positioning systems including WAAS (Wide Area Augmentation System), QZSS (Quasi Zenith Satellite System), GLONASS (GLObal Navigation Satellite System), and GALILEO may be applied.

As described above, the working examples have been explained in detail, however, the person who skilled in the art could readily understand that many changes may be made without substantially departing from the new matter and advantages of the invention. Therefore, these modified examples are within the scope of the invention.

What is claimed is:
1. An asynchronous correlation circuit comprising:
a first data supply unit that has a first dual-rail encoding part dual-rail-encoding first sequence data including an M-bit (M≥1) first data sequence, and supplies first data to be provided for next calculation at each time when calculation is completed;
a second data supply unit that has a second dual-rail encoding part dual-rail-encoding second sequence data including a one-bit second data sequence, and supplies second data to be provided for next calculation at each time when calculation is completed;

an addition result storage unit that stores an addition result;

a third dual-rail encoding unit that dual-rail-encodes a storage value of the addition result storage unit;

an asynchronous full addition unit that adds an output value from the first data supply unit to an output value of the third dual-rail encoding unit with a sign in response to an output value from the second data supply unit, and outputs the value; and a dual-rail decoding unit that decodes a dual-rail-encoded output value by the asynchronous full addition unit and outputs the value to the addition result storage unit.

2. The asynchronous correlation circuit according to claim 1, wherein the first data supply unit has a group of first data registers that correspond to the respective first data and store the first data;

the second data supply unit has a group of second data registers that correspond to the respective second data and store the second data;

the first dual-rail encoding part has first dual-rail encoders that are respectively associated with the first data registers forming the group of first data registers and dual-rail-encode the first data stored in the first data registers;

the second dual-rail encoding part has second dual-rail encoders that are respectively associated with the second data registers forming the group of second data registers and dual-rail-encode the second data stored in the second data registers;

the first data supply unit has a first selection part that selects the first dual-rail encoder corresponding to the first data to be provided for the next calculation, and the second data supply unit has a second selection part that selects the second dual-rail encoder corresponding to the second data to be provided for the next calculation.

3. The asynchronous correlation circuit according to claim 2, wherein the first selection part has a first reading register mechanism adapted to be provided with reading token register stages communicating with each other according to four-phase hand-shaking protocol in correspondence with the respective first data so that a reading token may circulate among the reading token register stages, the reading register mechanism moving the reading token to the next reading token register stage at each time when calculation of the asynchronous full addition unit is completed, and selects the first dual-rail encoder corresponding to the first data to be provided for the next calculation based on the reading token, and the second selection part has a second reading register mechanism adapted to be provided with reading token register stages communicating with each other according to four-phase hand-shaking protocol in correspondence with the respective second data so that a reading token may circulate among the reading token register stages, the reading register mechanism moving the reading token to the next reading token register stage at each time when calculation of the asynchronous full addition unit is completed, and selects the second dual-rail encoder corresponding to the second data to be provided for the next calculation based on the reading token.

4. The asynchronous correlation circuit according to claim 2, wherein the asynchronous full addition unit has a group of tournament-sort full adders in which ($2^K-1$) asynchronous full adders for addition of $2^K$ (K is an integer number equal to or more than one) pieces of the first data are arranged in a tournament sort, the first selection part has a first reading register mechanism adapted to be provided with reading token register stages communicating with each other according to four-phase hand-shaking protocol in correspondence with the respective first data so that a reading token may circulate among the reading token register stages, the respective reading token register stages associated with the first dual-rail encoders corresponding to the $2^K$ pieces of the first data to be calculated of the asynchronous full addition unit, the reading register mechanism moving the reading token to the next reading token register stage at each time when calculation of the asynchronous full addition unit is completed, and selects the first dual-rail encoder corresponding to the $2^K$ pieces of the first data to be provided for the next calculation based on the reading token, the second selection part has a second reading register mechanism adapted to be provided with reading token register stages communicating with each other according to four-phase hand-shaking protocol in correspondence with the respective second data so that a reading token may circulate among the reading token register stages, the respective reading token register stages associated with the second dual-rail encoders corresponding to the $2^K$ pieces of the second data as a counterpart of correlation calculation, the reading register mechanism moving the reading token to the next reading token register stage at each time when calculation of the asynchronous full addition unit is completed, and selects the second dual-rail encoder corresponding to the $2^K$ pieces of the second data to be provided for the next calculation based on the reading token, of the group of tournament-sort full adders, each of the lowermost asynchronous full adders adds, to an output value of the first dual-rail encoder relating to one first data of two pieces of the first data to be calculated, an output value of the first dual-rail encoder relating to the other first data with a sign in response to an output value of the second dual-rail encoder according to two pieces of the second data as a counterpart of correlation calculation.

5. The asynchronous correlation circuit according to claim 2, further comprising:

a first writing register mechanism adapted so that a writing token may circulate among writing token register stages communicating with each other according to four-phase hand-shaking protocol, the writing register mechanism sequentially moving the writing token to the next writing token register stage and storing the first data in the first data register based on the writing token; and a second writing register mechanism adapted so that a writing token may circulate among writing token register stages communicating with each other according to four-phase hand-shaking protocol, the writing register mechanism sequentially moving the writing token to the next writing token register stage and storing the second data in the second data register based on the writing token.

6. The asynchronous correlation circuit according to claim 1, wherein the second data supply unit has an asynchronous data generator circuit that generates the second sequence data having a length of $2^L-1$ (L is an integer number equal to or more than three), and the asynchronous data generator circuit has a first linear feedback shift register circuit in which L stages of first data register parts each formed with a one-bit data register part sandwiched between a dual-rail decoder and a dual-rail encoder and (L−1) stages of first exclusive OR circuits are linear-feedback-connected, a second linear feedback shift register circuit in which L stages of second data register parts each formed with a one-bit data register part sandwiched between a dual-rail decoder and a dual-rail encoder and (L−1) stages of second exclusive OR circuits are linear-feedback-connected, and a coupling part that couples an output value from the first linear feedback shift register circuit and an output value from the second linear feedback shift register circuit, wherein the second dual-rail encoding part includes dual-rail encoders of the first data register parts and dual-rail encoders of the second data register parts, the first linear feedback shift register circuit is adapted to set respective first initial values of the first data register parts and the first exclusive OR circuits for execution of calculation of exclusive OR, and the second linear feedback shift register circuit is adapted to set respective second initial values of the second data register parts and the second exclusive OR circuits for execution of calculation of exclusive OR.

7. The asynchronous correlation circuit according to claim 6, wherein the second data supply unit has a setting part that performs setting of the first initial values and the first exclusive OR circuits in response to the second sequence data generated by the asynchronous data generator circuit, and performs setting of the second initial values and the second exclusive OR circuits in response to the second sequence data.

8. The asynchronous correlation circuit according to claim 1, being an asynchronous circuit that calculates correlation values of received signals and replica codes, wherein the first sequence data is sequence data obtained by sampling of the received signals from a satellite in a temporal sequence, and the second sequence data is sequence data obtained by sampling of the replica codes of the satellite in a temporal sequence.

* * * * *